(12) United States Patent
Kuwajima et al.

(10) Patent No.: US 7,146,623 B2
(45) Date of Patent: Dec. 5, 2006

(54) HEAD SUPPORT DEVICE AND IT'S DRIVING METHOD, AND DRIVE DISK USING SAME

(75) Inventors: Hideki Kuwajima, Kyoto (JP); Kaoru Matsuoka, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 493 days.

(21) Appl. No.: 10/735,253

(22) Filed: Dec. 12, 2003

(65) Prior Publication Data
US 2004/0179465 A1    Sep. 16, 2004

(30) Foreign Application Priority Data
Dec. 12, 2002 (JP) .............................. 2002-360544
Mar. 27, 2003 (JP) .............................. 2003-088456

(51) Int. Cl.
*G11B 7/08* (2006.01)

(52) U.S. Cl. ..................................................... 720/662

(58) Field of Classification Search ............... 369/300; 720/662; 360/246.6, 246.7, 264.3, 264.4, 360/264.7, 265.9
See application file for complete search history.

(56) References Cited

U.S. PATENT DOCUMENTS

| | | | |
|---|---|---|---|
| 2,674,728 A | 4/1954 | Potter ......................... 340/174 |
| 2,852,762 A | 9/1958 | MacDonald ................. 340/174 |
| 2,910,669 A | 10/1959 | Brand ......................... 340/174 |
| 3,052,874 A | 9/1962 | Krakinowski et al. ... 340/174.1 |
| 3,349,381 A | 10/1967 | Handley .................... 340/174.1 |
| 3,546,685 A | 12/1970 | Gabor ...................... 340/174.1 |
| 3,772,666 A * | 11/1973 | Scholz et al. ................. 360/75 |
| 4,423,446 A * | 12/1983 | Takahashi et al. ....... 360/264.3 |
| 4,972,396 A * | 11/1990 | Rafner ..................... 369/30.03 |
| 4,994,931 A * | 2/1991 | Foote .......................... 365/106 |
| 5,018,035 A * | 5/1991 | Johnson .................... 360/264.7 |
| 5,172,282 A * | 12/1992 | Ghose ...................... 360/78.12 |
| 5,317,559 A * | 5/1994 | Bronsvatch .............. 360/264.3 |
| 5,343,347 A * | 8/1994 | Gilovich .................. 360/246.7 |

(Continued)

FOREIGN PATENT DOCUMENTS

JP    63-173276 A    7/1988

(Continued)

*Primary Examiner*—Angel Castro
(74) *Attorney, Agent, or Firm*—Rossi, Kimms & McDowell, LLP

(57) ABSTRACT

The present invention provides a head support mechanism wherein the position can be accurately corrected at a high speed when the mode is shifted from reproducing to recording, and also, the deflection of recording magnetic field from the direction of initialized magnetic orientation is little and it is possible to suppress the deterioration of the recording characteristics and to make the skew very small. The first link 3 and the second link 4 respectively rotate about the first rotational center 5a and the second rotational center 5b, to which the third link 7 and the fourth link 8 are rotatably connected. The lengths of the first link 3 and the second link 4 are nearly equal to each other, and the lengths of the third link 7 and the fourth link 8 are set to a length nearly equal to the distance between the first rotational center 5a and the second rotational center 5b. As the first link 3 rotates, the third link 7 and the fourth link 8 reciprocate while keeping a state of being parallel to the diametric line 9 of the recording medium that connects the first rotational center 5a to the second rotational center 5b, and then the sliders 10 mounted with magnetic heads of the suspension 11a and 11b fixed thereon reciprocate.

59 Claims, 29 Drawing Sheets

U.S. PATENT DOCUMENTS

| | | | |
|---|---|---|---|
| 5,745,319 A | 4/1998 | Takekado et al. | 360/78.05 |
| 5,754,368 A | 5/1998 | Shiraishi et al. | 360/104 |
| 5,796,558 A | 8/1998 | Hanrahan et al. | 360/106 |
| 6,081,399 A * | 6/2000 | Lee et al. | 360/75 |
| 6,115,215 A * | 9/2000 | Adams et al. | 360/264.4 |
| 6,449,130 B1 * | 9/2002 | Koyama | 360/264.4 |
| 6,678,120 B1 * | 1/2004 | Money | 360/264.4 |
| 7,072,147 B1 * | 7/2006 | Limmer et al. | 360/264.1 |

FOREIGN PATENT DOCUMENTS

| | | |
|---|---|---|
| JP | 6-203492 A | 7/1994 |
| JP | 6-259905 A | 9/1994 |
| JP | 7-153206 A | 6/1995 |
| JP | 2894262 B2 | 3/1999 |

* cited by examiner

HEAD SUPPORT DEVICE AND IT'S DRIVING METHOD, AND DRIVE DISK USING SAME

FIELD OF THE INVENTION

The present invention relates to a head support device used in a disk drive with a floating type head such as magnetic disk drive, optical disk drive, and optical magnetic disk drive, and its driving method, and a disk drive using the same.

BACKGROUND OF THE INVENTION

As an example of a head support device of a disk drive with a conventional floating type head, a head support device in a magnetic recording/reproducing apparatus such as a hard disk drive will be described in the following with reference to drawings. (Refer to, for example, Japanese Registered Patent Gazette No. 2894262, Japanese Open Patent Gazette: Japanese Laid-open Patent H6-259905.)

FIG. 29 is a top view showing the configuration of essential components of a conventional head support device and magnetic recording medium. In FIG. 29, head support device 291 comprises suspension 292 with relatively low rigidity, plate spring 293, and support arm 294 with relatively high rigidity, and there is provided slider 295 mounted with a magnetic head (not shown) on the underside of one end of the suspension 292.

Also, magnetic recording medium 296 is configured so as to be rotated by spindle motor 297, and when the magnetic recording/reproducing apparatus is in recording/reproducing mode, because of the balancing relation between the floating force given to the slider 295 due to the air current generated with rotation of the magnetic recording medium 296 and the activating force of the plate spring 293 of the head support device 291 which activates the slider 295 toward the magnetic recording medium 296, the slider 295 floats a fixed amount from the magnetic recording medium 296. That is, it is configured in that the magnetic head mounted on the slider 295 floats a fixed amount from the magnetic recording medium 296.

The head support device 291 is rotated about bearing portion 299 by the action of voice coil 298 disposed on the support arm 294 when the magnetic recording/reproducing apparatus is in recording or reproducing mode, and the magnetic head mounted on the slider 295 is positioned with respect to the desired track of the magnetic recording medium 296, thereby executing the recording or reproducing operation.

However, in the above conventional disk drive, when the support arm 294 and the suspension 292 connected thereto are rotated about the bearing portion 299 by the action of the voice coil 298, the locus of the magnetic head moving on the magnetic recording medium 296 is arcuate and small in diameter. Usually, the head gap of the magnetic head mounted on the slider 295 passes through the center of the bearing portion 299 and is vertical to the radial line of the head support device 291 that is the lengthwise center line of the support arm 294 and the suspension 292. Accordingly, the recording track recorded on the magnetic recording medium 296 is provided with an angle of skew in accordance with the rotational locus of the magnetic head [angle in the direction of gap length of the magnetic head against the tangential direction of the recording track (direction vertical to the direction of trackwidth), that is, an angle in the direction of track width of head gap of the magnetic head against the radial direction of the recording track]. In the case of a disk drive with small disk diameter, the relative speed of magnetic head as against the magnetic recording medium 296 is lowest at the innermost periphery of recording zone A of the magnetic recording medium 296, then the slider 295 is hard to float, and therefore, the setting is made so that the central point of the slider 295 corresponds to the innermost periphery of the recording zone A, and also, the position of the bearing portion 299 being the rotational center of the head support device 291 is set so that, at the central point of the slider 295, the tangent against the track at the innermost periphery of the recording zone A corresponds to a direction vertical to the gap width direction of the magnetic head mounted on the slider 295. Accordingly, as the magnetic head moves toward the outer periphery from the inner periphery of the recording zone A of the magnetic recording medium 296, the angle of skew against the recording track is increased.

For example, when the radius of the innermost periphery of recording zone A of magnetic recording medium 296=4 mm, the distance from the rotational center of bearing portion 299 of head support device 291 to the magnetic head=13.6 mm, and the distance from the center of slider 295 in the gap length direction of the magnetic head to the head gap center of the magnetic head=0.6 mm, then the angle of skew at the innermost periphery of recording zone A of magnetic recording medium 296 is $\theta_0=8.627°$.

On the other hand, when the radius of magnetic recording medium 296=8.45 mm, the skew angle $\theta$ calculated is $$\theta=18.183°.$$

In this case, when it is configured in that the separate recording and reproducing heads are integrally formed as one magnetic head, the radial positions of the recording head and the reproducing head differ from each other on the magnetic recording medium 296. That is, the difference in radial position $\Delta r$ is as follows:

suppose the center line interval between the recording head and the reproducing head is $d=2$ μm, then the difference in radial position $$\begin{aligned}\Delta r &= d \times \cos(90-\theta) \\ &= 2 \times \cos(90-18.183) \\ &= 2 \times 0.312053042 \\ &= 0.624 \text{ μm}.\end{aligned}$$

The greater the radial distance on the magnetic recording medium 296 becomes, the difference in radial position between the recording head and the reproducing head on the magnetic recording medium 296 becomes greater, and when the mode is shifted from reproducing to recording or from recording to reproducing as a drive disk, it will invite lowering of the positioning accuracy of the recording head or the reproducing head, thereby requiring accurate correction of positioning in accordance with the difference in radial position between the recording head and the reproducing head. Particularly, when the mode is shifted from reproducing to recording, it is required to quickly and accurately correct the positioning, or otherwise there arises a problem such that shifting the mode to recording causes the occurrence of trouble such as erasing or the like on the already recorded zone.

In order to lessen the skew, it is necessary to increase the distance from the rotational center of the head support device 291 to the magnetic head, but it is contradictory to the purpose of miniaturization, making it difficult to realize the intended miniaturization.

Also, if the skew of the recording head is increased, deflection will be generated between the magnetic orientation and the recording magnetic field in the circumferential direction of the initialized magnetic recording medium 296, causing the recording characteristics to be deteriorated.

The present invention is intended to solve the above problems and to reduce the size of the apparatus, and also, the object of the invention is to provide a head support device capable of decreasing the skew, a driving method for driving the device, and a disk drive using them.

SUMMARY OF THE INVENTION

The head support device of the present invention comprises a first link and a second link respectively having a first rotational center and a second rotational center with the diametric rotational center of a recording medium therebetween, a third link and a fourth link which are respectively held so as to be rotatable about the rotational centers provided at either side of the first link and the rotational centers provided at either side of the second link, and a first suspension and a second suspension, respectively fixed on the third link and the fourth link, have heads respectively disposed at one end thereof. Also, the line connecting the respective rotational centers disposed at either side of the first link passes through the first rotational center of the first link, while the line connecting the respective rotational centers disposed at either side of the second link passes through the second rotational center of the second link. Also, the respective first rotational center and second rotational center of the first link and the second link are located on the extension line of the diametric line of the recording medium, and the third link and the fourth link in a state of being parallel with the diametric line of the recording medium which passes through the first rotational center and the second rotational center reciprocate in directions opposite to each other.

In the above configuration, the loci of movements of respective sliders fitted to respective suspensions fixed on the third link and the fourth link in accordance with the rotation of the first link correspond to the circularly arcuate loci identical with movements of respective rotational centers of the third link and the fourth link at the first link. Accordingly, it is possible to realize a head support mechanism wherein the locus is as much straight line as possible in a state that, of the circles being the loci of movements of the respective rotational centers of the third link and the fourth link at the first link in accordance with the rotation of the first link, the circularly arcuate locus subscribed by the slider on the recording medium can be set so that the distance at each point of the locus from the diametric line of the recording medium is lessened and that the slider can be sufficiently floated at the innermost periphery of the recordable zone of the recording medium.

Also, the head support device of the present invention comprises a first link and a second link respectively having a first rotational center and a second rotational center with the diametric rotational center of a recording medium therebetween; a third link and a fourth link which are respectively rotatably held about the rotational centers disposed at either side of the first link and the rotational centers disposed at either side of the second link; a first suspension and a third suspension which are fixed on the third link and respectively provided with heads at one side thereof; and a second suspension and a fourth suspension which are fixed on the fourth link and respectively provided with heads at either side thereof. Further, the track width direction of a signal conversion element mounted on the slider comprising a head fitted to one end of each of the first suspension, the second suspension, the third suspension, and the fourth suspension keeps a predetermined angle against the diametric line of the recording medium that connects the first rotational center to the second rotational center during reciprocal motion on the recording medium.

In the above configuration, the whole head support mechanism can be balanced in terms of weight, and it is possible to realize high impact resistance. Further, setting the azimuth of each magnetic head of the slider disposed on each of the first suspension, the second suspension, the third suspension, and the fourth suspension to different angles, it is possible to greatly decrease the recording track pitch and to improve the recording density. Also, it becomes possible to record on both sides of the recording medium and to obtain the effect of increasing the recording capacity.

Also, the head support device of the present invention comprises a first link and a second link respectively having a first rotational center and a second rotational center with the rotational center of a recording medium therebetween, a third link and a fourth link which are respectively rotatably held about the rotational centers disposed at either side of the first link, and a first suspension and a second suspension, respectively fixed on the third link and the fourth link, one of which is provided with a head, wherein the respective heads of the first suspension and the second suspension are respectively disposed on the topside or underside of the recording medium, and the head of one of the first suspension and the second suspension covers to the zone at the innermost periphery of the recordable zone divided into two zones by a separation periphery, while the head of the other covers the zone at the outermost periphery. Also, the line connecting the respective rotational centers disposed at either end of the first link passes through the first rotational center of the first link, while the line connecting the respective rotational centers disposed at either end of the second link passes through the second rotational center of the second link. Also, the first rotational center of the first link and the second rotational center of the second link are respectively located on the diametric line of the recording medium. Also, the third link and the fourth link are parallel with the diametric line of the recording medium that passes through the first rotational center and the second rotational center and make reciprocal movement in directions opposite to each other.

In the above configuration, the loci of movements of sliders configuring respective heads fitted to the first suspension and the second suspension respectively fixed on the third link and the fourth link in accordance with the rotation of the first link correspond to the circularly arcuate loci identical with movements of respective rotational centers of the third link and the fourth link at the first link. Accordingly, it is possible to realize a head support device wherein the locus is as much straight line as possible in a state that, of the circles being the loci of movements of the respective rotational centers of the third link and the fourth link at the first link in accordance with the rotation of the first link, the circularly arcuate locus on the recording medium can be set so that the distance at each point of the locus against the diametric line of the recording medium is lessened and that the slider can be sufficiently floated at the innermost periphery of the recordable zone of the recording medium.

Also, the head support device of the present invention comprises a bearing support which is disposed at one side of the rotational center of the recording medium and has a peak with a first curvature at the end thereof; a push arm which is disposed at the other side of the rotational center of the recording medium and provided with a push portion having a peak with a second curvature at the end thereof and is rotatable and activated by a spring; a notched portion activated by other spring and provided with a depression having a third curvature at the center thereof that is larger than the first curvature being in contact with the peak having the first curvature of the bearing support; and also, a first link which is rotatable with a peak having the first curvature of the bearing support as the first rotational center, and has rotary shafts at either side thereof; a second link having a notched portion with a depression having a fourth curvature at the center thereof that is larger than the second curvature being in contact with the peak having the second curvature of the push portion of the push arm, which is rotatable about the peak having the second curvature of the push portion of the push arm as the second rotational center and also provided with rotary shafts at either side thereof; a third link which is provided with holes at either side thereof and is rotatable with each rotary shaft as the rotational center at one side of each of the first link and the second link; a fourth link which is provided with holes at either side thereof and is rotatable with each rotary shaft as the rotational center at the other side of each of the first link and the second link; a first suspension which is fixed on the third link and has a head at one side thereof; a second suspension which is fixed on the fourth link and has a head at one side thereof; and a drive means for rotational drive of the first link. Or, the head support device of the present invention comprises a bearing support which is disposed at one side of the rotational center of the recording medium and has a peak with a first curvature at the end thereof; a push arm which is disposed at the other side of the rotational center of the recording medium and provided with a push portion having a peak with a second curvature at the end thereof and is rotatable and activated by a spring; a notched portion activated by other spring and provided with a depression having a third curvature at the center thereof that is larger than the first curvature being in contact with the peak having the first curvature of the bearing support; and also, a first link which is rotatable with the peak having the first curvature of the bearing support as the first rotational center and provided with rotary shafts at either side thereof; a second link having a notched portion with a depression having a fourth curvature at the center thereof that is larger than the second curvature being in contact with the peak having the second curvature of the push portion of the push arm, which is rotatable with the peak having the second curvature of the push portion of the push arm as the second rotational center and also provided with rotary shafts at either side thereof; a third link which is provided with holes at either side thereof and is rotatable with each rotary shaft as the rotational center at one side of each of the first link and the second link; a fourth link which is provided with holes at either side thereof and is rotatable with each rotary shaft as the rotational center at the other side of each of the first link and the second link; a first suspension which is fixed on the third link and has a head at one side thereof; a second suspension which is fixed on the fourth link and has a head at one side thereof; and a drive means for rotational drive of the first link, wherein it is configured in that the respective heads of the first suspension and the second suspension are respectively disposed on the topside or underside of the recording medium with the rotational center of the recording medium therebetween, and the head of one of the first suspension and the second suspension covers the zone at the innermost periphery side of the recordable zone divided into two zones by the separation periphery and the head of the other covers the zone at the outermost periphery side.

In the above configuration, at the rotary shaft and hole where each link is rotatably connected, the side of the rotary shaft comes in contact with the side of the hole, and thereby, looseness due to small gaps between the rotary shaft and the hole can be eliminated. Accordingly, it is possible to prevent the influence of looseness given to other links due to the rotation of the first link and to make the signal conversion element smoothly move toward the target track, thus enabling the realization of a head support mechanism wherein the access time to move the signal conversion element to the target track is shortened.

Also, the head support device of the present invention comprises a first link having a first rotational center; a second link having a second rotational center; a third link rotatably held at one side of each of the first link and the second link; a first suspension and a second suspension which are fixed on the third link and respectively provided with a head at one side thereof; and a drive means for rotational drive of the first link, wherein the respective heads of the first suspension and the second suspension are respectively disposed on the topside or the underside of the recording medium with the rotational center of the recording medium therebetween. Also, the third link makes a reciprocal motion in parallel relation with the line connecting the first rotational center to the second rotational center.

In the above configuration, the loci of movements of sliders configuring respective heads fitted to the tow suspensions fixed on the third link in accordance with the rotation of the first link correspond to the circularly arcuate loci identical with movements of the rotational centers of the third link at the first link. On the other hand, since the distance between the first rotational center of the first link and the rotational center against the third link or the effective link length of the first link can be made relatively great and the rotation radius can be set relatively great, it is possible to realize a head support device wherein the locus of the slider is provided with a large curvature and as much straight line as possible.

Also, the head support device of the present invention comprises a bearing support which is disposed at one side of the rotational center of the recording medium and has a peak with a first curvature at the end thereof; a push arm which is disposed at the other side of the rotational center of the recording medium and provided with a push portion having a peak with a second curvature at the end thereof and is rotatable and activated by a spring; a notched portion activated by other spring and provided with a depression having a third curvature at the center thereof that is larger than the first curvature being in contact with the peak having the first curvature of the bearing support; and also, a first link which is rotatable with a peak having the first curvature of the bearing support as the first rotational center, and has rotary shafts at either side thereof; a second link having a notched portion with a depression having a fourth curvature at the center thereof that is larger than the second curvature being in contact with the peak having the second curvature of the push portion of the push arm, which is rotatable about the peak having the second curvature of the push portion of the push arm as the second rotational center and also provided with rotary shafts at either side thereof; a third link which is provided with holes at either side thereof and is rotatable with each rotary shaft as the rotational center at one side of each of the first link and the second link; a fourth link which is provided with holes at either side thereof and is rotatable with each rotary shaft as the rotational center at the other side of each of the first link and the second link; a first suspension and a second suspension which are respectively fixed on the third link with the rotational center of the recording medium therebetween and respectively have heads at either one side thereof; and a drive means for rotational drive of the first link, wherein the respective heads of the first suspension and the second suspension are respectively disposed on the topside or the underside of the recording medium with the rotational center of the recording medium therebetween. Also, the third link makes a reciprocal motion in parallel relation with the line connecting the first rotational center to the second rotational center.

In the above configuration, at the rotary shaft and hole where each link is rotatably connected, the side of the rotary shaft comes in contact with the side of the hole, and thereby, looseness due to small gaps between the rotary shaft and the hole can be eliminated. Accordingly, it is possible to prevent the influence of looseness given to other links due to the rotation of the first link and to make the signal conversion element smoothly move toward the target track, thus enabling the realization of a head support device wherein the access time to move the signal conversion element to the target track is shortened.

Also, as to the driving method of the head support device of the present invention, the mechanism comprises a generally U-shaped drive arm provided with a push portion with a peak having a curvature at the end thereof, and a piezoelectric element fixed on one inner side of the generally U-shaped drive arm and on the other inner side opposite to one inner side, wherein a side portion other than the push portion side of the generally U-shaped drive arm is fixed on a fixing member and there is provided a depression at the side of the push portion, and the push portion of the drive arm is reciprocally moved by the piezoelectric element extended and retracted, thereby driving a suspension having a slider mounted with a signal conversion element.

By this method, the suspension having a slider mounted with a signal conversion element is moved with slight extension and retraction of the piezoelectric element, and it is possible to realize ahead support device driving method capable of obtaining high response and achieving the purpose of shortening the access time.

Also, the disk drive of the present invention comprises a recording medium rotated by a spindle motor, and a head support device having a signal conversion element which is opposed to the recording medium and serves to record signals on the recording medium or reproduce signals from the recording medium, wherein the head support device uses the configuration of the above-mentioned head support device or the driving method of the above-mentioned head support device.

In the above configuration, the skew angle of the signal conversion element against the recording track can be made very small, and when the mode is shifted from reproducing to recording or from recording to reproducing, the recording head or reproducing head can be quickly and accurately positioned. Also, the direction of magnetic orientation in the circumferential direction of the initialized recording medium is not deflected from the recording magnetic field, and thereby, it is possible to prevent the deterioration of recording characteristics. Accordingly, the signal conversion element can be smoothly moved toward the target track, and it is possible to realize a disk drive wherein the access time for moving the signal conversion element to the target track is shortened.

DESCRIPTION OF THE PREFERRED EMBODIMENTS

Figure 1:
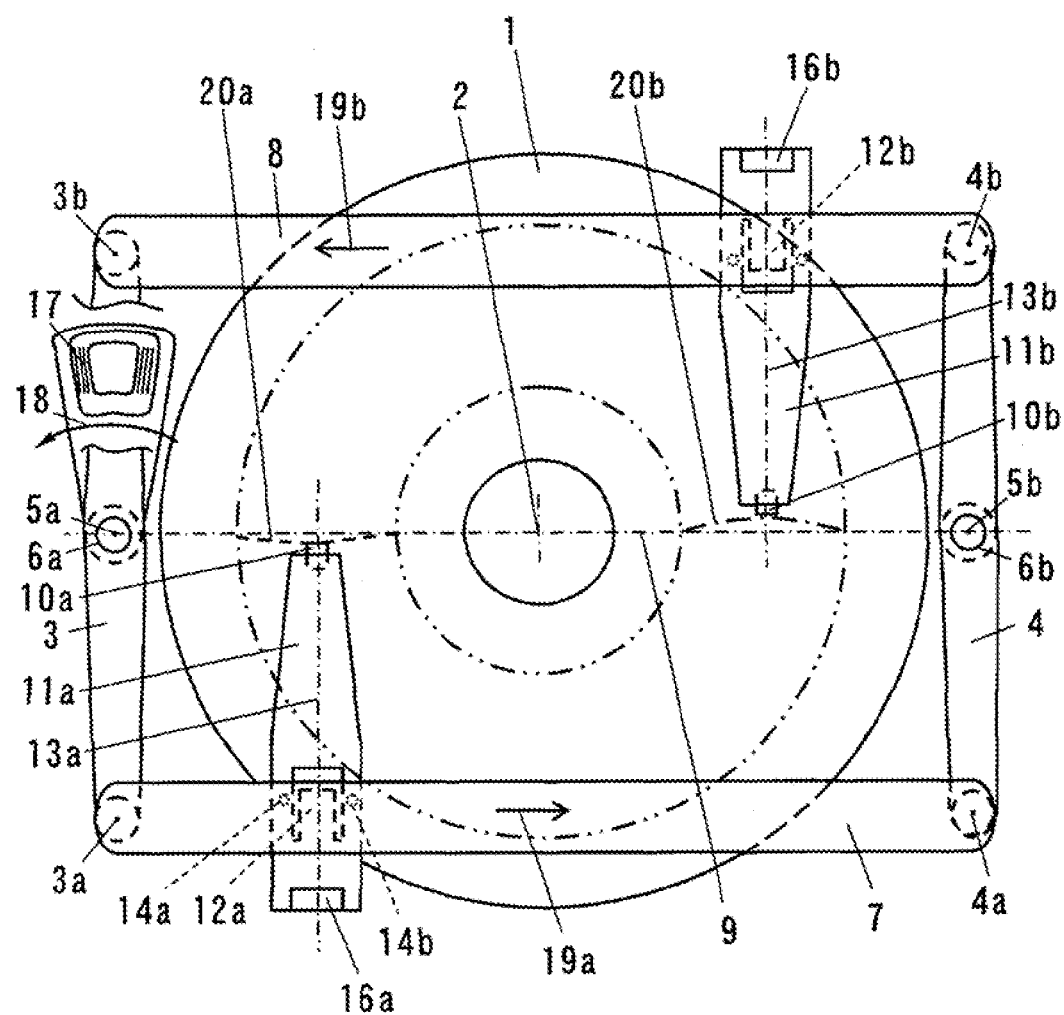
FIG. 1 is a top view showing the configuration of essential components of a head support device and recording medium in the first exemplary embodiment of the present invention.

Preferred embodiments of the invention will be described in the following by using the drawing.

First Exemplary Embodiment (First Exemplary Embodiment)

Figure 2:
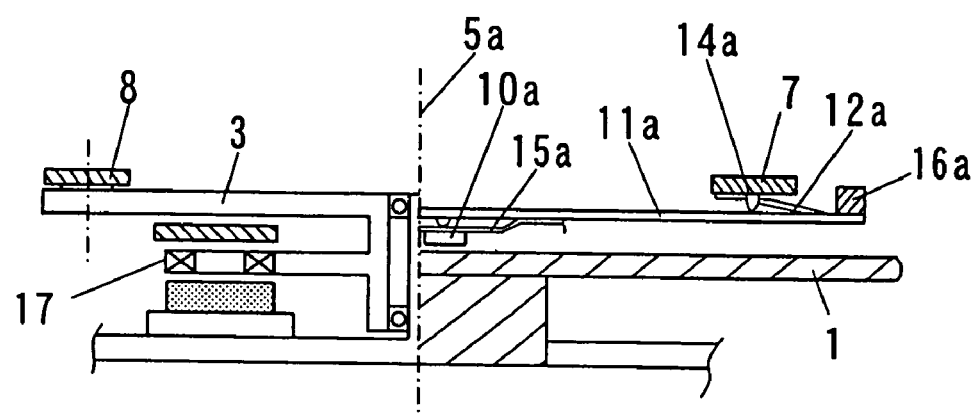
FIG. 2 is a top view showing the configuration of essential components of a head support device and recording medium in the first exemplary embodiment of the present invention.
Figure 3:
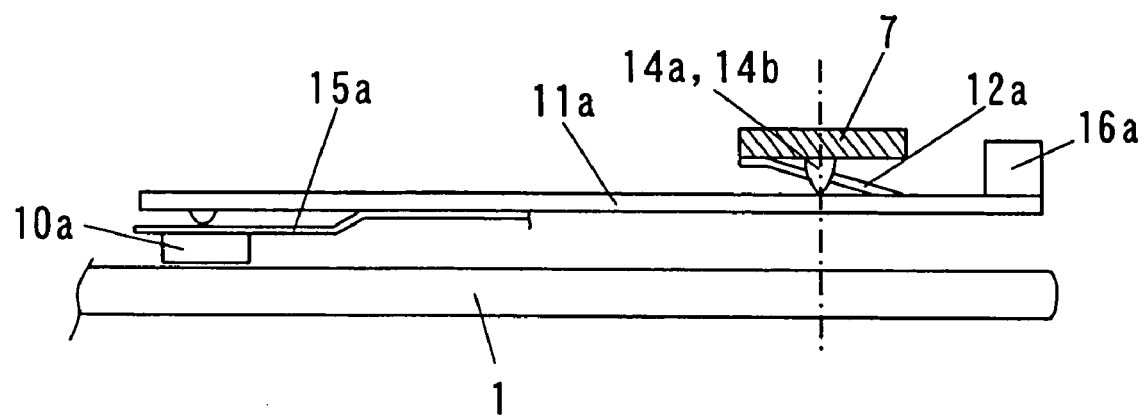
FIG. 3 is a partly enlarged side view showing a suspension out of essential components of a head support device and recording medium in the first exemplary embodiment of the present invention.

FIG. 1, FIG. 2 and FIG. 3 illustrates the head support device in the first exemplary embodiment of the present invention. FIG. 1 is a top view of essential components, showing the configuration of the head support device and recording medium in the first exemplary embodiment of the present invention. FIG. 2 is a side view of the essential components. FIG. 3 is a partly enlarged side view of a suspension out of the essential components.

In FIG. 1 and FIG. 2, recording medium 1 is rotated about rotation center 2 by means of a spindle motor (not shown). There are provided first bearing 6a and second bearing 6b respectively having first rotational center 5a and second rotational center 5b, which respectively rotate first link 3 and second link 4, on the extension of same diametric line 9 with the rotational center 2 of the recording medium 1 therebetween. The distances from the rotation center 2 to the first rotational center 5a and to the second rotational center 5b are preferable to be either identical or different from each other.

Third link 7 is connected to one side of each in same direction of the first link 3 and the second link 4 in such manner as to be rotatable about rotational center 3a and rotational center 4a, and also, fourth link 8 is connected to the other side of each of the first link 3 and the second link 4 in such manner as to be rotatable about rotational center 3b and rotational center 4b.

The respective rotational center 3a and rotational center 3b of the third link 7 and the fourth link 8 at the first link 3 are located on the diameteric line passing through the first rotational center 5a of the first bearing 6a of the first link 3, and the distances from the first rotational center 5a to the respective rotational centers 3a and 3b of the third link 7 and the fourth link 8 at the first link 3, that is, the first effective link length and the second effective link length of the first link 3, are nearly identical with each other. Similarly, the respective rotational centers 4a and 4b of the third link 7 and the fourth link 8 at the second link 4 are located on the diameteric line passing through the second rotational center 5b of the second bearing 6b of the second link 4, and the distances from the second rotational center 5b to the respective rotational centers 4a and 4b of the third link 7 and the fourth link 8 at the second link 4, that is, the first effective link length and the second effective link length of the second link 4, are nearly identical with each other. Further, the first effective link length of the first link 3 and the first effective length of the second link 4 are nearly identical with each other. Accordingly, the second effective link length of the first link 3 and the second effective link length of the second link 4 are nearly identical with each other.

Also, the distance between the rotational center 3a of the first link 3 and the rotational center 4a of the second link 4 at the third link 7 and the distance between the rotational center 3b of the first link 3 and the rotational center 4b of the second link 4 at the fourth link 8 are respectively nearly identical with the distance between the first rotational center 5a of the first link 3 and the rotational center 5b of the second link 4.

Accordingly, when one of the first link 3 and the second link 4 is rotated about the first rotational center 5a or the second rotational center 5b, the third link 7 and the fourth link 8 reciprocate in directions opposite to each other while keeping a state of being parallel with a line connecting the first rotational center 5a of the first bearing 6a of the first link 3 to the second rotational center 5b of the second bearing 6b of the second link 4 or the diametric line 9 of the recording medium 1 that passes through the first rotational center 5a of the first link 3 and the second rotational center 5b of the second link 4.

It is preferable to change the first effective link length of the first link 3 and the first effective link length of the second link 4 in order to lessen the variation of the skew angle of the head (not shown) comprising a signal conversion element (such as magnetic head) or the like with respect to the recording track.

On the other hand, respective plate spring 12a and plate spring 12b of the first suspension 11a and second suspension 11b are respectively welded on the third link 7 and the fourth link 8 by a well-known method such as spot welding, supersonic welding or laser beam welding method so that the respective lengthwise center line 13a and center line 13b of the first suspension 11a and the second suspension 11b holding the slider 10a and slider 10b respectively mounted with a head such as a magnetic head are vertical to the line that connects the first rotational center 5a to the second rotational center 5b, that is, the diametric line 9 of the recording medium 1.

Accordingly, the respective lengthwise center line 13a and center line 13b of the first suspension 11a and the second suspension 11b are respectively vertical to the lengthwise directions of the third link 7 and the fourth link 8, that is, the line connecting the rotational center 3a of the first link 3 to the rotational center 4a of the second link 4 at the third link 7 and the line connecting the rotational center 3b of the first link 3 to the rotational center 4b of the second link 4 at the fourth link 8, and the trackwidth direction of the magnetic head mounted on the slider 10a and slider 10b respectively fitted to the first suspension 11a and the second suspension 11b keeps a state of being parallel with the diametric line 9 of the recording medium 1 that passes through the first rotational center 5a and the second rotational center 5b during reciprocation.

It is also preferable to be configured in that the direction vertical to the track with direction of the magnetic head is a little slanted against the respective lengthwise center line 13a and center line 13b of the first suspension 1a and the second suspension 11b or the track width direction of the magnetic head is a little slanted by a predetermined angle against the diametric line 9 of the recording medium 1. In that case, the magnetic head reciprocates while keeping a state such that the track width direction is a little slanted against the direction parallel with the diametric line 9 of the recording medium 1.

Next, regarding the third link 7 and the fourth link 8, and the first suspension 11a and the second suspension 11b having the plate spring 12a and the plate spring 12b, the configuration will be described with reference to FIG. 1 and FIG. 3 by using the first suspension 11a as an example. At the vicinity of the plate spring 12a of the first suspension 11a, two pivots 14a and 14b are disposed in positions symmetrical to the lengthwise centerline 13a of the first suspension 11a at the first suspension 11a side of the third link 7, which is abutted on the first suspension 11a, pushing down the first suspension 11a against the elasticity of the plate spring 12a of the first suspension 1a fixed on the third link 7, and thereby, the slider 10a disposed on the first suspension 11a activates the slider 10a toward the recording medium 1 so that the slider 10a pushes the surface of the recording medium 1.

Also, balancer 16a is fitted to the end (opposite to the slider 10a side) of the first suspension 11a so that the center of total gravity in the direction of recording medium 1 of the slider 10a, its mounting member 15a (flexure comprising a ginbal mechanism), and the rotating parts (other than plate spring 12a) of the first suspension 11a and the balancer 16a passes through the line connecting the respective points of contact of the first suspension 11a being in contact with the respective peaks of two pivots 14a and 14b. The configuration of the second suspension 11b is same as that of the first suspension 11a including the balancer 16b, and the detailed description is omitted.

In the above description, an example that the peak of the pivot comes in point contact with the suspension is described, but the peak is not limited to a point, but it is preferable to have a cleat-like shape or like shape, and axial line contact is also preferable.

The driving method to move the sliders 10a and 10b mounted with heads such as magnetic heads respectively disposed on the first suspension 11a and the second suspension 11b in the radial direction on the surface of the recording medium 1 is such that voice coil 17 is connected to the first link 3 so as to rotate the first link 3 about the first rotational center 5a of the first link 3 as shown in FIG. 1 and FIG. 2.

It is configured in that the voice coil 17 is rotated about the first rotational center 5a when control current is supplied to the voice coil 17. For example, the voice coil 17 rotated in the direction of arrow 18 will be described. With the voice coil 17 rotated in the direction of arrow 18, the first link 3 is rotated about the first rotational center 5a, and the third link 7 and the fourth link 8 connected to the first link 3 respectively move in the directions of arrow 19a and arrow 19b. Accordingly, the second link 4 is rotated about the second rotational center 5b of the second link 4. As the third link 7 and the fourth link 8 respectively move in the directions of arrows 19a and 19b, the first suspension 11a and the second suspension 11b respectively fixed on the third link 7 and the fourth link 8 are moved, and thereby, the slider 10a and the slider 10b respectively fitted to the first suspension 11a and the second suspension 11b are moved.

It is preferable to configure in that the voice coil 17 is not connected to the first link 3 but to the second link 4 in such manner as to rotate about the rotational center 5b of the second link 4. Also, the method of driving the first link 3 or the second link 4 is of course preferable to be other well-known methods such as using a servo motor or the like instead of a voice coil motor.

Next, the loci of movements of the magnetic heads mounted on the slider 10a and slider 10b respectively disposed on the first suspension 11a and the second suspension 11b respectively fixed on the third link 7 and the fourth link 8 will be described in the following.

The respective lengthwise center line 13a and center line 13b of the first suspension 11a and the second suspension 11b are vertical to the respective lengthwise directions of the third link 7 and the fourth link 8. Accordingly, the loci of movements of the slider 10a and the slider 10b respectively disposed on the first suspension 11a and the second suspension 11b due to the rotation of the first link 3 are, as shown by chain line 20a and broken line 20b in FIG. 1, identical with the loci of the rotational center 3a and rotational center 3b of the first link 3 at the third link 7 and the fourth link 8 which are subscribed on the surface of the recording medium 1.

In FIG. 1 describing the configuration and operation of the head support device in the first exemplary embodiment of the present invention, the configuration is such that the rotational centers 3a, 3b, 4a, 4b of the third link 7 and the fourth link 8 connected to the first link 3 and the second link 4 are disposed at the end of each link, but in the first exemplary embodiment of the present invention, it is not necessary to limit the position to the end of each link, and it is also preferable to dispose the rotational centers 3a, 3b, 4a, 4b at positions away from the end of each link.

The skew of the magnetic head against the recording track in a head support device having the above configuration will be described with reference to FIG. 4 by using the slider 10a disposed on the first suspension 11a as an example.

Figure 4:
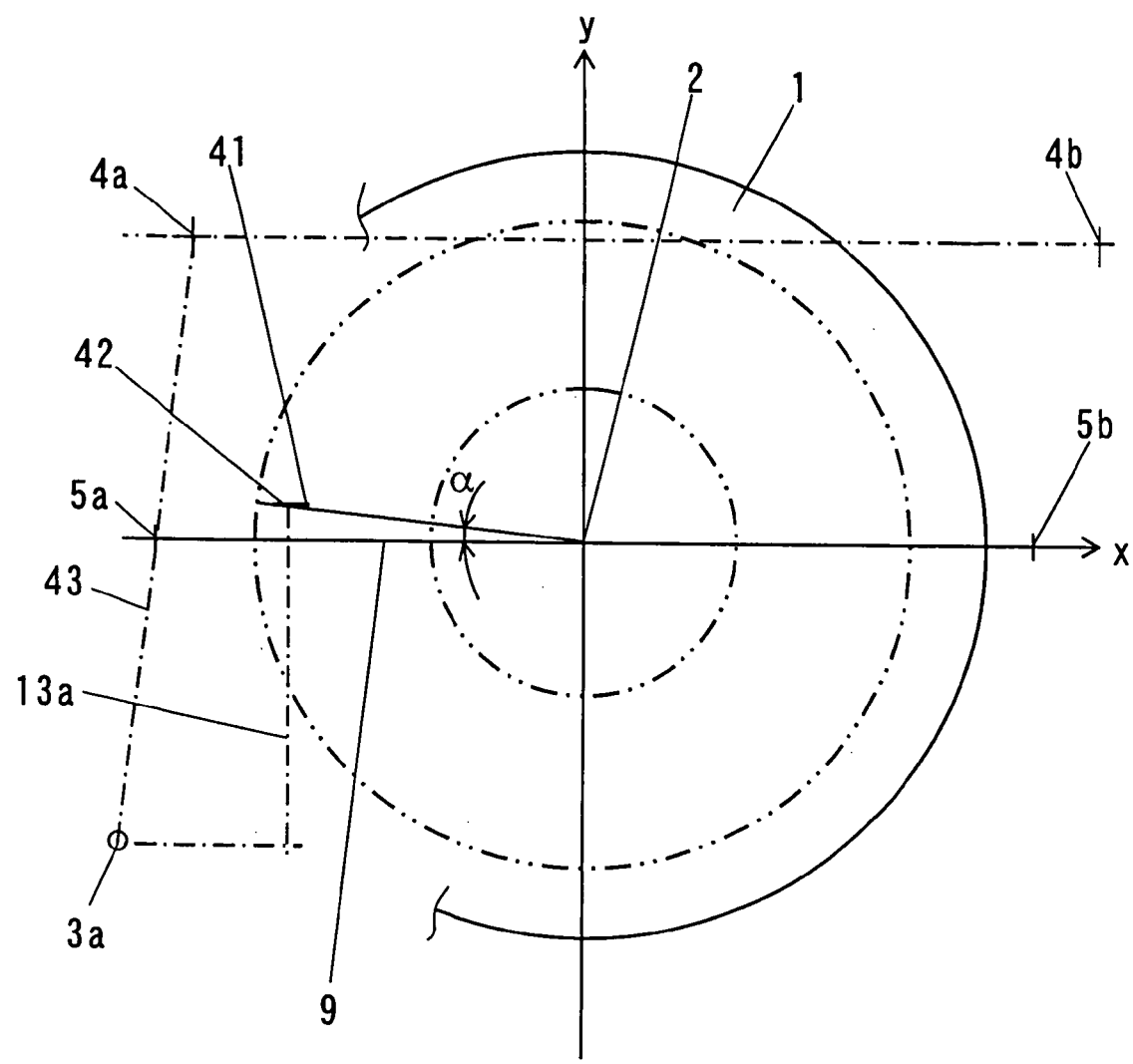
FIG. 4 is a schematic conceptual diagram for describing the skew angle of a magnetic head in the first exemplary embodiment of the present invention.

FIG. 4 is a conceptual diagram for describing the skew angle of the magnetic head (not shown) against the recording track of the recording medium 1. In FIG. 4, the track width direction of head gap 41 of the magnetic head mounted on the slider 10a is vertical to lengthwise center line 13a of the first suspension 11a, which is therefore parallel with the diametric line 9 of the recording medium 1 that passes through the first rotational center 5a and the second rotational center 5b. For example, the skew angle of the magnetic head positioned on the radial line of angle α against the diametric line 9 of the recording medium 1 is an angle in the track width direction of the head gap 41 of the magnetic head against the radial line passing through the position. Therefore, the skew angle becomes equal to the angle α. Also, the locus of center 42 of the head gap 41 of the magnetic head becomes identical with the locus of rotational center 3a of the first link 3 due to rotation of the first link 3.

The arcuate locus subscribed by the center 42 of the head gap 41 of the magnetic head is represented by x-y coordinates with rotational center 2 of recording medium 1 as origin.

When $(x_0, y_0)$=coordinates of central point of circular locus subscribed by center 42 of head gap 41;

R=distance from first rotational center 5a of first link 3 to rotational center 3a =first effective length of first link 3, then the circular locus subscribed by the center 42 of the head gap 41 of the magnetic head can be represented by the following formula (formula 1).

$$(x-x_0)^2 + (y-y_0)^2 = R_2 \quad \text{(formula 1)}$$

Therefore, skew angle α of the magnetic head on the circular locus can be obtained by the following formula (formula 2).

$$\alpha = \tan^{-1}(y/x) \quad \text{(formula 2)}$$

Accordingly, with the central point $(x_0, y_0)$ of the circle found, it is possible to calculate the skew angle α of the magnetic head on the circular locus.

The setting is to be made so that the center of slider 10a is close to a position at the innermost periphery of the recordable zone on the diametric line 9 of the recording medium 1 in order to maintain the floating amount of slider 10a at the innermost periphery of the recordable zone of the recording medium 1, the locus of slider 10a due to rotation of the first link 3 is identical with the locus of the rotational center 3a of the third link 7 at the first link 3, and the construction is to be small-sized. And taking these points into consideration, when line 43 connecting the first rotational center 5a to the rotational center 3a of the first link 3 is rotated clockwise and counterclockwise about a position vertical to the diametric line 9, the locus of slider 10a becomes an arcuate locus that is most proximate to straight line. Accordingly, the skew angle can be lessened if the locus close to the diametric line 9 is taken as the moving locus of slider 10a due to rotation of the first link 3.

Figure 5:
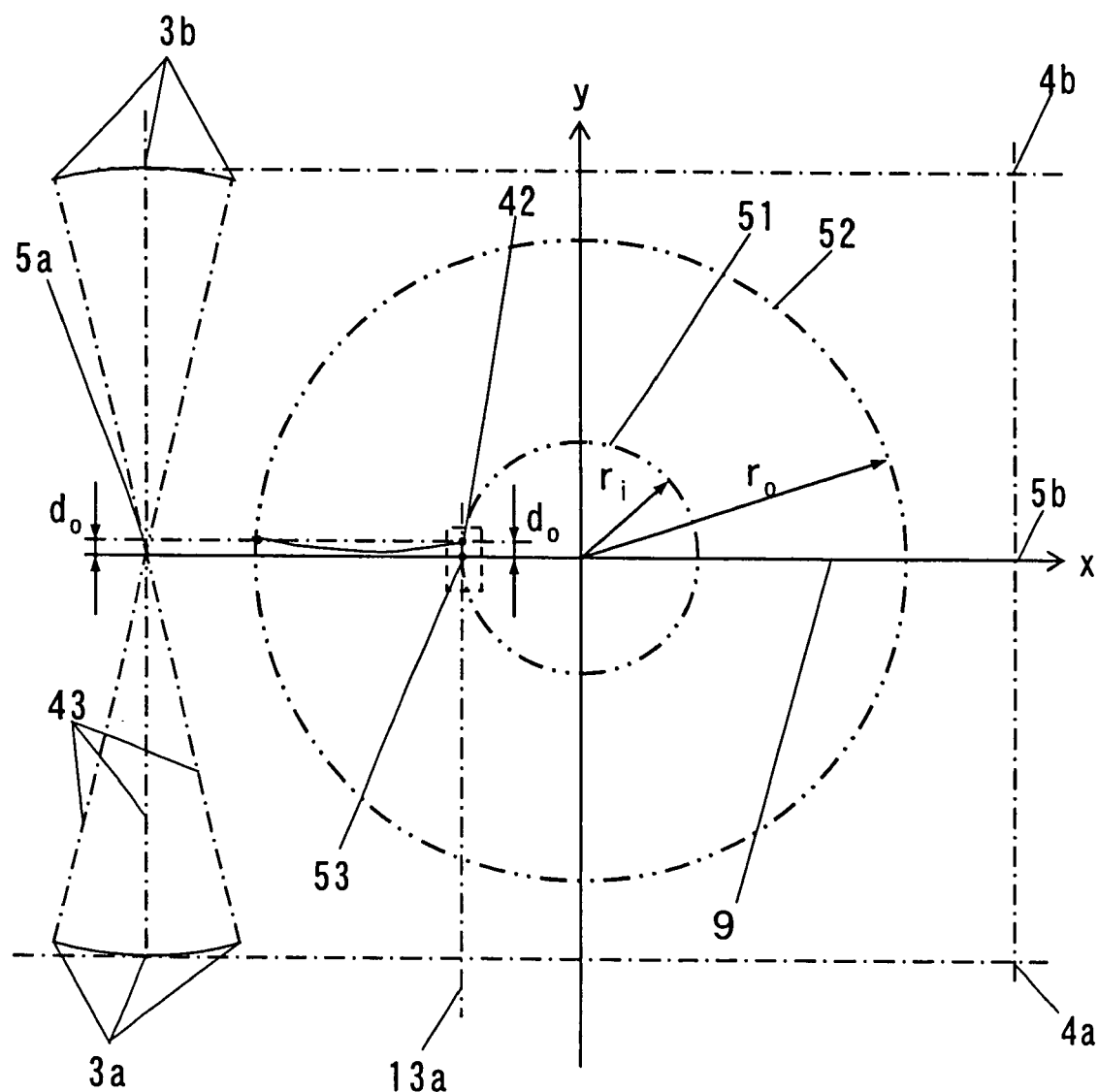
FIG. 5 is a conceptual diagram for describing position setting to lessen the skew angle of a magnetic head in the first exemplary embodiment of the present invention.

Some examples will be described in the following with respect to such position setting of the slider 10a or the magnetic head mounted on the slider 10a that makes the skew angle smaller. As example 1, regarding such case that the center of slider 10a is on the diametric line 9 of the recording medium 1 due to rotation of the first link 3 and that the center 42 of head gap 41 of the magnetic head is positioned at the innermost periphery and outermost periphery of the recordable zone of the recording medium 1, the description is given with reference to FIG. 5 that is a conceptual diagram. Here, $r_i$=radius of innermost periphery 51 of recordable zone of recording medium;

$r_o$=radius of outermost periphery of recordable zone of recording medium; and $d_0$=distance between center 53 of slider 10a and center 42 of head gap 41 of magnetic head in gap length direction (direction vertical to track width direction).

As for the center 42 of head gap 41 of the magnetic head of which the center 53 of slider 10a is on the diametric line 9 of recording medium 1 and also on the innermost periphery 51 of the recordable zone of recording medium 1, the coordinate is $(x_1, d_0)$. Then, $x_1$ can be represented by the following formula (formula 3).

$$x_1 = -\sqrt{r_i^2 - d_0^2} \quad \text{(formula 3)}$$

Also, as for the center 42 of head gap 41 of the magnetic head of which the center 53 of slider 10a is on the diametric line 9 of recording medium 1 and also on the outermost periphery 52 of the recordable zone of recording medium 1, the coordinate is $(x_2, d_0)$. Then, $x_2$ can be represented by the following formula (formula 4).

$$x_2 = -\sqrt{r_o^2 - d_0^2} \quad \text{(formula 4)}$$

Since the circular locus of center 42 of head gap 41 of the magnetic head passes through two points of the above coordinate, the coordinate of the central point of the circle can be calculated, obtaining the following formula 5 and formula 6.

$$x_0 = \frac{x_1 + x_2}{2} \quad \text{(formula 5)}$$

$$y_0 = d_0 + \sqrt{R^2 - \left(\frac{x_2 - x_1}{2}\right)^2} \quad \text{(formula 6)}$$

The skew angle α of the magnetic head being on the circular locus and in a range of $x_2 \leq x \leq x_1$ is minimum $\alpha_{amin}$ when the center 42 of head gap 41 of the magnetic head is at the innermost periphery 51 of the recordable zone, and the skew of the tangent passing through the origin against the circle is maximum $\alpha_{amax}$.

Accordingly, formula 7 can be obtained as minimum $\alpha_{amin}$.

$$\alpha_{a\min} = \tan^{-1}\frac{d_0}{-\sqrt{r_i^2 - d_0^2}} = \sin^{-1}\left(-\frac{d_0}{r_i}\right) \quad \text{(formula 7)}$$

On the other hand, the equation of a tangent against the circle passing through the origin can be represented by formula 8.

$$y = ax \quad \text{(formula 8)}$$

Since the formula 8 is a tangent against a circle that is a tangent having a smaller skew, formula 9 can be obtained.

$$a = a = \frac{-x_0 y_0 - R\sqrt{x_0^2 + y_0^2 - R^2}}{R^2 - x_0^2} \quad \text{(formula 9)}$$

Therefore, formula 10 can be obtained as maximum $\alpha_{amax}$.

$$\alpha_{amax} = \tan^{-1}\alpha \quad \text{(formula 10)}$$

Accordingly, the first suspension 11a is fixed on the third link 7, determining the length and installing position of the first suspension 11a so that the line 43 of the first link 3 is vertical to the diametric line 9, while the center line 13a in the lengthwise direction of the first suspension 11a corresponds to a line vertical to the diametric line 9 passing through position $x_0$, and also the center of the slider 10a fitted to the first suspension 11a is then positioned at the coordinate $(x_0, L_0)$. $L_0$ can be represented by formula 11.

$$L_0 = y_0 - (R + d_0) \quad \text{(formula 11)}$$

In other words, it is preferable to fix the first suspension 11a of the third link 7, determining the length and installing position of the first suspension 11a so that when the line 43 of the first link 3 is vertical to the diametric line 9 and at angle β shown in formula 12, $$\beta = \sin^{-1} \frac{\frac{(x_1 - x_2)}{2}}{R} \quad \text{(formula 12)}$$

the center 42 of head gap 41 of the magnetic head passes through the point $(x_1, d_0)$ on the innermost periphery 51 of the recordable zone of the recording medium 1, or when at angle-β shown in formula 13, $$-\beta = -\sin^{-1} \frac{\frac{(x_1 - x_2)}{2}}{R} \quad \text{(formula 13)}$$

the center 42 of head gap 41 of the magnetic head passes through the point $(x_2, d_0)$ on the outermost periphery 52 of the recordable zone of the recording medium. In that case, angle β of the line being vertical to the diametric line 9 is plus (+) in a clockwise direction and minus (−) in a counterclockwise direction.

With the angle in the track width direction of head gap 41 of the magnetic head against the radial line of the recording medium 1 that passes through the center 42 of head gap 41 of the magnetic head, that is, the skew angle of the magnetic head, encoded as being minus (−) in a counterclockwise direction and plus (+) in a clockwise direction about the center 42 of head gap 41 of the magnetic head, in case the above $\alpha_{amin}$ is the radius R of the circular locus of the center 42 of head gap 41 of the magnetic head, which satisfies the relationship shown in the following formula 14, $$-\alpha_{amax} \leq \alpha_{amin} < \alpha_{amax} \quad \text{(formula 14)}$$

then the relationship of formula 15 can be satisfied when the intersection of the innermost periphery 51 and the outermost periphery 52 of the recordable zone with the circular locus is smaller than $d_{o\ and}$ larger than 0 in the direction of y axis.

$$\alpha_{amin} = -\alpha_{amax} \quad \text{(formula 15)}$$

That is, in case the coordinates of the intersection of the innermost periphery 51 and the outermost periphery 52 of the recordable zone with the circular locus are respectively $(x_1', d_o')$ and $(x_2', d_o')$, then in the range of $d_0'$ shown in formula 16, $$0 < d_0' < d_0 \quad \text{(formula 16)}$$

there exists a circular locus of center 42 of head gap 41 of the magnetic head, which satisfies the formula 15.

Accordingly, when the locus of movement of the magnetic head is set so that the skew angle α of the magnetic head satisfies the relationship of formula 15, then the skew angle is smaller in its absolute value than the skew angle represented by the above formula 7 and formula 11.

As example 2, position setting of the slider 10a or the magnetic head which satisfies the formula 15 will be described in the following.

When the formula 15 is satisfied, in case the coordinates of positions such that the center 42 of head gap 41 of the magnetic head is at the innermost periphery 51 and the outermost periphery of the recordable zone are respectively $(X_3, d_1)$ and $(X_4, d_1)$, then the same as in the example 1, the coordinates of the central point of the circular locus of the center 42 of head gap 41 of the magnetic head can be calculated to obtain formula 17 and formula 18.

$$x_0 = \frac{x_3 + x_4}{2} \quad \text{(formula 17)}$$

$$y_0 = d_1 + \sqrt{R^2 - \left(\frac{x_4 - x_3}{2}\right)^2} \quad \text{(formula 18)}$$

Here, $X_3$ and $X_4$ can be respectively represented by formula 19 and formula 20.

$$x_3 = -\sqrt{r_i^2 - d_1^2} \quad \text{(formula 19)}$$

$$x_4 = -\sqrt{r_o^2 - d_1^2} \quad \text{(formula 20)}$$

Accordingly, the same as in the example 1, the minimum $\alpha_{amin}$ and maximum $\alpha_{amax}$ of skew angle α of the magnetic head on the circular locus of center 42 of head gap 41 of the magnetic head can be obtained by the following formula 21 and formula 22.

$$\alpha_{a\min} = \tan^{-1} \frac{d_1}{-\sqrt{r_i^2 - d_1^2}} = -\sin^{-1} \frac{d_1}{r_i} \quad \text{(formula 21)}$$

$$\alpha_{amax} = \tan^{-1} b \quad \text{(formula 22)}$$

Here, b is as shown in the following formula 23.

$$b = \frac{-x_0 y_0 - R\sqrt{(x_0^2 + y_0^2) - R^2}}{R^2 - x_0^2} \quad \text{(formula 23)}$$

Accordingly, when $d_1$ that satisfies the formula 15 is obtained, the skew angle α of the magnetic head on the circular locus of center 42 of head gap 41 of the magnetic head is smaller in its absolute value than the skew angle of the example 1.

Therefore, the same as in the example 1, the first suspension 11a is fixed on the third link 7, determining the length and installing position of the first suspension 11a so that the line 43 of the first link 3 is vertical to the diametric line 9, while the center line 13a in the lengthwise direction of the first suspension 11a corresponds to a line vertical to the diametric line 9 passing through position $x_0$ on the diametric line 9, and also the center of the slider 10a fitted to the first suspension 11a is then positioned at the coordinate $(x_0, L_1)$. Here, $L_1$ can be represented by formula 24 the same as formula 7 in the example 1.

$$L_1 = y_0 - (R + d_0) \quad \text{(formula 24)}$$

The position of center 53 of slider 10a when the center 42 of head gap 41 of the magnetic head is in a range of +d$_o$ to 0 in the direction of y axis, and similarly, the tangential direction of the rotational locus of recording medium 1 at the central point of slider 1a in a range of 0 to –d$_0$ in the direction vertical to y axis, are nearly parallel with the line connecting the center of the magnetic head to the center 53 of slider 10a. Therefore, the floating amount of the slider 10a is hardly decreased and nearly equal to the floating amount of the slider 10a when the center 42 of head gap 41 of the magnetic head is at the position of (x$_1$, d$_0$).

Figure 6:
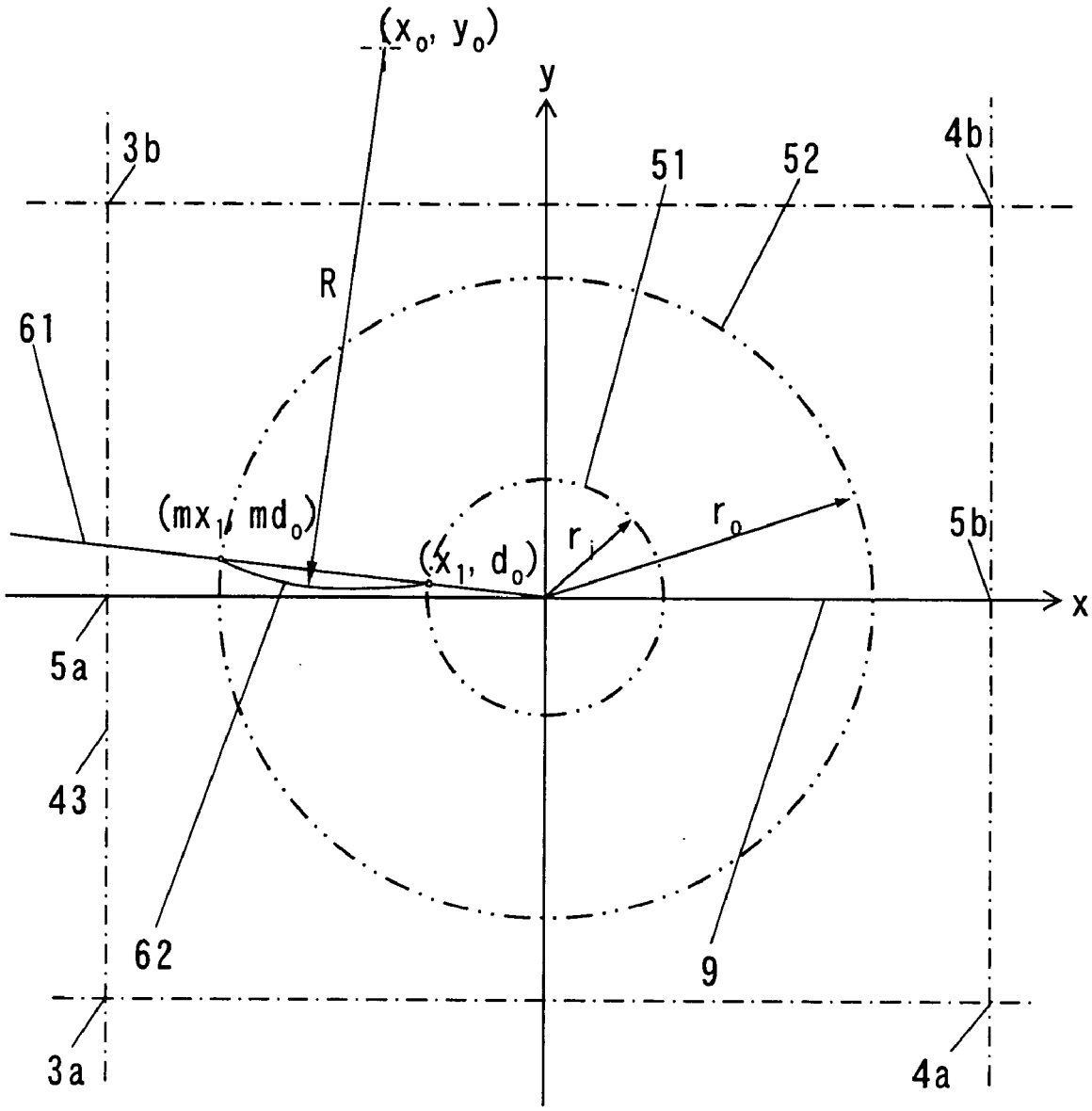
FIG. 6 is a conceptual diagram for describing another position setting to lessen the skew angle of a magnetic head in another example of the first exemplary embodiment of the present invention.

Further, when the center 42 of head gap 41 of the magnetic head is located on one radial line of the recording medium 1 at the innermost periphery 51 and the outermost periphery 52 of the recordable zone of the recording medium 1, the skew angle is further smaller than that in the example 1. Accordingly, the description will be given with reference to FIG. 6 by using the present case as example 3.

Since the center 42 of head gap 41 of the magnetic head is located on one radial line 61 of the recording medium 1 at the innermost periphery 51 and the outermost periphery 52 of the recordable zone of the recording medium 1, the locus 62 of center 42 of head gap 41 of the magnetic head passes through the coordinate (x$_1$, d$_0$) at the innermost periphery 51 of the recordable zone of the recording medium 1 the same as in the example 1, and also passes through the coordinate (mx$_1$, md$_0$) at the outermost periphery 52 of the recordable zone. Here, m stands for the ratio of $r_o$ to $r_i$ as shown in formula 25.

$$m = \frac{r_0}{r_i} \qquad \text{(formula 25)}$$

In case the circle that is the locus 62 of center 42 of head gap 41 of the magnetic head is shown by same formula as formula 1 in the example 1, then it passes through the above two points, and formula 26 and formula 27 can be obtained.

$$x_0 = \frac{-(r_i + r_o)\sqrt{r_i^2 - d_0^2} + d_0\sqrt{4R^2 - (r_i - r_o)^2}}{2r_i} \qquad \text{(formula 26)}$$

$$y_0 = \frac{d_0(r_i + r_0) + \sqrt{r_i^2 - d_0^2}\sqrt{4R^2 - (r_i - r_o)^2}}{2r_i} \qquad \text{(formula 27)}$$

The skew angle α of the magnetic head in a range of m x$_1$≦x≦x$_1$ on the circular locus 62 is minimum α$_{amin}$ when the center 42 of head gap 41 of the magnetic head is at the innermost periphery 51 and the outermost periphery 52 of the recordable zone, and the skew of the tangent passing through the origin against the circle is maximum α$_{amax}$. The values of minimum α$_{amin}$ and maximum α$_{amax}$ can be obtained in the same manner as in the example 1.

That is, the same as in the example 1, the formula 7 is obtained as the value of minimum α$_{amin}$.

The equation of the tangent against the circle passing through the origin is represented by the following formula 28.

$$y = cx \qquad \text{(formula 28)}$$

The formula 28 is the tangent against the circle, being a tangent having a skew at a smaller angle, and formula 29 can be obtained.

$$c = \frac{-x_0 y_0 - R\sqrt{(x_0^2 + y_0^2) - R^2}}{R^2 - x_0^2} \qquad \text{(formula 29)}$$

Accordingly, formula 30 is obtained as maximum α$_{amax}$.

$$\alpha_{amax} = \tan^{-1} c \qquad \text{(formula 30)}$$

Therefore, the length and installing position of the suspension 11a of the third link 7 are same as in the example 1, and the detailed description is omitted here.

Also, the same as in the example 2, setting the locus of movement of the magnetic head so as to satisfy the formula 15 as example 4, the skew angle is smaller in its absolute value than the skew angle represented by the formula 7 and formula 30. Here, the detailed description is omitted because it is same as in the example 2. Same as in the example 2, the formula 21 and formula 31 can be obtained according to the same procedure as in the example 2.

$$\alpha_{amax} = \tan^{-1} d \qquad \text{(formula 31)}$$

Here, d is as shown in the following formula 32.

$$d = \frac{-x_0 y_0 - R\sqrt{(x_0^2 + y_0^2) - R^2}}{R^2 - x_0^2} \qquad \text{(formula 32)}$$

Accordingly, same as in the example 2, obtain d$_1$ that satisfies the formula 15, then the skew angle Alpha of the magnetic head on the circular locus of center 42 of head gap 41 of the magnetic head is smaller than the skew angle in the example 3. Also, as for positioning or the like to fix the first suspension 11a on the third link 7, it is the same as in the example 2, and the description is omitted here.

Next, same values except R as in the conventional example are put into the equation to obtain the skew angles in the example 1 to example 4.

The values of maximum α$_{amax}$ and minimum α$_{amin}$ of skew angles obtained when r$_i$=4 mm
r$_o$=8.45 mm
d$_0$=0.6 mm
R=8 mm are shown in Table 1 together with the set positions of skew angle, central point of circular locus and center 53 of slider 10a.

TABLE 1

| | Example 1 | Example 2 | Example 3 | Example 4 | Conventional example |
|---|---|---|---|---|---|
| α$_{amax}$ | −2.937° | 1.747° | −5.623° | 1.502° | 18.183° |
| α$_{amin}$ | −8.627° | −1.747° | −8.627° | −1.502° | 8.627° |
| α$_{amax}$ − α$_{amin}$ | 5.690° | 3.494° | 3.004° | 3.004° | 9.556° |
| x$_0$ | −6.050 | −6.193 | −5.002 | −6.021 | −3.955 |
| y$_0$ | 8.321 | 7.815 | 8.531 | 7.845 | −13 |
| L$_0$ or L$_1$ | −0.279 | −0.785 | −0.069 | 0.755 | — |

In the case of a head support device having such a configuration, since the first suspension 11a and the second suspension 11b respectively fixed on the third link 7 and the fourth link 8 are configured in nearly line symmetrical fashion with respect to the axis of rotational center 2 of recording medium 1, making the setting so that the total weight of the third link 7 with the first suspension 11$a$ fixed thereon is nearly equal to the total weight of the fourth link 8 with the second suspension 11$b$ fixed thereon and that the gravity centers of the first link 3 and the second link 4 which respectively move the third link 7 and the fourth link 8 are respectively located on the first rotational center 5$a$ and the second rotational center 5$b$, the whole head support device is balanced in weight (gravity center), and therefore, it is possible to realize strong impact resistance against external impact and the like. Further, setting the azimuth angles of the magnetic heads of the slider 10$a$ and the slider 10$b$ respectively disposed on the first suspension 1$a$ and the second suspension 11$b$ to different angles, and recording by the recording head mounted on the slider 10$b$ of different azimuth angle between the recording tracks recorded by the magnetic head mounted on the slider 10$a$, it is possible to make it hard to read signals on adjacent recording tracks and to make the recording track pitch very small, and as a result, the recording density can be improved.

Using the head support device in the first exemplary embodiment in a disk drivel, it is possible to improve the head positioning control characteristics and to realize a disk drive improved in reliability.

Figure 7A:
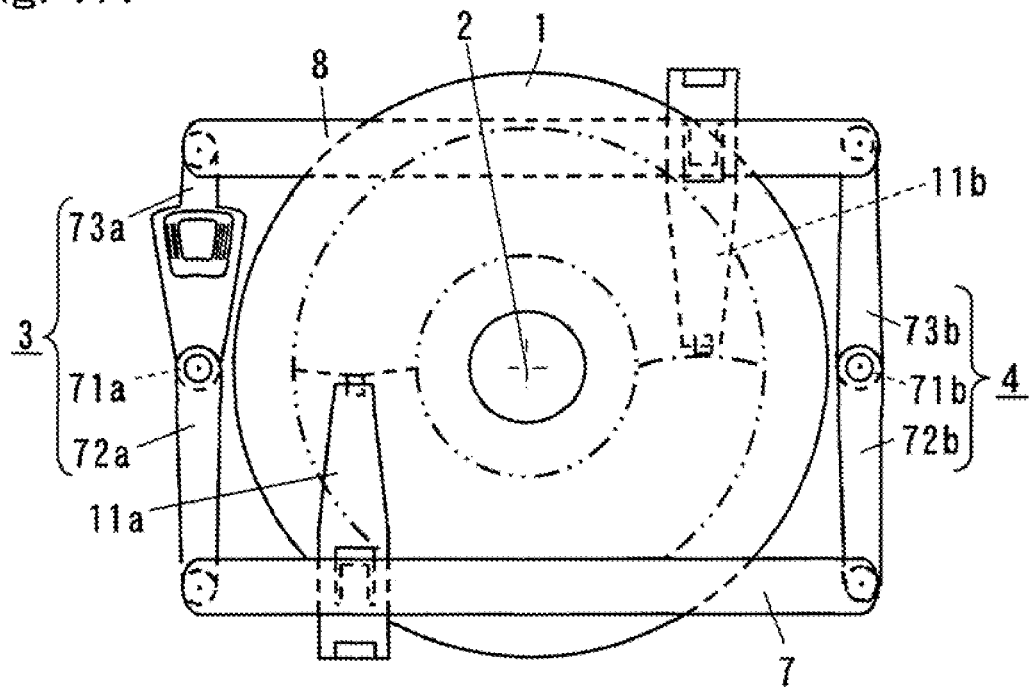
FIG. 7A is a schematic top view showing the configuration of essential components in another example of a head support device and recording medium in the first exemplary embodiment of the present invention.
Figure 7B:
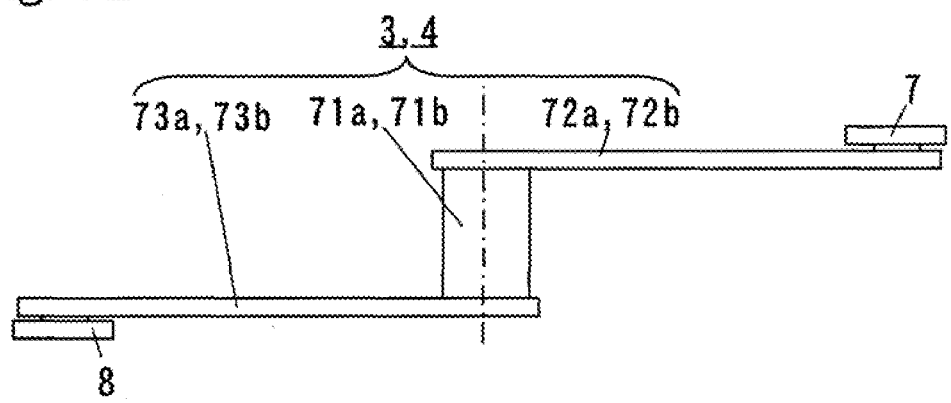
FIG. 7B is a schematic side view showing the positional relations of respective links in FIG. 7A.
Figure 7C:
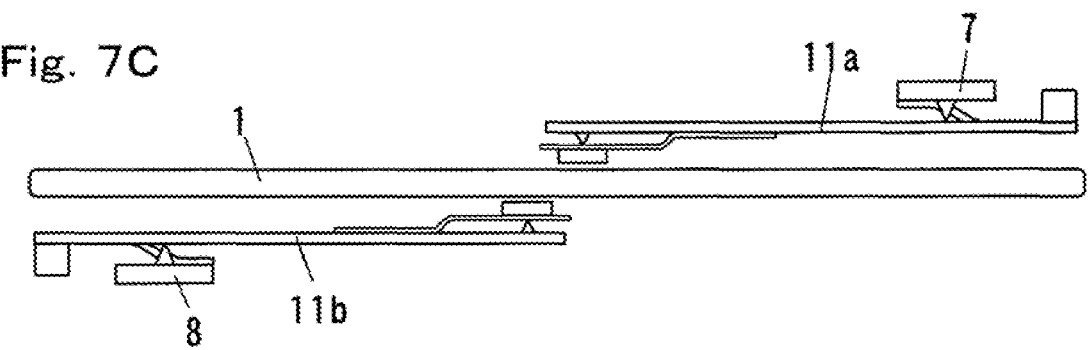
FIG. 7C is a schematic side view showing the respective positional relations of two suspensions in FIG. 7A.

In the case of the above head support device, the first suspension 11$a$ and the second suspension 11$b$ are configured at same side of either the topside and underside of the recording medium 1 so that the suspensions are disposed in line symmetrical fashion with respect to the axis of rotational center 2 of the recording medium 1, but it is also preferable to configure the suspensions so as to vertically hold the recording medium 1 therebetween. Another example in the first exemplary embodiment shown in FIG. 7A to FIG. 7C will be described in the following. FIG. 7A is a top view showing the configuration of essential components. FIG. 7B is a schematic side view showing the positional relations with respect to the respective links. FIG. 7C is a schematic side view showing the positional relations of the respective suspensions. In FIG. 7A and FIG. 7B, on one end of the first rotary bearing boss 71$a$ is fixed the first upper link lever 72$a$ connected to the third link 7, and on the other end thereof is fixed the first lowering lever 73$a$ connected to the fourth link 8, thereby comprising the first link 3 in FIG. 1 of the first exemplary embodiment, and similarly, on one end of the second rotary bearing boss 71$b$ is fixed the second upper link lever 72$b$ connected to the third link 7, and on the other end thereof is fixed the second lowering lever 73$b$ connected to the fourth link 8, thereby comprising the second link 4 in FIG. 1 of the first exemplary embodiment.

And, as shown in the schematic side view showing the positional relations of the recording medium 1 and the two suspensions in FIG. 7C, it is also preferable to be configured in that the first suspension 11$a$ fixed on the third link 7 corresponds to the recording medium layer formed on the topside of the recording medium 1 and that the second suspension 11$b$ fixed on the fourth link 8 corresponds to the recording medium layer formed on the underside of the recording medium 1. In this case, the second suspension 11$b$ is in point symmetrical relation with the first suspension 11$a$ with respect to the midpoint in the direction of the rotational axis of the recording medium 1 on the axis of rotational center 2 of the recording medium 1.

In such a configuration, the magnetic heads connected to the respective suspensions cover the topside and the underside of the recording medium 1, thereby enabling recording on both sides of the recording medium and bringing about an effect of increasing the recording capacity. Also, same as in such case that the magnetic heads connected to the respective suspensions in the above description are located at one side out of the topside and underside of the recording medium, the head support device is balanced in weight, and as a result, it is possible to realize a configuration having strong impact resistance against external impact and the like.

As describe above, according to the first exemplary embodiment of the present invention, the locus of moving to the recording medium layer of a slider mounted with a signal conversion element (such as a magnetic head) for recording and reproducing on the recording medium is nearly linear, causing the skew of the recording track to become very small as compared with a conventional one, and even when the mode is shifted from reproducing to recording, the positioning accuracy of the recording head is not lowered, and also, the deflection of the initialized circumferential direction of the recording medium from the direction of magnetic orientation is less, not deteriorating the recording characteristics, and it is possible to realize a head support device of excellent reliability.

Also, it is configured in that each suspension to which a slider mounted with a signal conversion element of the head is connected corresponds to one of the topside and underside of the recording medium, making the azimuth angles of signal conversion elements different from each other, and thereby, it is possible to make the recording track pitch very small and, consequently, to achieve the purpose of obtaining high recording density.

Also, since each suspension to which a slider mounted with a signal conversion element of the head is connected corresponds to each side of the topside and underside of the recording medium, it is possible to record on both sides of the recording medium and to obtain the effect of increasing the recording capacity.

Further, making the setting so that the total weight of the third link is nearly equal to the total weight of the fourth link, and the gravity centers of the first link and the second link respectively correspond to the first rotational center and the second rotational center, the whole head support device is balanced in gravity center, and therefore, it is possible to realize strong impact resistance against external impact and the like.

Accordingly, a disk drive provided with a head support device having such a configuration is capable of realizing high recording density or high recording capacity, and it is possible to improve the head positioning characteristics and reliability.

Second Exemplary Embodiment (Second Exemplary Embodiment)

Figure 8:
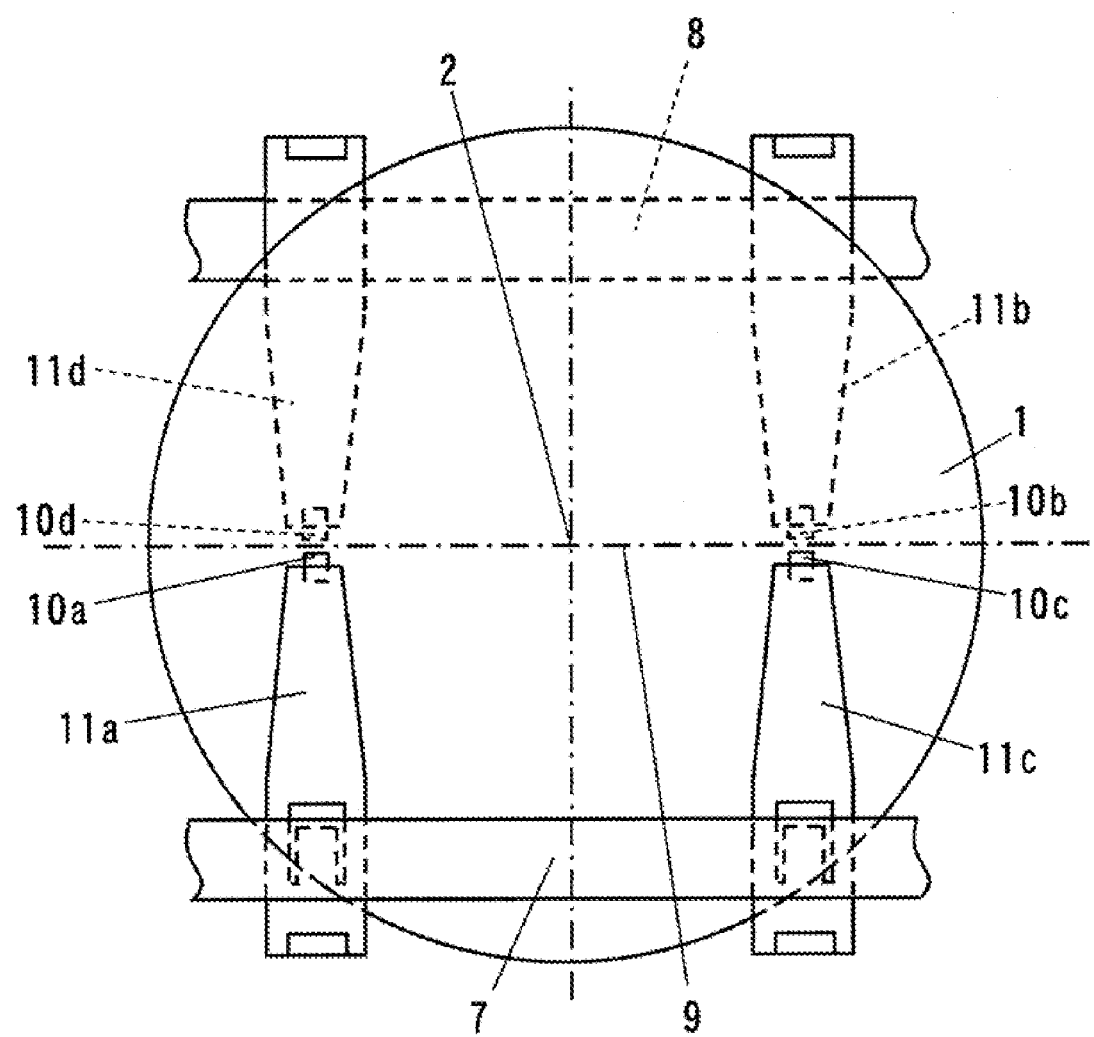
FIG. 8 is a schematic top view showing the configuration of essential components of a head support device having four suspensions in the second exemplary embodiment of the present invention.
Figure 9:
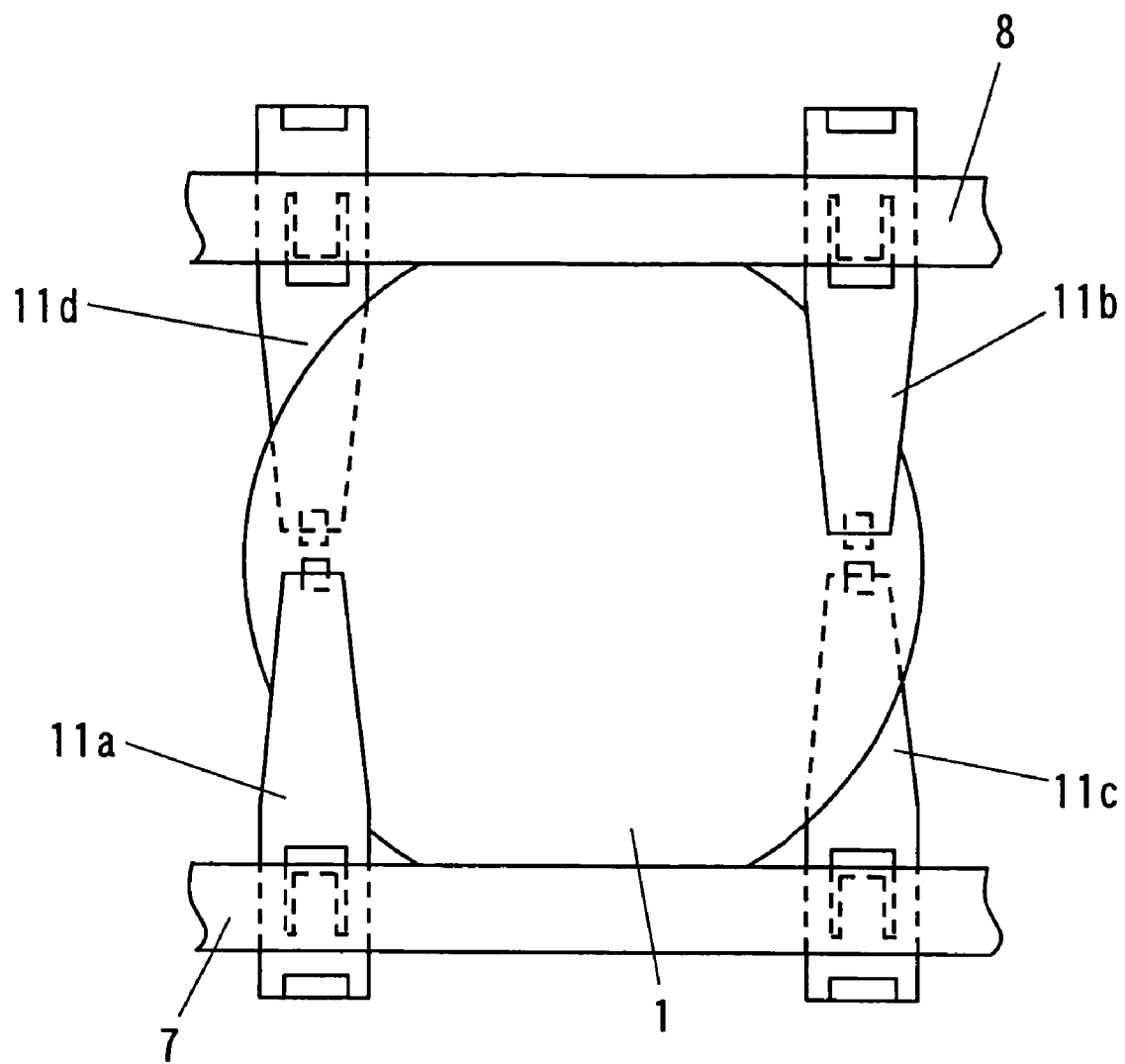
FIG. 9 is a schematic top view showing the configuration of essential components in another example of a head support device having four suspensions in the second exemplary embodiment of the present invention.

FIG. 8 and FIG. 9 are diagrams for describing a head support device in the second exemplary embodiment of the present invention. FIG. 8 is a schematic top view showing the positional relations of the third link and the fourth link of the head support device having four suspensions in the second exemplary embodiment, and the fixed suspensions and the recording medium. FIG. 9 is a schematic top view showing another example of positioning of suspensions. In FIG. 8 and FIG. 9, the elements corresponding to the component elements in FIG. 1 of the first exemplary embodiment are given same reference numerals as those in FIG. 1.

As shown in FIG. 8 and FIG. 9, the first suspension 11$a$ and the third suspension 11$c$ are fixed on the third link 7, while the second suspension 11$b$ and the fourth suspension 11$d$ are fixed on the fourth link 8. In the slider 10$a$ to slider 10$d$ respectively connected to the first suspension 11$a$ to the fourth suspension 11d via fitting member (flexure comprising ginbal mechanism, not shown), the slider 10a to slider 10d are respectively fitted on the first suspension 11a to fourth suspension 11d in such manner that the directions toward the respective centers of the signal conversion elements (such as magnetic heads, not shown) from the respective centers of the slider 10a to slider 10d correspond to the rotating direction of the recording medium 1.

As shown in FIG. 8, the first suspension 11a and the third suspension 11c fixed on the third link 7 correspond to one side out of the topside and underside of the recording medium 1, and the second suspension 11b and the fourth suspension 11d fixed on the fourth link 8 correspond to the other side of the recording medium 1.

In this case, the positional relations of the centers of the magnetic heads mounted on the slider 10a to slider 10d connected to the respective suspensions, with respect to the first suspension 11a and the second suspension 11b, are same as in FIG. 7A in the first exemplary embodiment. Further, regarding the positional relations of the center of the magnetic head connected to the third suspension 11c against the center of the magnetic head connected to the first suspension 11a, and of the center of the magnetic head connected to the fourth suspension 11d against the center of the magnetic head connected to the second suspension 11b, when the line connecting the rotational center 3a to the rotational center 3b of the first link 3 and the line connecting the rotational center 4a to the rotational center 4b of the second link 4 are nearly vertical to the diametric line 9, the respective centers are in symmetrical positions with respect to a plane vertical to the diametric line 9 including the axis of rotational center 2.

In such a configuration, making the setting so that the magnetic heads connected to the suspensions are arranged the same as in the example 1 and example 2 in the first exemplary embodiment, the locus of movement toward the recording medium layer of the slider 10a to slider 10d mounted with signal conversion element (such as magnetic head) for recording or reproducing on the recording medium 1 becomes nearly linear and the skew angle of the recording track is very small, the same as in the first exemplary embodiment.

Also, when the setting is made so that the magnetic heads connected to the suspensions are arranged the same as in the example 3 and the example 4 in the first exemplary embodiment, it is preferable to set the first suspension and the second suspension in such manner that the magnetic heads are arranged the same as in the example 3 and the example 4 in the first exemplary embodiment, but the locus subscribed by each magnetic head connected to the third suspension and the fourth suspension is arcuately projected in same direction as the locus of each magnetic head connected to the first suspension and the second suspension, and also, the loci are identical in shape with each other, and therefore, it is necessary to make the arrangement so that the skew angles of the respective magnetic heads connected to the third suspension and the fourth suspension are nearly equal to the maximum value and the minimum value of the skew angles of the respective magnetic heads connected to the first suspension and the second suspension.

Incidentally, the line connecting the rotational center 3a to the rotational center 3b at the first link 3 and the line connecting the rotational center 4a to the rotational center 4b at the second link 4 are not always required to be nearly vertical to the diametric line 9, but the lines are preferable to be at a predetermined angle against the diametric line 9. Also, regarding the positional relations of the centers of respective magnetic heads connected to the third suspension 11c against the first suspension 11a or the positional relations of the centers of respective magnetic heads connected to the fourth suspension 1d against the second suspension 11b, at least one of the positional relations is preferable to be such that the centers are in symmetrical positions with respect to the plane vertical to the diametric line 9 including the axis of rotational center 2.

In such a configuration, it is possible to record on both sides of the recording medium 1 and to increase the recording capacity. Also, the azimuth angles of the magnetic heads corresponding to same plane of the recording medium 1 are different from each other, thereby enabling the realization of high recording density, the same as in the first exemplary embodiment.

Also, as shown in FIG. 9, it is preferable to be configured in that the first suspension 11a and the third suspension 11c are fixed on the third link 7 comprising two links of upper link and lower link (not shown) in correspondence with the topside and underside of the recording medium 1, and similarly, the second suspension 11b and the fourth suspension 11d are fixed on the fourth link 8 comprising two links in correspondence with the topside and underside of the recording medium 1. Regarding the method of arranging in tiers the first suspension 11a and the third suspension 11c, and the second suspension 11b and the fourth suspension 11d in the axial direction of the rotational center of the recording medium 1 in correspondence with the topside and underside of the recording medium 1, it is preferable to employ a method of using spacer members or the first link 3 with upper link and lower link fixed on the top and bottom ends of an U-shaped channel-like member or rotary bearing boss as the first link, fitting two third links respectively on the upper and lower links in rotatable fashion, and to fix the first suspension 11a and the third suspension 11c respectively on the third links in correspondence with the topside and underside of the recording medium 1, and it is possible to arrange them in tiers by other well-known method.

In this configuration, the positional relations of the first suspension 11a and the second suspension 11b are same as in FIG. 1 in the first exemplary embodiment. Further, the positional relations of the center of the magnetic head connected to the third suspension 11c against the center of the magnetic head (not shown) connected to the first suspension 11a, and the center of the magnetic head connected to the fourth suspension 11d against the magnetic head connected to the second suspension 11b are such that the line connecting the rotational center 3a to the rotational center 3b of the third link 7 and the fourth link 8 passing through the first rotational center 5a of the first link 3, and the line connecting the rotational center 4a to the rotational center 4b of the third link 7 and the fourth link 8 passing through the second rotational center 5b of the second link 4 are, in a state of nearly vertical to the diametric line 9, passing through the midpoint in the direction of rotational axis on the axis of rotational center 2 of the recording medium 1 and also symmetrical in relation to the lines respectively vertical to the axis of rotational center 2 and the diametric line 9.

Incidentally, the line connecting the rotational center 3a to the rotational center 3b at the first link 3 and the line connecting the rotational center 4a to the rotational center 4b at the second link 4 are not always required to be nearly vertical to the diametric line 9, but the lines are preferable to be at a predetermined angle against the diametric line 9. Also, regarding the positional relations of the centers of respective magnetic heads connected to the third suspension 11c against the first suspension 11a or the positional relations of the centers of respective magnetic heads connected to the fourth suspension 11d against the second suspension 11b, at least one of the positional relations is preferable to be such that the centers pass through the midpoint in the direction of rotational axis on the axis of rotational center 2 of the recording medium 1 and are symmetrical in relation to the line respectively vertical to the axis of rotational center 2 and the diametric line 9.

Even in the case of such configuration, it is possible to record on both sides of the recording medium and to increase the recording capacity. Also, the azimuth angles of the two magnetic heads corresponding to same plane of the recording medium are different from each other, thereby enabling the realization of high recording density, the same as in the first exemplary embodiment.

Also, the same as in the first exemplary embodiment, making the setting so that the total weight of the third link 7 with the first suspension 11a and the third suspension 11c fixed thereon is nearly equal to the total weight of the fourth link 8 with the second suspension 11b and the fourth suspension 11d fixed thereon and that the gravity centers of the first link 3 and the second link 4 which respectively move the third link 7 and the fourth link 8 are respectively located on the first rotational center 5a and the second rotational center 5b, the whole head support device is balanced in weight (gravity center), and therefore, it is possible to realize strong impact resistance against external impact and the like.

As described above, according to the second exemplary embodiment, the same as in the first exemplary embodiment, the skew of the recording track is very small, and the positioning accuracy of the recording head is not lowered when the mode is shifted, and the recording characteristic is not deteriorated, and it is possible to realize a head support device of high reliability. Further, the suspensions to which the sliders mounted with a signal conversion element are connected respectively correspond to the topside and the underside of the recording medium, and thereby, it is possible to record on both sides of the recording medium and to realize a large recording capacity. Also, the azimuth angles of two magnetic heads corresponding to same plane of the recording medium are different from each other, enabling the realization of high recording density. Also, it is possible to realize high impact resistance against external impact and the like.

Accordingly, a disk drive provided with a head support device having such a configuration is capable of enhancing the head positioning control characteristic and to improve the reliability.

Third Exemplary Embodiment (Third Exemplary Embodiment)

Figure 10:
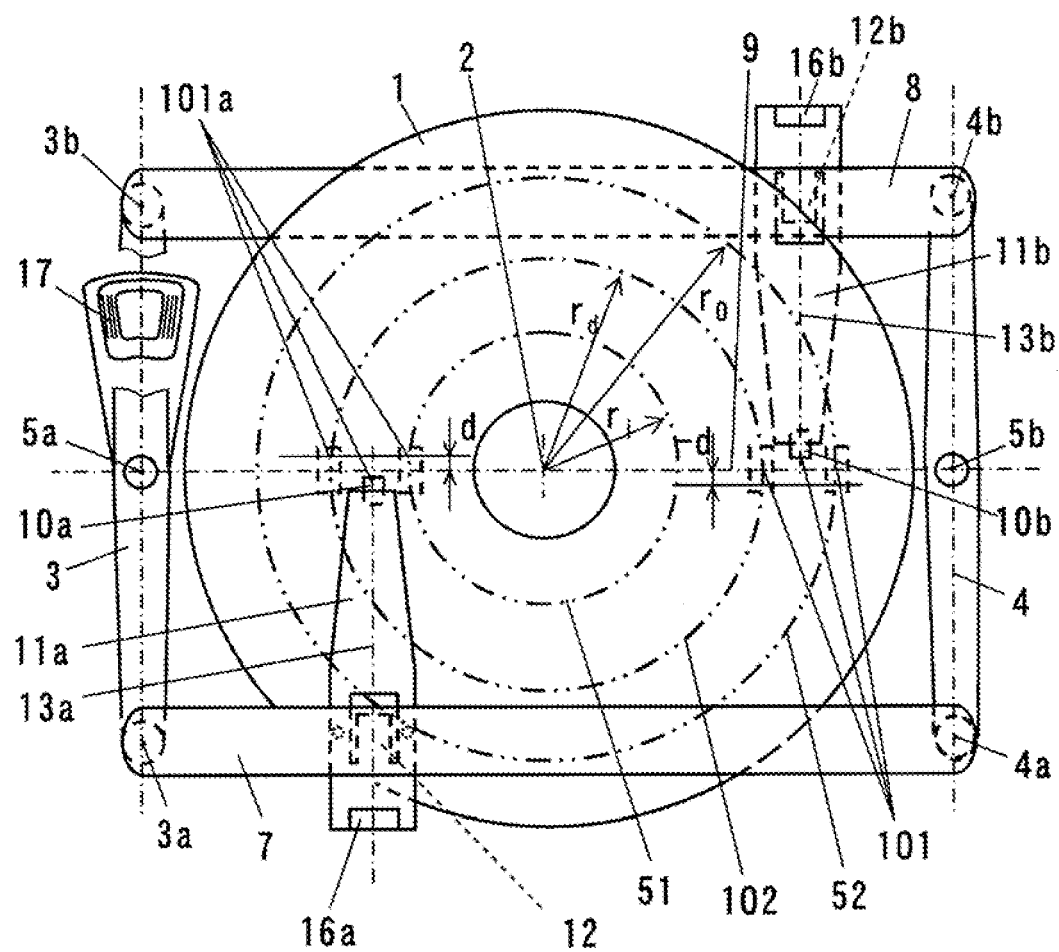
FIG. 10 is a top view showing the configuration of essential components of a head support device and recording medium in the third exemplary embodiment of the present invention.

FIG. 10 is a top view showing the configuration of essential components of the head support device and the recording medium, describing the head support device in the third exemplary embodiment of the present invention. In FIG. 10, the elements that correspond to the component elements in FIG. 1 in the first exemplary embodiment are given same reference numerals.

In FIG. 10, the main difference of the third exemplary embodiment from the first exemplary embodiment with respect to the configuration is that the recordable zone of the recording medium 1 is radially divided into two zones, and the separate two zones are arranged so as to respectively correspond to the first suspension 11a and the second suspension 11b.

In such a configuration, the magnetic heads respectively connected to the first suspension 11a and the second suspension 11b may cover the whole of the recordable zone of the recording medium 1. Further, the rotational angle of the first link 3 for covering the whole of the recordable zone of the recording medium 1 is nearly one half (½) of the rotational angle of the first link 3 in the first exemplary embodiment, and the loci against the recording medium 1 of the magnetic heads respectively connected to the first suspension 11a and the second suspension 11b are further nearly linear, and the skew angle against the recording track is very small.

The positional relation of the first suspension 11a and the second suspension 11b will be briefly described with reference to FIG. 10.

For example, it is configured in that the magnetic head (not shown) connected to the first suspension 11a covers a zone at the inner periphery of the recordable zone divided into two zones and the magnetic head connected to the second suspension 11b covers a zone at the outer periphery of the recordable zone divided into two zones, and thereby, the whole of the recordable zone is covered by the two magnetic heads. The other configuration is same as in the first exemplary embodiment, and the detailed description is omitted here, and only the differences will be outlined in the following.

As shown in FIG. 10, the magnetic head connected to the first suspension 11a and the magnetic head connected to the second suspension 11b are respectively disposed on either side of the rotational center 2 of the recording medium 1 in such manner as to have the rotational center 2 of the recording medium 1 therebetween. And, the setting is made so that when rotational center 101a of the magnetic head connected to the first suspension 11a is at distance d in a direction vertical to the diametric line 9 of the recording medium 1 and also on innermost periphery 51 of the recordable zone, rotational center 101b of the magnetic head connected to the second suspension 11b is at distance −d (minus (−) stands for the opposite direction of the center 110a of magnetic head against the diametric line 9) vertical to the diametric line 9 of the recording medium 1 in the opposite direction of the center 110a of the magnetic head with the diametric line 9 therebetween and also on the separate periphery 102 of the first suspension 11a. Further, it is configured in that when the center 101a of the magnetic head of the first suspension 11a is at distance d in a direction vertical to the diametric line 9 and also on separation periphery 102 for radially dividing the recordable zone into two zones, the center 101b of the magnetic head of the second suspension 11b is at distance −d vertical to the diametric line 9 and also on the outermost periphery 52 of the recordable zone. It is of course preferable to be configured in that the magnetic head connected to the first suspension 11a covers the outer periphery side of the recordable zone divided into two zones and that the magnetic head connected to the second suspension 11b covers the inner periphery side of the recordable zone.

The loci subscribed by the centers 110a and 101b of magnetic heads respectively connected to the first suspension 11a and the second suspension 11b arranged in this way are circularly arc-shaped and vertically reverse to each other.

The skew of the magnetic head against the recording track in the head support device having such a configuration will be described in the following. The same as in the first exemplary embodiment, in order to maintain the floating amount of the sliders 10a, 10b at the innermost periphery 51 of the recordable zone of the recording medium 1, the centers of sliders 10a, 10b are close to the diametric line 9 of the recording medium 1 at the innermost periphery 51 of the recordable zone, that is, $d=d_0$ in the description.

With respect to the magnetic heads mounted on the slider 10a and the slider 10b respectively connected to the first suspension 11a and the second suspension 11b, the radius of the separation periphery 102 of the recordable zone divided into two zones covered by the respective magnetic heads will be described in the following.

The center 101a and center 101b of head gaps of the magnetic heads respectively mounted on the slider 10a and the slider 10b subscribe same loci as the respective rotational loci of the rotational center 3a and the rotational center 3b of the first link 3, while the center 101a of head gap of the magnetic head of the slider 10a moves between the innermost periphery 51 and the separation periphery 102 of the recordable zone, and also, the center 101b of head gap of the magnetic head of the slider 10b moves between the separation periphery 102 and the outermost periphery 52 of the recordable zone. Therefore, the circularly arc-shaped loci subscribed by the center 101a and center 101b of the respective magnetic heads are same in length in the direction of x.

Accordingly, when the radius of separation periphery 102 of the recordable zone of the recording medium 1 is rd, and the other marks are same as those used in the first exemplary embodiment, then formula 33 can be established to obtain formula 34 because the lengths are same in the direction of x.

$$\sqrt{r_d^2-d_0^2}-\sqrt{r_i^2-d_0^2}=\sqrt{r_o^2-d_0^2}-\sqrt{r_d^2-d_0^2} \quad \text{(formula 33)}$$

$$r_d = \frac{\sqrt{r_o^2 + r_i^2 + 2d_0^2 + 2\sqrt{r_o^2 - d_0^2}\sqrt{r_i^2 - d_0^2}}}{2} \quad \text{(formula 34)}$$

Skew angle $\alpha_a$ of the magnetic head of the first suspension 11a can be obtained by replacing $r_o$ with $r_d$ in the first exemplary embodiment. Similarly, skew angle $\alpha_b$ Of the magnetic head of the second suspension 11b can be obtained by replacing $r_i$ with $r_d$.

The central points $(x_{21}, Y_{21})$ of the circularly arc-shaped locus of the center 101a of the magnetic head connected to the first suspension 11a become as represented by formula 35 and formula 36, from formula 3 and formula 4 in the first exemplary embodiment.

$$x_{21} = \frac{-\sqrt{r_i^2 - d_0^2} + \left(-\sqrt{r_d^2 - d_0^2}\right)}{2} \quad \text{(formula 35)}$$

$$y_{21} = d_0 + \sqrt{R^2 - \left(\frac{\sqrt{r_d^2 - d_0^2} - \sqrt{r_i^2 - d_0^2}}{2}\right)^2} \quad \text{(formula 36)}$$

Accordingly, the formula 6 can be obtained as the minimum $\alpha_{amin}$ of skew angle $\alpha_a$ of the magnetic head connected to the first suspension 11a, and the maximum $\alpha_{amax}$ as in formula 37 can be obtained by replacing $x_0$ and $y_0$ of the formula 9 and the formula 10 by $x_{21}$ and $y_{21}$ of the formula 35 and the formula 36 above mentioned.

$$\alpha_{amax} = \tan^{-1} \frac{-x_{21}y_{21} - R\sqrt{x_{21}^2 + y_{21}^2 - R^2}}{R^2 - x_{21}^2} \quad \text{(formula 37)}$$

Also, the x-coordinate $x_{22}$ of coordinates $(x_{22}, y_{22})$ of the central point of the circularly arc-shaped locus of center 101b of the magnetic head of the second suspension 11b becomes as represented by formula 38, from the formula 3 and the formula 4 in the first exemplary embodiment.

$$x_{22} = \frac{\sqrt{r_d^2 - d_0^2} + \sqrt{r_o^2 - d_0^2}}{2} \quad \text{(formula 38)}$$

Also, y-coordinate $y_{22}$ is as follows:

$$y_{22} = -y_{21}$$

Then, as to the skew angle $\alpha_b$ of the magnetic head of the second suspension 11b, the skew of tangent passing through the origin against the circular locus becomes maximum $\alpha_{bmax}$, and it becomes minimum $\alpha_{bmin}$ when the center 101b of head gap of the magnetic head is at the separation periphery 102 of the recordable zone.

As the maximum $\alpha_{bmax}$, formula 39 can be obtained by using the coordinates $(x_{32}, y_{32})$ of the central point of the circularly arc-shaped locus of the center 101b of the magnetic head of the second suspension 11b because of being the tangent against the circular locus of the center 101b of the magnetic head.

$$\alpha_{bmax} = \tan^{-1} \frac{-x_{22}y_{22} - R\sqrt{x_{22}^2 + y_{22}^2 - R^2}}{R^2 - x_{22}^2} \quad \text{(formula 39)}$$

The minimum $\alpha_{bmin}$ becomes as represented by formula 40 because the center 101b of head gap of the magnetic head is located at the separation periphery 102 of the recordable zone.

$$\alpha_{bmin} = \tan^{-1} \frac{-d_0}{\sqrt{r_d^2 - d_0^2}} \quad \text{(formula 40)}$$

The lengths and the fitting positions of the first suspension 11a and the second suspension 11b are same as in the first exemplary embodiment, and the detailed description is omitted, but the line connecting the first rotational center 5a of the first link 3 to the third rotational center 3a of the third link 7 being vertical to the diametric line 9, the first suspension 11a is fixed on the third link 7, while the second suspension 11b is fixed on the fourth link 8, so that the centers of the slider 10a and slider 10b respectively fitted to the first suspension 11a and the second suspension 11b are respectively positioned at the coordinates $(x_{21}, L_{21})$ and coordinates $(x_{22}, L_{22})$. Here, $L_{21}$ can be represented by formula 41 the same as formula 11 in the first exemplary embodiment, and $L_{22}$ can be represented by formula 42.

$$L_{21} = y_{21} - (R + d_0) \quad \text{(formula 41)}$$

$$L_{22} = y_{22} + (R + d_0) \quad \text{(formula 42)}$$

Also, the same as example 2 in the first exemplary embodiment, with the magnetic head of the first suspension 11a configured so as to satisfy the formula 15, the skew angles of the magnetic heads of the first suspension 11a and the second suspension 11b become further smaller values.

Then, the coordinates of the centers of the circularly arc-shaped loci subscribed by the centers 110a, 101b of the respective magnetic heads of the first suspension 11a and the second suspension 11b being $(X_{33}, y_{33})$ and $(x_{34}, -y_{33})$ respectively, and the distance in the direction of y axis being $d_{31}$ with respect to the intersections of the arc-shaped loci with the innermost periphery 51, separation periphery 102 and outermost periphery 52, and the radius of separation periphery 102 being $r_{d2}$, then the same as in formula 35, formula 36, and formula 38, the coordinates can be respectively represented by formula 43, formula 44, and formula 45.

$$x_{33} = \frac{-\sqrt{r_i^2 - d_{31}^2} + \left(-\sqrt{r_{d3}^2 - d_{31}^2}\right)}{2} \quad \text{(formula 43)}$$

$$y_{33} = d_{31} + \sqrt{R^2 - \left(\frac{\sqrt{r_{d3}^2 - d_{31}^2} - \sqrt{r_i^2 - d_{31}^2}}{2}\right)^2} \quad \text{(formula 44)}$$

$$x_{34} = \frac{\sqrt{r_{d3}^2 - d_{31}^2} + \sqrt{r_o^2 - d_{31}^2}}{2} \quad \text{(formula 45)}$$

Here, the radius $r_{d2}$ of the separation periphery is as represented by formula 46.

$$r_{d2} = \frac{\sqrt{r_o^2 + r_i^2 + 2d_{21}^2 + 2\sqrt{r_o^2 - d_{21}^2}\sqrt{r_i^2 - d_{21}^2}}}{2} \quad \text{(formula 46)}$$

In this case, the maximum value and the minimum values of the skew angles of the respective magnetic heads can be calculated in the same way as for $d=d_0$, but the description is omitted here.

Distance R from the first rotational center 5a of the first link 3 to the rotational center 3a of the third link 7 is R=8 mm, and as for the other values, using the same values as in the first exemplary embodiment, the maximum $\alpha_{amax}$, $\alpha_{bmax}$, and minimum $\alpha_{amin}$, $\alpha_{bmin}$ of the skew angles are calculated. The results are shown in Table 2.

TABLE 2

| | Example 1 | | Example 2 | | |
|---|---|---|---|---|---|
| | Slider 10a | Slider 10b | Slider 10a | Slider 10b | Conventional example |
| $\alpha_{max}$ | −5.771° | −4.144° | 0.484° | 0.324° | 18.183° |
| $\alpha_{min}$ | −8.627° | −5.531° | −0.484° | −0.324° | 8.627° |
| $\alpha_{max} - \alpha_{min}$ | 2.856° | 1.387° | 0.968° | 0.648° | 9.556° |
| $x_{31} \sim x_{34}$ | −4.936 | 7.170 | −5.104 | 7.329 | −3.955 |
| $y_{31} \sim y_{33}$ | 8.540 | −8.540 | 7.957 | −7.959 | −13 |

Figure 11:
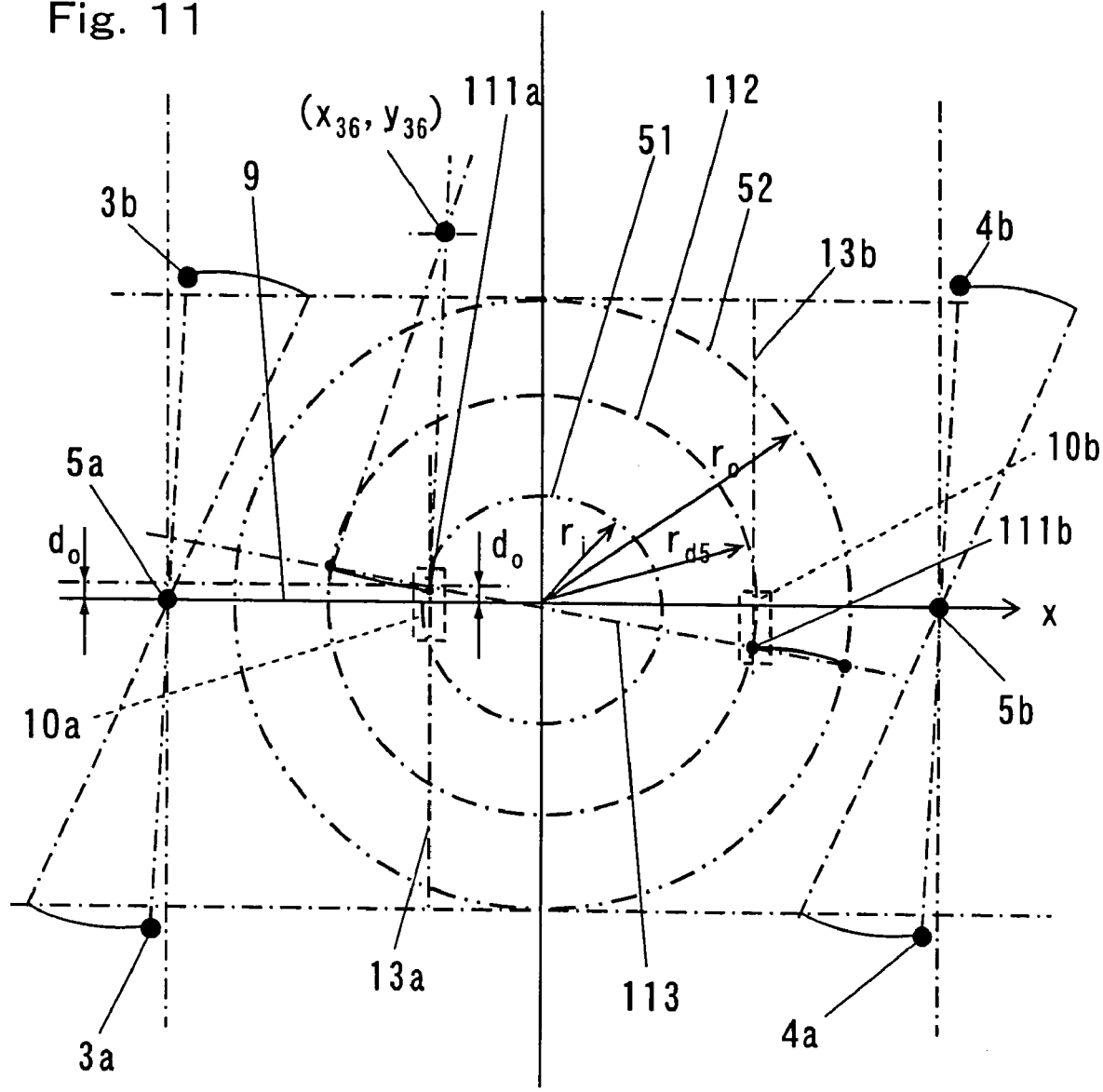
FIG. 11 is a conceptual diagram for describing another example of configuration of essential components of a head support device and recording medium in the third exemplary embodiment of the present invention.

Next, when the centers 101a, 101b of the magnetic heads are on one diametric line of the recording medium 1 at the innermost periphery 51, separation periphery 102 and outermost periphery 52, the skew angle is further smaller as compared with the third exemplary embodiment. Accordingly, the description will be given with reference to FIG. 11 by using the present case as an example. FIG. 11 is a conceptual diagram for describing the example 3. In FIG. 11, the elements corresponding to the component elements in FIG. 10 in the third exemplary embodiment of the present invention are given same reference numerals as in FIG. 10.

One of the centers 111a, 111b of the magnetic heads respectively connected to the first suspension 11a and the second suspension 11b, at the innermost periphery 51 and the separation periphery 112 of the recording medium 1, and the other center of the magnetic head, at the separation periphery 112 and the outermost periphery 52, have the rotational center 2 of the recording medium 1 therebetween and pass through respective two points on one diametric line of the recording medium 1, and since the centers 111a, 111b of the respective magnetic heads subscribe same circularly arc-shaped loci, the separation periphery 112 of the recordable zone of the recording medium 1 are located in the middle of the innermost periphery 51 and the outermost periphery 52 of the recordable zone, and its radius $r_{d5}$ can be represented by formula 47.

$$r_{d5} = \frac{r_i + r_o}{2} \quad \text{(formula 47)}$$

Firstly, with respect to the center 111a of the magnetic head mounted with slider 10a fitted to the first suspension 11a, the description will be given with reference to the conceptual diagram of FIG. 11.

Since the center 111a of the magnetic head of the first suspension 11a, at the inner periphery 51 and the separation periphery 112 of the recordable zone of the recording medium 1, is located on one diametric line 113 of the recording medium 1, the locus of the center 111a of the magnetic head, the same as in the third exemplary embodiment of the present invention, passes through the coordinates $(X_{35}, d_0)$ at the innermost periphery 51 of the recordable zone of the recording medium 1 and also passes through the coordinates $(m_1 x_{35}, m_1 d_0)$ at the separation periphery 112 of the recordable zone. Here, $x_{35}$ and $m_1$ are respectively as in formula 48 and formula 49.

$$x_{35} = -\sqrt{r_i^2 - d_0^2} \quad \text{(formula 48)}$$

$$m_1 = \frac{r_{d5}}{r_i} \quad \text{(formula 49)}$$

Since the circular locus of the center 111a of the magnetic head passes through the above two points, the coordinates $(x_{36}, y_{36})$ of the center of the circle can be obtained by using the formula 1 in the first exemplary embodiment, as represented by formula 50 and 51.

$$x_{36} = \frac{-(r_i + r_{d5})\sqrt{r_i^2 - d_0^2} + d_0\sqrt{4R^2 - (r_i - r_{d5})^2}}{2r_i} \quad \text{(formula 50)}$$

$$y_{36} = \frac{d_0(r_i + r_{d5}) + \sqrt{r_i^2 - d_0^2}\sqrt{4R^2 - (r_i - r_{d5})^2}}{2r_i} \quad \text{(formula 51)}$$

The skew angle $\alpha_a$ of the magnetic head of the first suspension 11a that is located on the circular locus and in a range of $m_1 x_{35} \leq x \leq x_{35}$ becomes minimum $\alpha_{amin}$, and the skew of the tangent passing through the origin against the circle becomes maximum $\alpha_{amax}$.

Accordingly, formula 52 can be obtained as minimum $\alpha_{amin}$.

$$\alpha_{a\min} = \tan^{-1} \frac{d_0}{-\sqrt{r_i^2 - d_0^2}} = \sin^{-1}\left(-\frac{d_0}{r_i}\right) \quad \text{(formula 52)}$$

And, the skew of the tangent against the circle passing through the origin can be calculated by the same method as in the first exemplary embodiment and the third exemplary embodiment of the present invention, obtaining formula 53 as the maximum $\alpha_{amax}$.

$$\alpha_{a\max} = \tan^{-1}\left(\frac{-x_{36}y_{36} - R\sqrt{x_{36}^2 + y_{36}^2 - R^2}}{R^2 - x_{36}^2}\right) \quad \text{(formula 53)}$$

Similarly, since the center 111b of the magnetic head of the second suspension 11b, at the separation periphery 112 and the outermost periphery 52 of the recordable zone of the recording medium 1, is located on the same diametric line 113, the locus of the center 111b of the magnetic head passes through the coordinates $(-m_1 x_{35}, -m_1 d_0)$ at the separation periphery 112 of the recordable zone of the recording medium 1 and also passes through the coordinates $(-m_2 x_{35}, -m_2 d_0)$ at the outermost periphery 52 of the recordable zone. Here, $m_2$ is as represented by formula 54.

$$m_2 = \frac{r_0}{r_i} \quad \text{(formula 54)}$$

Since the circular locus of the center 111b of the magnetic head passes through the above two points, the coordinates $(x_{37}, y_{37})$ of the center of the circle can be obtained by using the formula 1 in the first exemplary embodiment, as represented by formula 55 and 56.

$$x_{37} = \frac{(r_{d5} + r_o)\sqrt{r_i^2 - d_0^2} + d_0\sqrt{4R^2 - (r_{d5} - r_0)^2}}{2r_i} \quad \text{(formula 55)}$$

$$y_{37} = -\frac{d_0(r_{d5} + r_0) + \sqrt{r_i^2 - d_0^2}\sqrt{4R^2 - (r_{d5} - r_o)^2}}{2r_i} \quad \text{(formula 56)}$$

The skew angle $\alpha_b$ of the magnetic head of the second suspension 11b that is located on the circular locus and in a range of $$-m_1 x_{35} \leq x \leq -m_2 x_{35}$$

becomes minimum $\alpha_{bmin}$ when the center 111b of head gap of the magnetic head on the separation periphery 112 and outermost periphery 52, and the skew of the tangent passing through the origin against the circle becomes maximum $\alpha_{bmax}$.

The value of minimum $\alpha_{bmin}$ is equal to the value of minimum $\alpha_{amin}$ of the magnetic head of the first suspension 11a.

Also, the skew $\alpha_{bmax}$ of the tangent against the circle passing through the origin can be obtained by the same method as for maximum $\alpha_{amax}$ of the magnetic head of the first suspension 11a, as represented by formula 57.

$$\alpha_{b\max} = \tan^{-1}\left(\frac{-x_{37}y_{37} - R\sqrt{x_{37}^2 + y_{37}^2 - R^2}}{R^2 - x_{37}^2}\right) \quad \text{(formula 57)}$$

The lengths and the fitting positions of the first suspension 11a against the third link 7 and the second suspension 11b against the fourth link 8 are same as in the first exemplary embodiment, and the detailed description is omitted here, but the first suspension 11a and the second suspension 11b are respectively fixed on the third link 7 and the fourth link 8 so that the centers of the slider 10a and slider 10b respectively fitted to the first suspension 11a and the second suspension 11b are respectively positioned at coordinates $(x_{36}, L_{36})$ and coordinates $(X_{37}, L_{37})$. Here, $L_{36}$ can be represented by formula 58, and $L_{37}$ can be represented by formula 59.

$$L_{36} = y_{36} - (R + d_0) \quad \text{(formula 58)}$$

$$L_{37} = y_{37} + (R + d_0) \quad \text{(formula 59)}$$

Also, the same as example 2 in the first exemplary embodiment, with the magnetic head of the first suspension 11a configured so as to satisfy the formula 15, the skew angles of the magnetic heads of the first suspension 11a and the second suspension 11b become further smaller values.

Then, the distance in the direction of y axis being $d_{32}$ with respect to the intersection between the arc-shaped locus of the center 111a of the magnetic head of the first suspension 11a and the innermost periphery 51 of the recordable zone of the recording medium 1, and the coordinates of the centers of the circularly arc-shaped loci subscribed by the centers 111a, 111b of the respective magnetic heads of the first suspension 11a and the second suspension 11b being $(x_{38}, y_{38})$ and $(x_{39}, y_{39})$ respectively, then the coordinates can be respectively represented by formula 60, formula 61, formula 62, and formula 63.

$$x_{38} = \frac{-(r_i + r_{d5})\sqrt{r_i^2 - d_{32}^2} + d_{32}\sqrt{4R^2 - (r_i - r_{d5})^2}}{2r_i} \quad \text{(formula 60)}$$

$$y_{38} = \frac{d_0(r_i + r_{d5}) + \sqrt{r_i^2 - d_{32}^2}\sqrt{4R^2 - (r_i - r_{d5})^2}}{2r_i} \quad \text{(formula 61)}$$

$$x_{39} = \frac{(r_{d5} + r_o)\sqrt{r_i^2 - d_{32}^2} + d_{32}\sqrt{4R^2 - (r_{d5} - r_0)^2}}{2r_i} \quad \text{(formula 62)}$$

$$y_{39} = -\frac{d_{32}(r_{d5} + r_0) + \sqrt{r_i^2 - d_{32}^2}\sqrt{4R^2 - (r_{d5} - r_o)^2}}{2r_i} \quad \text{(formula 63)}$$

Accordingly, the maximum $\alpha_{amax}$ and minimum $\alpha_{amin}$ of skew angle $\alpha_a$ of the magnetic head of the first suspension are then as represented by formula 64.

$$\alpha_{a\max} = -\alpha_{a\min} = \frac{d_{32}}{\sqrt{r_i^2 - d_{32}^2}} \quad \text{(formula 64)}$$

Similarly, the maximum $\alpha_{bmax}$ and minimum $\alpha_{bmin}$ of skew angle $\alpha_b$ of the magnetic head of the second suspension 11b are respectively as represented by formula 65 and formula 66.

$$\alpha_{b\,max} = \tan^{-1}\left(\frac{-x_{39}y_{39} - R\sqrt{x_{39}^2 + y_{39}^2 - R^2}}{R^2 - x_{39}^2}\right) \quad \text{(formula 65)}$$

$$\alpha_{b\,min} = \alpha_{a\,max} = \tan^{-1}\left(\frac{d_{32}}{\sqrt{r_i^2 - d_{32}^2}}\right) \quad \text{(formula 66)}$$

The maximum $\alpha_{amax}$, $\alpha_{bmax}$, and minimum $\alpha_{amin}$, $\alpha_{bmin}$ of the skew angles are calculated by using the same values as in the third exemplary embodiment of the present invention. The results are shown in Table 3.

TABLE 3

|  | Example 3 | | Example 4 | | |
| --- | --- | --- | --- | --- | --- |
|  | Slider 10a | Slider 10b | Slider 10a | Slider 10b | Conventional example |
| $\alpha_{max}$ | −7.745° | −8.016° | 0.441° | 0.170° | 18.183° |
| $\alpha_{min}$ | −8.627° | −8.627° | −0.441° | −0.441° | 8.627° |
| $\alpha_{max} - \alpha_{min}$ | 0.882° | 0.611° | 0.882° | 0.611° | 9.556° |
| $x_{36} \sim x_{39}$ | −3.866 | 6.066 | −5.051 | 7.276 | −3.955 |
| $y_{36} \sim y_{39}$ | 8.600 | −8.933 | 7.961 | −7.978 | −13 |

Figure 12:
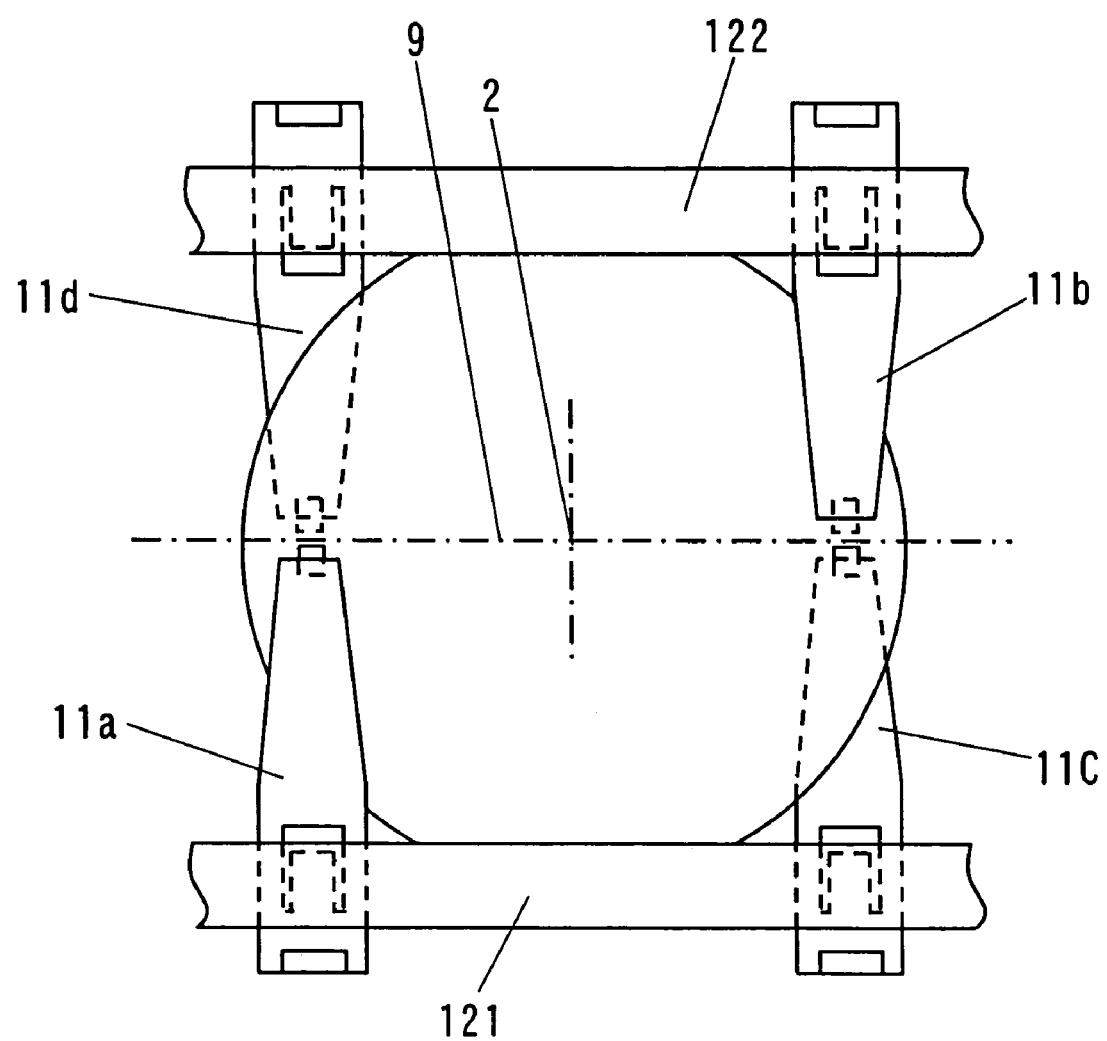
FIG. 12 is a schematic top view showing other example of configuration of essential components of a head support device and recording medium in the third exemplary embodiment of the present invention.

As shown in the schematic top view of FIG. 12, the first suspension 11a and the second suspension 11b in the third exemplary embodiment of the present invention are rotated by 180° with respect to a diametric line vertical to diametric line 9, and the third suspension 11c and the fourth suspension 11d thus vertically reversed in position are respectively disposed on the third link 121 and the fourth link 122 double-structured by a well-known method, and thereby, the suspensions may cover the topside and underside of the recording medium 1, and it is possible to increase the recording capacity with this configuration.

It is not limited to such a configuration that radius rd of separation periphery 102 satisfies the formula 34 in the third exemplary embodiment of the present invention or radius $r_{d5}$ of separation periphery 112 satisfies the formula 47 (to be the middle point of the innermost periphery 51 and the outermost periphery 52), but it is then preferable to set the angle of the first link 3 so as to correspond to the length in the x-direction of the locus. Also, since the magnetic head which covers the outer peripheral zone (between the separation periphery 102 or separation periphery 112 and the outermost periphery 52) of the recording medium 1 is smaller in skew angle than the magnetic head which covers the inner peripheral zone (between the innermost periphery 51 and the separation periphery 102 or separation periphery 112), it is also possible to set the skew angles of the two magnetic heads further smaller by setting the outer peripheral zone a little larger.

By providing a disk drive with a head support mechanism in the third exemplary embodiment of the present invention, the speed of follow-up to the target track can be increased, and it is possible to realize a disk drive which assures good response and is improved in head positioning control and reliability.

According to the third exemplary embodiment as described above, the recordable zone of the recording medium is divided into two zones, and the heads such as magnetic heads respectively mounted on the sliders fitted on the first suspension and the second suspension cover the respective divided zones, and the two magnetic heads serve to cover the whole of the recordable zone divided into two zones of the recording medium. In this way, the skew angles of the respective magnetic heads become very small on the recording medium, and also, the recording head positioning accuracy is not lowered even when the mode is shifted from reproducing to recording, and further, there is little deflection between the initialized peripheral direction and the magnetic orientation of the recording medium or deterioration of the recording characteristics, thereby enabling the realization of a head support device of excellent reliability. Also, a small rotational angle of the first link may cope with the whole of the recordable zone and increase the speed of follow-up to the target track, thereby realizing high response.

Also, with it configured in that the center of the magnetic head of one of the two suspensions passes through the intersections of the diametric line of the recording medium with the innermost periphery and separation periphery of the recordable zone of the recording medium and that the center of the magnetic head of the other suspension passes through the intersections of the diametric line of the recording medium with the separation periphery and outermost periphery of the recordable zone of the recording medium, the skew angles of the respective magnetic heads can be further lessened.

Accordingly, a disk drive provided with a head support device having such a configuration assures high response and may improve the head positioning control characteristics and reliability.

Fourth Exemplary Embodiment (Fourth Exemplary Embodiment)

Figure 13:
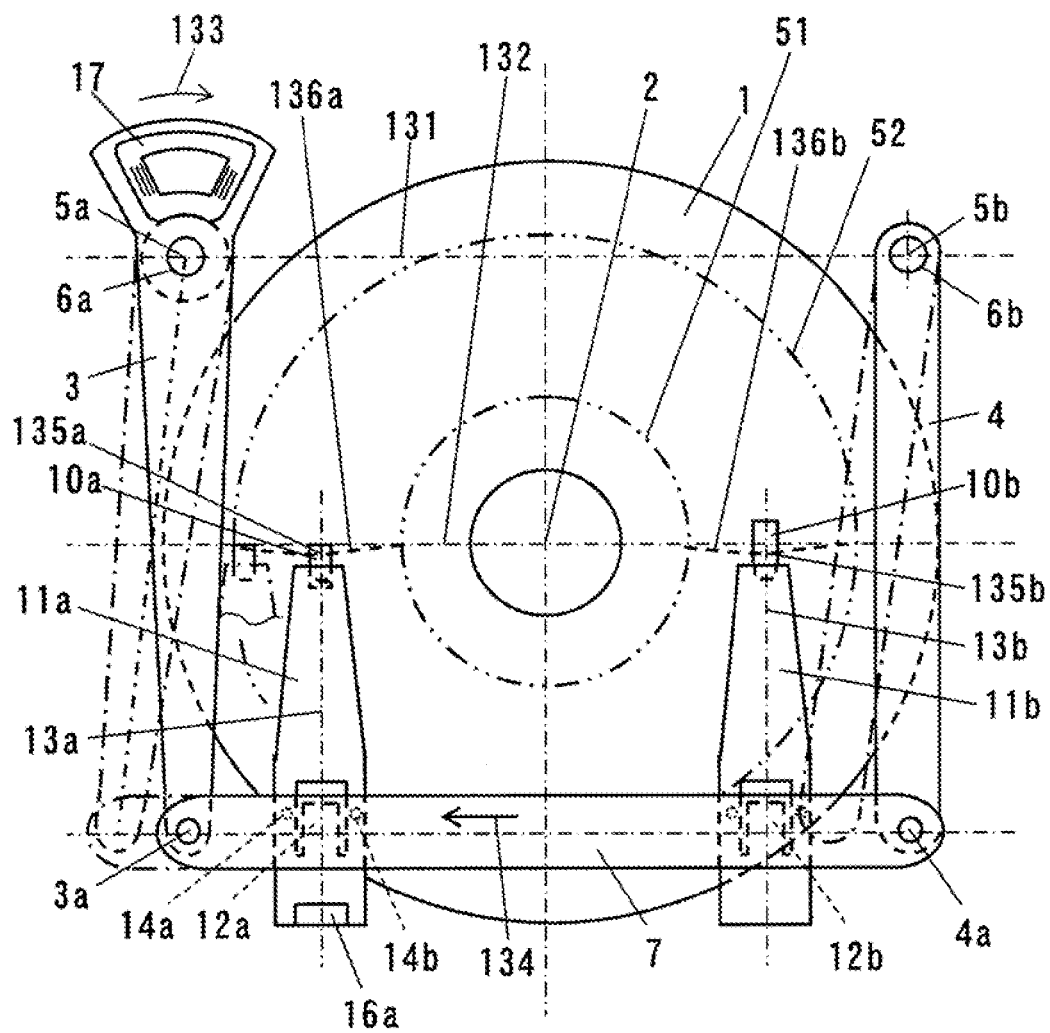
FIG. 13 is a top view showing the configuration of essential components of a head support device and recording medium in the fourth exemplary embodiment of the present invention.
Figure 14:
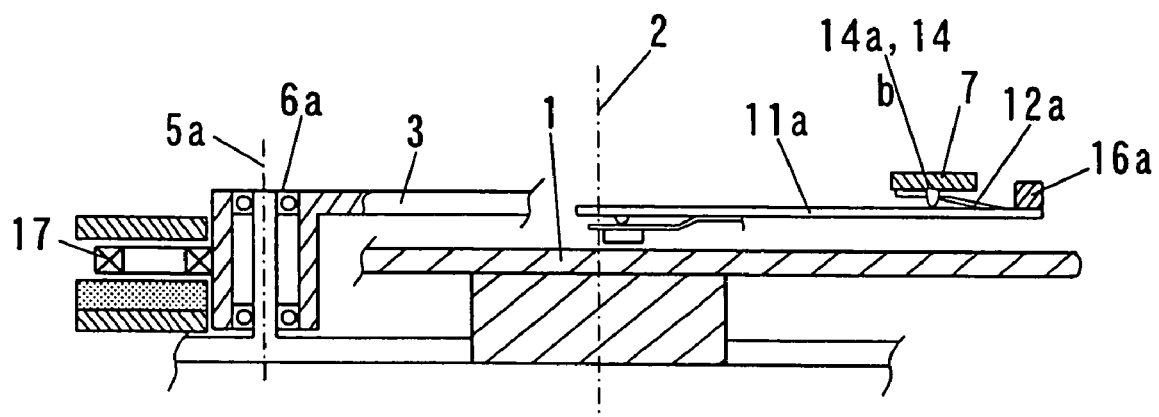
FIG. 14 is a side view showing the configuration of essential components of a head support device of a disk drive in the fourth exemplary embodiment of the present invention.

FIG. 13 and FIG. 14 are diagrams for describing the head support device of the disk drive in the fourth exemplary embodiment of the present invention. FIG. 13 is a top view of essential components showing the configuration of essential components of the head support device and the recording medium in the fourth exemplary embodiment of the present invention, and FIG. 14 is a side view thereof. The partly enlarged side view of the suspension is same as FIG. 3 of the first exemplary embodiment. In FIG. 13 and FIG. 14, the elements corresponding to the component elements in FIG. 1 of the first exemplary embodiment are given same reference numerals as those in FIG. 1.

In FIG. 13 and FIG. 14, main differences of the fourth exemplary embodiment of the present invention from the configuration in the first exemplary embodiment, the second exemplary embodiment, and the third exemplary embodiment are such that the first rotational center 5a and the second rotational center 5b of the first bearing 6a and the second bearing 6b which respectively rotate the first link 3 and the second link 4 in the first exemplary embodiment are not located on the extension of diametric line 9 passing through the rotational center 2 of the recording medium 1, and further, the rotational centers 3b, 4b disposed opposite to the respective rotational centers 3a, 4a of the third link 7, respectively disposed on the first link 3 and the second link 4, and the fourth link 8 disposed so as to be rotatable about these are not included, and also, both of the first suspension 11a and the second suspension 11b are fixed on the third link 7. The distances from the rotational center 2 to the first rotational center 5a or the second rotational center 5b are preferable to be either of being equal to and different from each other. The other configurations are same as in the first exemplary embodiment, the second exemplary embodiment, and the third exemplary embodiment, and the detailed description is omitted, and the differences will be outlined in the following.

In FIG. 13 and FIG. 14, it is configured in that the distance between the first rotational center 5a of the first link 3 and the rotational center 3a of the third link 7 at one side, that is, the first effective link length of the first link 3, and the distance between the rotational center 5b of the second link 4 and the rotational center 4a of the third link 7 at one side, that is, the first effective length of the second link 4, are nearly identical with each other, and further, the distance between the rotational center 3a of the third link 7 of the first link 3 and the rotational center 4a of the third link 7 of the second link 4, that is, the effective link length of the third link 7, is nearly identical with the distance between the respective first rotational center 5a and second rotational center 5b of the first link 3 and second link 4.

Accordingly, when either the first link 3 or the second link 4 is rotated about the first rotational center 5a or the second rotational center 5b, the third link 7 reciprocates while maintaining a state of being nearly parallel with line 131 that connects the first rotational center 5a of the first bearing 6a of the first link 3 to the second rotational center 5b of the second bearing 6b of the second link 4.

On the other hand, the plate spring 12a of the first suspension 11a and the plate spring 12b of the second suspension 11b, which hold the slider 10a and the slider 10b mounted with head (not shown) such as magnetic head on one side respectively, are fixed on the third link 7 by means of a well-know process such as spot welding, supersonic welding, and laser beam welding, so that the center line 13a and the center line 13b in the lengthwise direction of the first suspension 11a and the second suspension 11b become vertical to the line 131 that connects the first rotational center 5a to the second rotational center 5b of each of the first bearing 6a and the second bearing 6b. That is, the respective center line 13a and center line 13b in the lengthwise direction of the first suspension 11a and the second suspension 11b become vertical to the line connecting the rotational center 3a to the rotational center 4a of the third link 7, and the line corresponding to the track width direction of the magnetic head mounted on the slider 10a fitted on the first suspension 11a and the slider 10b fitted on the second suspension 11b reciprocates while maintaining a state of being parallel with the diametric line 132 of the recording medium 1 which is parallel with the line 131 that connects the first rotational center 5a to the second rotational center 5b. The same as in the first exemplary embodiment, it is preferable to be configured in that the direction vertical to the track width direction of the magnetic head is a little skewed from the center line 13a and the center line 13b in the lengthwise direction of the first suspension 11a and the second suspension 11b, that is, the track width direction of the magnetic head is a little skewed by a predetermined angle against the diametric line 132 of the recording medium 1 which is parallel with the line 131 that connects the first rotational center 5a to the second rotational center 5b, or with the direction vertical to the track width direction of the magnetic head kept in a state of being parallel with the respective center line 13a and center line 13b in the lengthwise direction of the first suspension 11a and the second suspension 11b, the respective center line 13a and center line 13b in the lengthwise direction of the first suspension 11a and the second suspension 11b are a little skewed from the direction vertical to the line 131. In that case, the magnetic head reciprocates with the track width direction kept in a state of being a little skewed against the diametric line 132 of the recording medium 1 which is parallel with the line 131.

The same as in the first exemplary embodiment of the present invention, when the voice coil 17 that is a driving means for moving the slider 10a mounted with the magnetic head disposed on the first suspension 11a is rotated in the direction of arrow 133, the first link 3 is rotated about the first rotational center 5a of the first link 3, and the third link 7 connected to the first link 3 moves in the direction of arrow 133. Accordingly, the first suspension 11a and the second suspension 11b fixed on the third link 7 move, and thereby, the slider 10a fitted to the first suspension 11a and the slider 10b fitted to the second suspension 11b are moved respectively.

Next, the loci of movements of the magnetic heads (not shown) respectively mounted on the slider 10a and slider 10b respectively disposed on the first suspension 11a and the second suspension 11b which are fixed on the third link 7 will be described in the following. Since the first suspension 11a and the second suspension 11b are fixed on the third link 7, the rotational loci of the first link 3 of the slider 10a and the slider 10b respectively disposed on the first suspension 1a and the second suspension 11b, as shown by chain line 134a and chain line 134b in FIG. 13, are circularly arc-shaped loci subscribed on the surface of the recording medium 1, same as the rotational loci of the rotational center 3a against the first link 3 of the third link 7. That is, the center 135a and center 135b of head gaps of the magnetic heads respectively mounted on the slider 10a and slider 10b subscribe rotational loci on the surface of the recording medium 1, same as the rotational loci of the rotational center 3a of the first link 3. The same as in the second exemplary embodiment, the slider 11a and the slider 10b are respectively fitted on the first suspension 11a and the second suspension 11b so that the directions toward the centers of the signal conversion elements (such as magnetic head) mounted on the slider 10a and the slider 10b from the respective centers of the slider 10a and the slider 10b correspond to the rotating direction of the recording medium 1.

The positional relations of the first suspension 11a and the second suspension 11b will be briefly described in the following.

In FIG. 13, the magnetic head connected to the first suspension 11a and the magnetic head connected to the second suspension 11b are disposed on either side of the recording medium 1 in such manner as to have the rotational center 2 of the recording medium 1 therebetween. And, the setting is made so that when rotational center 135a of the magnetic head connected to the first suspension 11a is at distance d in a direction vertical to the diametric line 132 of the recording medium 1 that is parallel with the line 131 connecting the first rotational center 5a to the second rotational center 5b and also on innermost periphery 51 of the recordable zone, center 135b of the magnetic head connected to the second suspension 11b is at distance d in a direction vertical to the diametric line 132 of the recording medium 1 that is parallel with the line 131 and also on the outermost periphery 52 of the recordable zone, then with the first link 3 rotated, the center 135a of the magnetic head connected to the first suspension 11a is at distance d in a direction vertical to the diametric line 132 of the recording medium 1 that is parallel with the line 131 and, also, passes through the two points on the innermost periphery 51 and the outermost periphery 52 of the recordable zone, the center 135b of the magnetic head connected to the second suspension 11b is at distance d in a direction vertical to the diametric line 132 of the recording medium 1 that is parallel with the line 131 and, also, passes through the two points on the outermost periphery 52 and the innermost periphery 51 of the recordable zone.

Regarding the skew angle of the recording track recording by a head support device having such a configuration, the description will be given with reference to FIG. 15.

The same as in the first exemplary embodiment of the present invention, in FIG. 13 that describes the configuration and operation of the head support device in the fourth exemplary embodiment of the present invention, the rotational centers 3a, 4a of the third link 7 connected to the first link 3 and the second link 4 are arranged at the end portion of each link, but the configuration is not limited to the end portion of each link, and it is preferable to dispose the rotational centers 3a, 4a in positions away from the end portion of each link.

Figure 15:
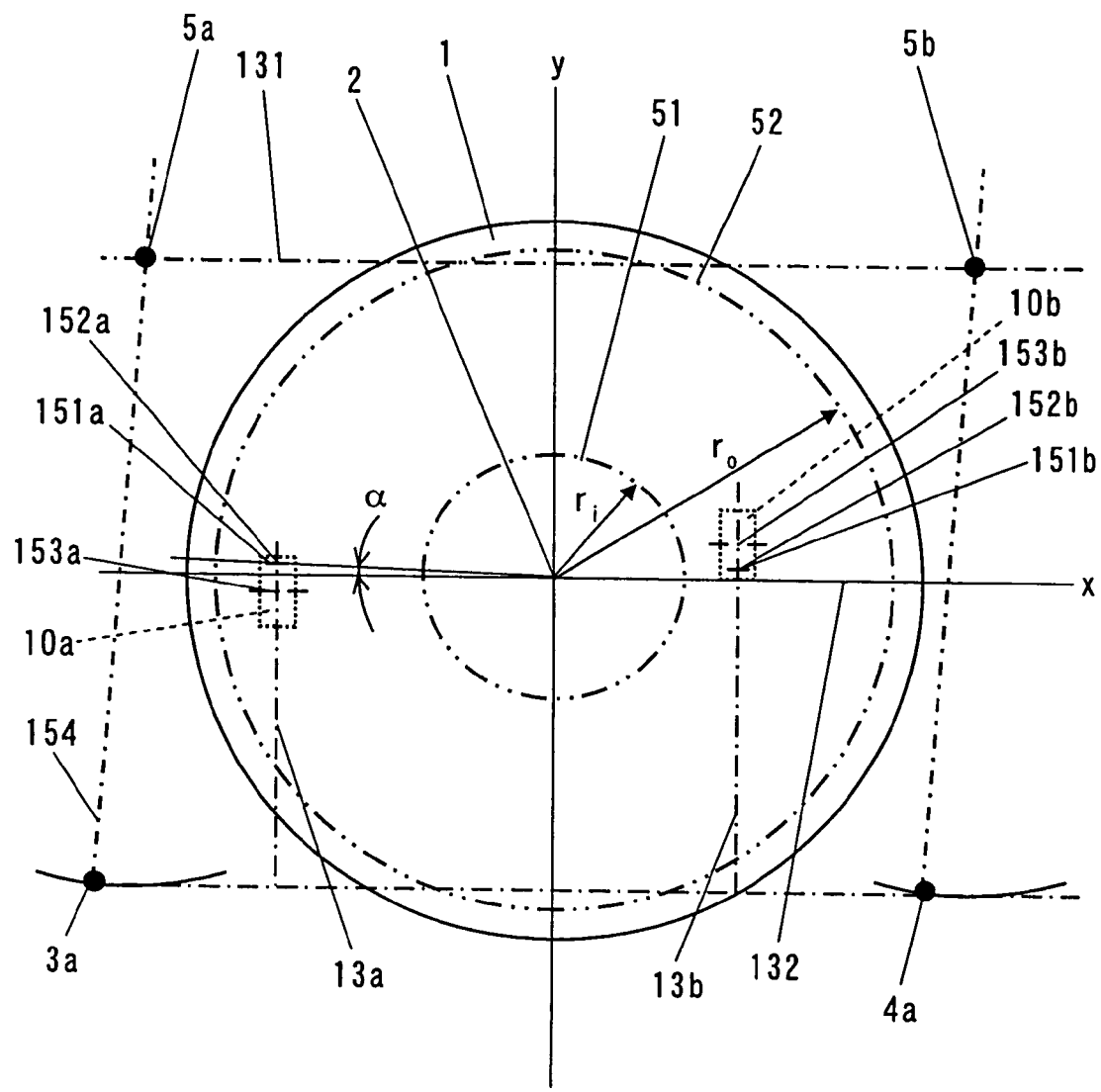
FIG. 15 is a conceptual diagram for describing the skew angle of a magnetic head against the recording track of the recording medium in the fourth embodiment of the present invention.

FIG. 15 is a conceptual diagram for describing the skew angle of the magnetic head (not shown) against the recording track of the recording medium 1. In FIG. 15, the respective track width directions of the head gap 151a and head gap 151b of the magnetic heads respectively mounted on the slider 10a and slider 10b connected to the first suspension 11a and the second suspension 11b to configure the heads are vertical to the respective center line 13a and center line 13b in the lengthwise direction of the first suspension 11a and the second suspension 11b and, therefore, parallel with the diametric line 132 of the recording medium 1 that is parallel with the line 131 connecting the first rotational center 5a to the second rotational center 5b. Accordingly, the same as in the first exemplary embodiment of the present invention, the skew angle of the magnetic head located on the diametric line at angle α against the diametric line 132 of the recording medium 1 that is parallel with the line 131 is an angle in the track width direction of head gap of the magnetic head against the diametric line passing through the position. Also, the loci of the respective centers 152a and center 152b of head gap 151a and head gap 151b of the magnetic heads become identical with the locus of the rotational center 3a of the first link 3 due to the rotation of the first link 3.

From the arcuate loci described by the respective center 152a and center 152b of the head gap 151a and head gap 151b of the magnetic heads, the skew angles of the magnetic heads respectively mounted on the slider 10a and slider 10b can be calculated the same as in the first exemplary embodiment.

The arcuate loci subscribed by the respective center 152a and center 152b of the head gap 151a and head gap 151b of the magnetic heads can be represented by the formula 1 in the first exemplary embodiment of the present invention by using the marks used in the first exemplary embodiment of the present invention.

Accordingly, the skew angle α of the magnetic head located on the circular locus can be obtained by the equation shown in the formula 2 in the first exemplary embodiment of the present invention.

Therefore, the same as in the first exemplary embodiment of the present invention, skew angle α of the magnetic head located on the circular locus can be calculated. Also, the equation of the locus subscribed by the magnetic head connected to the second suspension 11b can be similarly obtained the same as for the magnetic head of the first suspension 11a. The skew angle of the magnetic head located on the locus subscribed by the magnetic head connected to the second suspension 11b can be calculated in the same way as for the magnetic head of the first suspension 11a. Accordingly, the detailed description is omitted here.

The same as in the first exemplary embodiment, the setting is to be made so that the centers 153a, 153b of the slider 10a and slider 10b are close to the diametric line 132 of the recording mediums 1 that is parallel with the line 131 at the innermost periphery 51 of the recordable zone on in order to maintain the floating amounts of slider 10a and slider 10b at the innermost periphery 51 of the recordable zone of the recording medium 1, and the loci of slider 10a and slider 10b due to rotation of the first link 3 is identical with the locus of the rotational center 3a of the third link 7 at the first link 3, and the construction is to be small-sized. And taking these points into consideration, when line 154 connecting the first rotational center 5a to the rotational center 3a of the first link 3 is rotated clockwise and counterclockwise about a position vertical to the line 131, the loci of slider 10a and slider 10b become arc-shaped loci which are nearly straight lines. Accordingly, the same as in the first exemplary embodiment of the present invention, it is intended to obtain loci close to the diametric line 132 as the loci of movements of the slider 10a and slider 10b due to rotation of the first link 3 in order to make the skew angle smaller.

Regarding the positions of the slider 10a and slider 10b to make the skew angles smaller or the center 152a and center 152b of the magnetic heads, since the setting is same as in the first exemplary embodiment of the present invention, the detailed description is omitted, and the outline will be described in the following.

Figure 16:
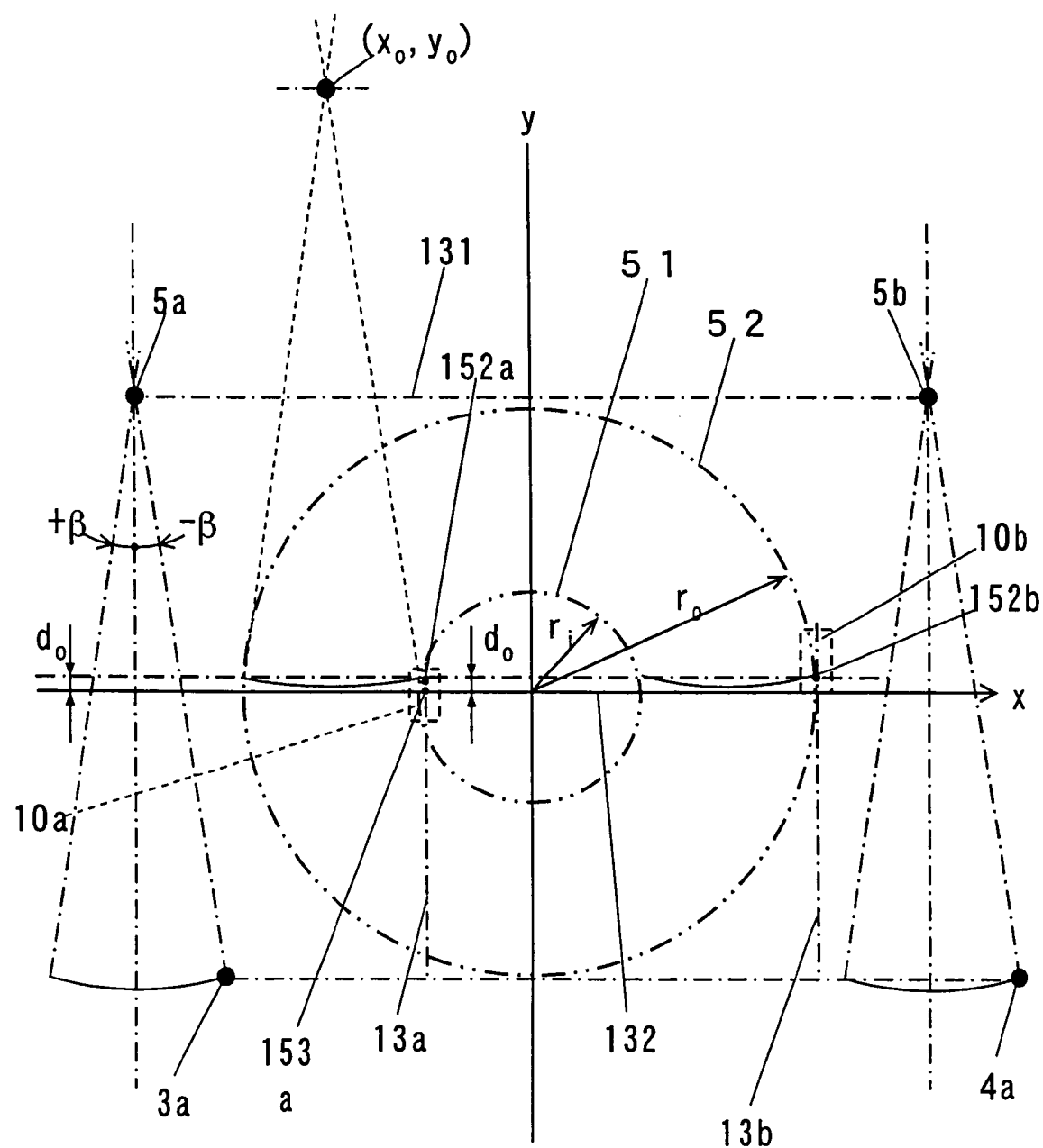
FIG. 16 is a conceptual diagram for describing another example of skew angle of a magnetic head against the recording track of the recording medium in the fourth embodiment of the present invention.

As example 1, such configuration that the center 153a of slider 109a is on diametric line 132 of the recording medium 1 parallel with the line 131 due to rotation of the first link 3, and that the respective center 152a and center 152b of head gaps 151a, 151b of the magnetic head are respectively positioned at the innermost periphery 51 and the outermost periphery 52 of the recordable zone of the recording medium 1 will be described with reference to the conceptual diagram of FIG. 16. The same elements as those in the first exemplary embodiment of the present invention are given same reference numerals as in the first exemplary embodiment of the present invention.

Firstly, the locus of the center 152a of the magnetic head connected to the first suspension 11a will be described in the following. Since the center 152a of magnetic head 151a of the magnetic head is at distance $d_0$ in a direction vertical to the diametric line 132 of the recording medium 1 parallel with the line 131 and, also, passes through the two points of the innermost periphery 51 and the outermost periphery 52 of the recordable zone of the recording medium 1, the x-coordinate of the respective intersections of the arc-shaped locus with the innermost periphery 51 and the outermost periphery 52 of the recordable zone is as represented by formula 3 and formula 4 the same as in the first exemplary embodiment of the present invention. Accordingly, the coordinates $(x_0, y_0)$ of the central point of the circularly arc-shaped locus subscribed by the center 152a of head gap 151a of the magnetic head can be calculated by the equation (formula 1), obtaining the formula 5 and formula 6.

The skew angle $α_a$ of the magnetic head becomes minimum $α_{amin}$ when the center 152a of head gap 151a of the magnetic head is located at the innermost periphery 51 of the recordable zone, and becomes maximum $α_{amax}$ when the skew of the tangent passing through the origin against the circle.

Accordingly, formula 7 can be obtained as minimum $α_{amin}$, and formula 10 can be obtained as maximum $α_{amax}$.

Also, as to the length and fitting position of the first suspension 11a, the same as the example 1 in the first exemplary embodiment of the present invention, it is preferable to fix the first suspension 1a on the third link 7 by using the formula 11, formula 12, or formula 13.

The locus of center 152b of the magnetic head connected to the second suspension 11b can be calculated the same as for the locus of center 152a of the magnetic head of the first suspension 11a. That is, the locus of the central point of the circularly arc-shaped locus subscribed by center 152b of head gap 151b of the magnetic head can be calculated by the equation (formula 1), and the skew angle $\alpha_b$ of the magnetic head becomes maximum $\alpha_{bmax}$ when the center 152b of head gap 151b of the magnetic head is located at the innermost periphery 51 of the recordable zone, and becomes minimum $\alpha_{bmin}$ when the skew of the tangent passing through the origin against the circle.

In other words, the locus of center 152b of the magnetic head connected to the second suspension 11b is symmetrical to the locus subscribed by the center 152a of the magnetic head of the first suspension 11a with respect to the diametric line vertical to the diametric line 132 passing through the rotational center 2 of the recording medium 1. Therefore, the skew angle $\alpha_b$ of the magnetic head connected to the second suspension 11b is $$\alpha_b = \alpha_a$$

in relation with the skew angle $\alpha_a$ of the magnetic head of the first suspension 11a. Accordingly, the maximum $\alpha_{bmax}$ and the minimum $\alpha_{bmin}$ of the skew angle $\alpha_b$ of the magnetic head of the second suspension 11b are as follows:

$$\alpha_{bmax} = -\alpha_{amin}$$

$$\alpha_{bmin} = -\alpha_{amax}.$$

That is, formula 67 and formula 68 can be obtained.

$$\alpha_{b\,max} = \tan^{-1} \frac{d_0}{\sqrt{r_i^2 - d_0^2}} \quad \text{(formula 67)}$$

$$\alpha_{b\,min} = \tan^{-1} \frac{x_0 y_0 + R\sqrt{x_0^2 + y_0^2 - R^2}}{R^2 - x_0^2} \quad \text{(formula 68)}$$
$$= \tan^{-1} \frac{-x_1 y_0 - R\sqrt{x_1^2 + y_0^2 - R^2}}{R^2 - x_1^2}$$

Also, the fitting position of the second suspension 11b is same as for the first suspension 11a. The line 154 of the first link 3 is vertical to the line 131, while the center line 13b in the lengthwise direction of the second suspension 11b corresponds to the line vertical to the diametric line 132 passing through the x-coordinate $x_{41}$ of the central point of the circularly arc-shaped locus subscribed by the center 152b of the magnetic head of the second suspension 11b, and also the second suspension 11b is fixed on the third link 7, determining the length and the fitting position of the second suspension so that the y-coordinate of the center 153b of the slider 10b fitted to the second suspension 11b is then positioned at $L_1$. Here, $x_{41} = x_0$, and $L_1$ is as represented by formula 69 since it is fitted to the second suspension 11b in such manner that the direction toward the center 152b of the magnetic head mounted on the slider 10b from the center 153b of the slider 10b corresponds to the rotating direction of the recording medium 1.

$$L_1 = y_0 - (R - d_0) \quad \text{(formula 69)}$$

Or, when the line 154 of the first link 3 has angle-β in the formula 13 as against a state vertical to the line 131, the center 152b of the magnetic head passes through the point on the outermost periphery 52 of the recordable zone of the recording medium 1 that can be represented by formula 70, $$(\sqrt{r_o^2 - d_0^2}, d_0) \quad \text{(formula 70)}$$

and when it has angle β in the formula 12, it is preferable to fix the suspension on the third link 7, determining the length and fitting position of the second suspension 11b so that the center 152 of the magnetic head passes through the point on the innermost periphery 51 of the recordable zone of the recording medium 1 that can be represented by formula 71.

$$(\sqrt{r_i^2 - d_0^2}, d_0) \quad \text{(formula 71)}$$

When the center 152a of the magnetic head is in a range from $+d_0$ to 0 in the direction of y axis, the position of center 153a of the slider 10a is similarly in a range from 0 to $-d_0$ in the direction of y axis, and the tangential direction of the rotational locus of the recording medium 1 at the central point of the slider 10a is nearly parallel with the line connecting the center 152a of the magnetic head to the center 153a of the slider 10a. Therefore, there is almost no lowering of the floating amount of slider 10a that is nearly identical with the floating amount of slider 10a when the center 152a of the magnetic head is position at the innermost periphery 51 of the recordable zone of the recording medium 1.

With the intersections of the innermost periphery 51 and the outermost periphery 52 of the recordable zone with the circular locus positioned smaller than $d_0$ and larger than 0 in the direction of y axis in order to set the moving locus of the magnetic head so that the formula 15 in example 2 of the first exemplary embodiment of the present invention is satisfied, the skew angle is smaller in absolute value than the skew angle represented by the formula 7 and formula 10.

As example 2, the position setting of slider 10a or magnetic head that satisfies the formula 15 will be briefly described in the following.

When the y-coordinate of the respective intersections of the innermost periphery 51 and the outermost periphery 52 of the recordable zone with the circular locus are $d_1$, then the same as in example 2 of the first exemplary embodiment of the present invention, the minimum $\alpha_{amin}$ and the maximum $\alpha_{amax}$ of skew angle $\alpha_a$ of the magnetic head on the circular locus of center 152a of the magnetic head can be calculated, obtaining formula 21 and formula 22 in example 2 of the first exemplary embodiment of the present invention.

Accordingly, when $d_1$ that satisfies formula 15 by using the formula 21 to formula 23 is obtained, the skew angle $\alpha_a$ of the magnetic head on the circular locus of center 152a of the magnetic head is smaller in absolute value than the skew angle of example 1 in the fourth exemplary embodiment of the present invention.

Also, regarding the length and fitting position of the first suspension 11a for fixing the first suspension 11a on the third link 7, it is preferable to make the determination the same as in example 1 of the fourth exemplary embodiment of the present invention.

Then the locus of center 152b of the magnetic head connected to the second suspension 11b, same as in example 1 of the fourth exemplary embodiment of the present invention, is symmetrical to the locus subscribed by center 152a of the magnetic head of the first suspension 11a with respect to the diametric line vertical to the diametric line 132 passing through the rotational center 2 of the recording medium 1. The detailed description is therefore omitted here. Also, the x-coordinate $x_{43}$ of the central point of the circularly arc-shaped locus subscribed by the center 152b of head gap 151b of the magnetic head of the second suspension 11b is then as represented by formula 72.

$$x_{43} = \frac{\sqrt{r_i^2 - d_1^2} + \sqrt{r_o^2 - d_1^2}}{2} \quad \text{(formula 72)}$$

Next, the skew angles in example 1 and example 2 of the fourth exemplary embodiment of the present invention are calculated by putting in same numeric values as in the conventional example except R.

When
$r_i$=4 mm
$r_o$=8.45 mm
$d_0$=0.6 mm
R=16 mm, the results of calculating the maximum $\alpha_{amax}$, $\alpha_{bmax}$ and the minim $\alpha_{amin}$, $\alpha_{bmin}$ of the respective skew angles of the first suspension 11a and the second suspension 11b are shown in Table 4 together with the conventional skew angles, central point of circular locus, and slider center setting positions.

TABLE 4

|  | Example 1 | | Example 2 | | |
| --- | --- | --- | --- | --- | --- |
|  | Slider 10a | Slider 10b | Slider 10a | Slider 10b | Conventional example |
| $\alpha_{max}$ | −4.001° | 8.627° | 0.871° | 0.740° | 18.183° |
| $\alpha_{min}$ | −8.627° | 4.001° | −0.871° | −0.740° | 8.627° |
| $\alpha_{max} - \alpha_{min}$ | 4.626° | 4.626° | 1.742° | 1.480° | 9.556° |
| $x_0 \sim x_3$ | −6.052 | 6.052 | −6.210 | 6.210 | −3.955 |
| $y_0, y_2$ | 16.455 | 16.455 | 15.907 | 15.907 | −13 |

With the head support device configured as described above, the skew angle of the magnetic head is very much decreased, and even when the mode is shifted from reproducing to recording, the recording head positioning accuracy is not lowered, and the deflection of the initialized circumferential direction of the recording medium 1 from the magnetic orientation is little, causing no deterioration of the recording characteristics. Also, setting the azimuth angles of the respective magnetic heads of the slider 10a and slider 10b respectively disposed on the first suspension 11a and the second suspension 11b different from each other, and recording by the magnetic head mounted on the slider 10b of different azimuth angle between the recording track and the recording tack recorded by the magnetic head mounted on the slider 10a, it is possible to make adjacent recording track signals hard to be read and to greatly lessen the recording track pitch, thereby enabling the improvement of the recording density.

Providing a disk drive with the head support device in the fourth exemplary embodiment of the present invention, it is possible to improve the head positioning control characteristics and to realize a disk drive improved in reliability.

According to the fourth exemplary embodiment of the present invention as described above, the effective length of the first link and the second link can be increased, and as a result, the skew angle on the recording medium of the head such as a magnetic head mounted on the slider fitted to each of the first suspension and the second suspension which are fixed on the third link becomes very small as compared with the skew angle in the conventional example, and even when the mode is shifted from reproducing to recording, the recording head positioning accuracy will not be lowered and there will be no deflection of the initialized circumferential direction of the recording medium from the magnetic orientation, causing no deterioration of the recording characteristics and making it possible to realize a head support device of high reliability.

Also, setting the azimuth angles of heads such as magnetic heads mounted on the sliders respectively disposed on the first suspension and the second suspension different from each other, it is possible to make the recording track pitch very small and, consequently, the recording density can be improved.

Accordingly, a disk drive provided with a head support device having such a configuration is capable of improving the head positioning control characteristics and to improve the reliability.

Fifth Exemplary Embodiment (Fifth Exemplary Embodiment)

Figure 17:
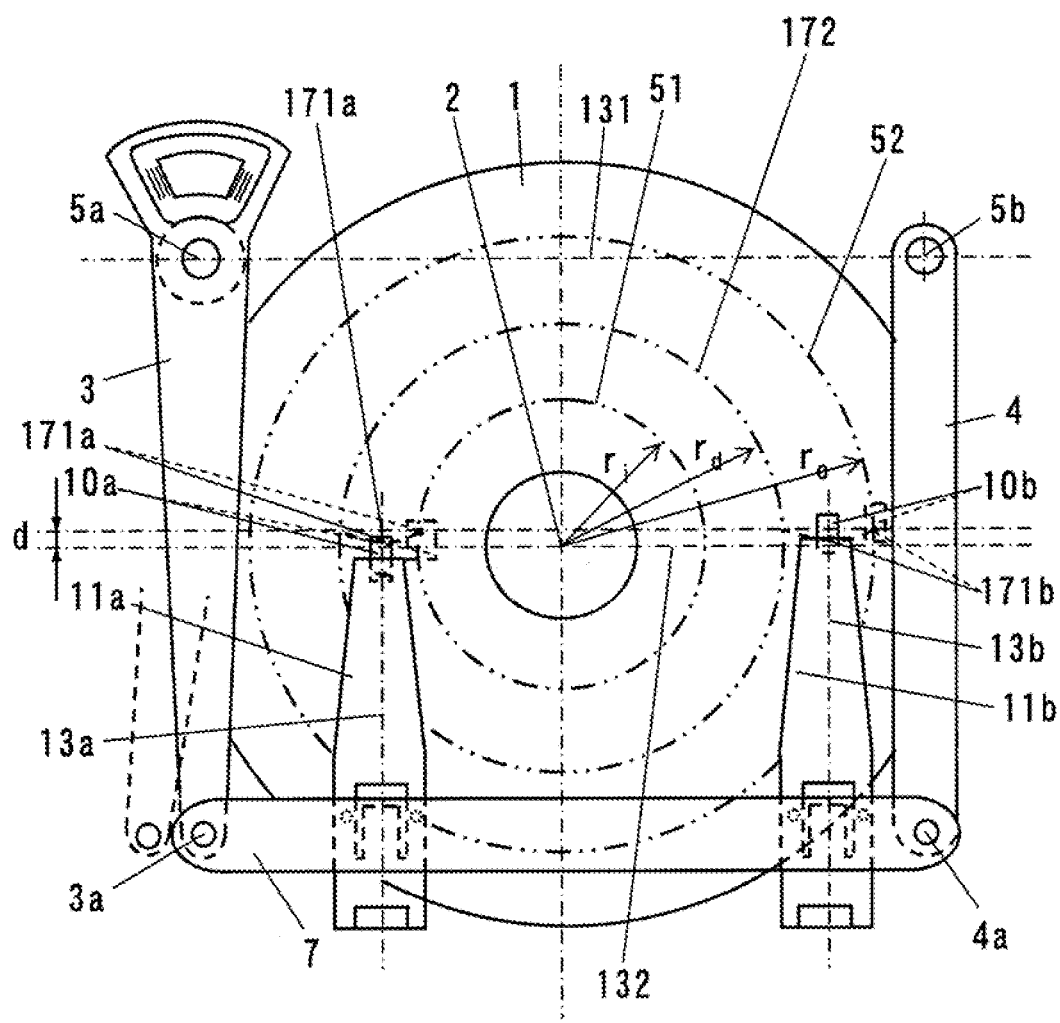
FIG. 17 is a top view showing the configuration of essential components of a head support device and recording medium in the fifth exemplary embodiment of the present invention.

FIG. 17 is a top view showing the configuration of essential components of a head support device and the recording medium, a diagram for describing the head support device in the fifth exemplary embodiment of the present invention. In FIG. 17, the elements corresponding to the component elements in FIG. 13 of the fourth exemplary embodiment are given same reference numerals.

The difference of the head support device of the fifth exemplary embodiment from that of the fourth exemplary embodiment is such that the recordable zone of the recording medium 1 is radially divided into two zones, and the divided two zones are arranged so as to correspond to the first suspension 11a and the second suspension 11b respectively.

In such a configuration, the magnetic heads respectively connected to the first suspension 11a and the second suspension 11b may cover the whole of the recordable zone of the recording medium 1, and further, the rotational angle of the first link 3 for covering the whole of the recordable zone of the recording medium 1 is preferable to be about one half (½) of the rotational angle of the first link 3 in the fourth exemplary embodiment, and the loci against the recording medium 1 of the magnetic heads respectively connected to the first suspension 11a and the second suspension 11b become further nearly linear, greatly lessening the skew angle against the recording track.

The positional relations of the first suspension 11a and the second suspension 11b will be briefly described as example 1 by using FIG. 17.

For example, it is configured in that the magnetic head (not shown) of the first suspension 11a covers the inner peripheral zone of the recordable zone divided into two zones and that the magnetic head connected to the second suspension 11b covers the outer peripheral zone of the recordable zone divided into two zones.

In FIG. 17, the magnetic head connected to the first suspension 11a and the magnetic head connected to the second suspension 11b are respectively disposed on either side of the rotational center 2 of the recording medium 1 in such manner as to have the rotational center 2 of the recording medium 1 therebetween. And, the setting is made so that when center 171a of the magnetic head connected to the first suspension 11a is at distance d in a direction vertical to the diametric line 132 of the recording medium 1 that is parallel with the line 131 connecting the first rotational center 5a to the second rotational center 5b, and also, on innermost periphery 51 of the recordable zone, then the center 171b of the magnetic head connected to the second suspension 11b is at distance d in a direction vertical to the diametric line 132 of the recording medium 1 that is parallel with the line 131, and also, on the outermost periphery 52 of the recordable zone. Further, it is configured in that when the center 171a of the magnetic head of the first suspension 11a is at distance d in a direction vertical to the diametric line 132 and also on separation periphery 172 that radially divides the recordable zone into two zones, then the center 171b of the magnetic head of the second suspension 11b is at distance d in a direction vertical to the diametric line 132 and also on the separation periphery 172 that radially divides the recordable zone into two zones. It is of course preferable to be configured in that the magnetic head connected to the first suspension 11a covers the outer peripheral zone of the recordable zone divided into two zones and that the magnetic head connected to the second suspension 11b covers the inner peripheral zone of the recordable zone.

The other configurations are same as in the fourth exemplary embodiment and the detailed description is omitted. The differences will be outlined in the following.

The loci due to rotation of the first link 3 of the slider 10a and slider 10b respectively disposed on the first suspension 11a and the second suspension 11b are circularly arc-shaped loci identical with the rotational locus of the rotational center 3a against the first link 3 of the third link 7, which are subscribed on the surfaces of the inner peripheral and outer peripheral zones of the divided recordable zones of the recording medium 1. That is, same loci as the rotational locus of the rotational center 3a of the first link 3 are subscribed, by the centers 171a and 171b of head gaps of the magnetic heads respectively mounted on the slider 10a and slider 10b, on the surfaces corresponding to the inner peripheral and outer peripheral zones of the divided recordable zones of the recording medium 1.

Accordingly, same as in the example 1 and example 2 in the fourth exemplary embodiment, the skew angles of the magnetic heads respectively connected to the first suspension 11a and the second suspension 11b can be calculated. In the following description, same as in the fourth exemplary embodiment, in order to assure the floating amounts of the slider 10a and slider 10b at the innermost periphery 51 of the recordable zone of the recording medium 1, the centers of the slider 10a and slider 10b are close to the diametric line 132 of the recording medium 1 at the innermost periphery of the recordable zone, that is, $d=d_0$ in the description.

Described in the following is the radius of the separation periphery 172 of the recordable zone, which divides the zone into two zones covered by the magnetic heads respectively mounted on the slider 10a and slider 10b connected to the first suspension 11a and the second suspension 11b.

Since the loci subscribed by the center 171a and center 171b of head gaps of the magnetic heads respectively mounted on the slider 10a and slider 10b are identical with the rotational locus of the rotation center 3a of the first link 3, the same as in the third exemplary embodiment of the present invention, the arc-shaped loci subscribed by the center 171a and center 171b of head gaps of the magnetic heads are same in length in the direction of x.

Accordingly, the radius of the separation periphery 172 of the recordable zone of the recording medium is rd, and the other marks used are same as those in the fourth exemplary embodiment. Then, since the lengths are same in the direction of x, the formula 33 in the third exemplary embodiment of the present invention is established, obtaining the formula 34.

The skew angle $\alpha_a$ of the magnetic head of the first suspension 11a can be obtained by replacing $r_o$ with $r_d$ in the fourth exemplary embodiment. Similarly, skew angle $\alpha_b$ Of the magnetic head of the second suspension 11b can be obtained by replacing $r_i$ with $r_d$.

Accordingly, the minimum $\alpha_{amin}$ and maximum $\alpha_{amax}$ of skew angle $\alpha_a$ can be calculated by the same calculation method as in the third exemplary embodiment, and the minimum $\alpha_{amin}$ and the maximum $\alpha_{amax}$ of skew angle $\alpha_a$ of the magnetic head connected to the first suspension 11a can be represented by the formula 6 and the formula 37 respectively.

Also, x-coordinate $x_{22}$ of the coordinates $(x_{22}, y_{22})$ of the central point of the circularly arc-shaped locus of the center 171b of the magnetic head of the second suspension 11b can be represented by formula 38 in the third exemplary embodiment.

In this case, skew angle $\alpha_b$ of the magnetic head of the second suspension 11b becomes maximum $\alpha_{bmax}$ when the center 171b of head gap of the magnetic head is located at the separation periphery 172 of the recordable zone, and the skew of the tangent passing through the origin against the circle becomes minimum $\alpha_{bmin}$, thereby obtaining formula 73 as maximum $\alpha_{bmax}$, and formula 74 as minimum $\alpha_{bmin}$.

$$\alpha_{b\,max} = \tan^{-1} \frac{d_0}{\sqrt{r_d^2 - d_0^2}} \quad \text{(formula 73)}$$

$$\alpha_{b\,min} = \tan^{-1} \frac{-x_{22}y_{21} + R\sqrt{x_{22}^2 + y_{21}^2 - R^2}}{R^2 - x_{22}^2} \quad \text{(formula 74)}$$

Then, as to the length and fitting position of the first suspension 11a and the second suspension 11b, the same as in the fourth exemplary embodiment, and the detailed description is omitted, but the first suspension 11a and the second suspension 11b are fixed on the third link 7 in such manner that the centers of the slider 10a and slider 10b respectively fitted to the first suspension 11a and the second suspension 11b are positioned at the coordinates $(x_{21}, L_{21})$ and $(x_{22}, L_{22})$ respectively. Here, $L_{21}$ stands for the formula 41 in the third exemplary embodiment, and $L_{22}$ can be represented by formula 75.

$$L_{22} = y_{21} - (R - d_0) \quad \text{(formula 75)}$$

Also, as example 2, the same as example 2 in the fourth exemplary embodiment, when it is configured in that the magnetic head of the first suspension 11a satisfies the formula 15, the skew angles of the magnetic heads of the first suspension 11a and the second suspension 11b become further smaller values.

Then, the coordinates of the centers of the circularly arc-shaped loci subscribed by the centers of the respective magnetic heads of the first suspension 11a and the second suspension 11b respectively being $(x_{23}, Y_{23})$ and $(x_{24}, Y_{23})$, and the distance in the direction of y axis being $d_{21}$ with respect to the intersections of the arc-shaped loci with the innermost periphery 51, separation periphery 172 and outermost periphery 52 of the recording medium 1, and the radius of separation periphery 172 being $r_{d2}$, and the coordinates can be represented by formula 76, formula 77, and formula 78 respectively.

$$x_{23} = \frac{\left(-\sqrt{r_i^2 - d_{21}^2}\right) + \left(-\sqrt{r_{d2}^2 - d_{21}^2}\right)}{2} \quad \text{(formula 76)}$$

$$y_{23} = d_{21} + \sqrt{R^2 - \left(\frac{\sqrt{r_{d2}^2 - d_{21}^2} - \sqrt{r_i^2 - d_{21}^2}}{2}\right)^2} \quad \text{(formula 77)}$$

$$x_{24} = \frac{\left(\sqrt{r_{d2}^2 - d_{21}^2}\right) + \left(\sqrt{r_o^2 - d_{21}^2}\right)}{2} \quad \text{(formula 78)}$$

Here, the radius of the separation periphery, $r_{d2}$, can be represented by formula 79.

$$r_{d2} = \frac{\sqrt{r_o^2 + r_i^2 + 2d_{21}^2 + 2\sqrt{r_o^2 - d_{21}^2}\sqrt{r_i^2 - d_{21}^2}}}{2} \quad \text{(formula 79)}$$

Accordingly, the same as example 1 in the fifth exemplary embodiment of the present invention, the minimum $\alpha_{amin}$ and maximum $\alpha_{amax}$ of skew angle $\alpha_a$ of the magnetic head located on the circular locus of center 171a of the magnetic head of the first suspension 11a can be obtained, and also, the minimum $\alpha_{bmin}$ and maximum $\alpha_{bmax}$ of skew angle $\alpha_b$ of the magnetic head of the second suspension 11b having same shape as that of the locus subscribed by center 171a of the magnetic head of the first suspension 11a can be obtained, but the detailed description is omitted here.

The maximum $\alpha_{amax}$, $\alpha_{bmax}$ and minimum $\alpha_{amin}$, $\alpha_{bmin}$ of the respective skew angles are calculated by using the same values as in the first exemplary embodiment, and the results are shown in Table 5.

TABLE 5

|  | Example 1 | | Example 2 | | |
| --- | --- | --- | --- | --- | --- |
|  | Slider 10a | Slider 10b | Slider 10a | Slider 10b | Conventional example |
| $\alpha_{max}$ | −5.680° | 5.531° | 0.243° | 0.163° | 18.183° |
| $\alpha_{min}$ | −8.627° | 4.205° | −0.243° | −0.163° | 8.627° |
| $\alpha_{max} - \alpha_{min}$ | 2.937° | 1.326° | 0.486° | 0.326° | 9.556° |
| $x_{21} \sim x_{24}$ | 4.936 | 7.170 | 5.108 | 7.333 | −3.955 |
| $y_{21} \sim y_{23}$ | 16.570 | 16.570 | 15.979 | 15.979 | −13 |

In the fifth exemplary embodiment of the present invention, it has been described supposing that the arc-shaped loci subscribed by the center 171a and center 171b of head gaps of the magnetic heads respectively mounted on the slider 10a and slider 10b respectively connected to the first suspension 11a and the second suspension 11b are same in length in the direction of x, but the present invention is not limited to this configuration. The same as in the third exemplary embodiment, for example, the separation periphery 172 is preferable to be at the midpoint of the innermost periphery 51 and the outermost periphery 52. In that case, it is preferable to set the rotational angle of the first link 3 so as to correspond to the length in the direction of x of the locus. Also, since the magnetic head which covers the outer peripheral side (between the separation periphery 172 and the outermost periphery 52) of the recording medium 1 is smaller in skew angle than the magnetic head which covers the inner peripheral side (between the innermost periphery 51 and the separation periphery 172), the skew angles of the two magnetic heads can be set further smaller by setting it a little larger at the outer peripheral side.

With the head support device configured as described above, the whole of the recordable zone of the recording medium is covered by heads such as magnetic heads respectively mounted on the sliders connected to the two suspensions, and even when the rotational angle of the first link for moving the magnetic heads on the surface of the recording medium is lessened, one of the magnetic heads out of the two magnetic heads may cover the entire range of the recordable zone of the recording medium. Accordingly, the speed of following up the target track can be increased, and providing a disk drive with such head support device, it is possible to realize a disk drive having excellent response and improved in head positioning control characteristics and reliability.

As described above, according to the fifth exemplary embodiment of the present invention, same as in the fourth exemplary embodiment, increasing the effective link lengths of the first link and the second link, and dividing the recordable zone of the recording medium into two zones, the divided zones are covered by heads such as magnetic heads respectively mounted on the sliders fitted to the first suspension and the second suspension, while the whole of the recordable zone of the recording medium is covered by two magnetic heads, and thereby, the skew angles on recording medium of the magnetic heads become very small, and even when the mode is shifted from reproducing to recording, the recording head positioning accuracy will not be lowered, and also, the deflection of the initialized circumferential direction of the recording medium from the magnetic orientation will be little, causing no deterioration of the recording characteristics, and it is possible to realize a head support device of excellent reliability.

Also, the rotational angle of the first link for covering the entire range of the recordable zone is preferable to be small, and therefore, the magnetic head can be enhanced in the speed of following up the target track, enabling the realization of high response.

Accordingly, a disk drive provided with a head support device having such configuration assures excellent response and it is possible to improve the head positioning control characteristics and reliability.

Sixth Exemplary Embodiment (Sixth Exemplary Embodiment)

Figure 18:
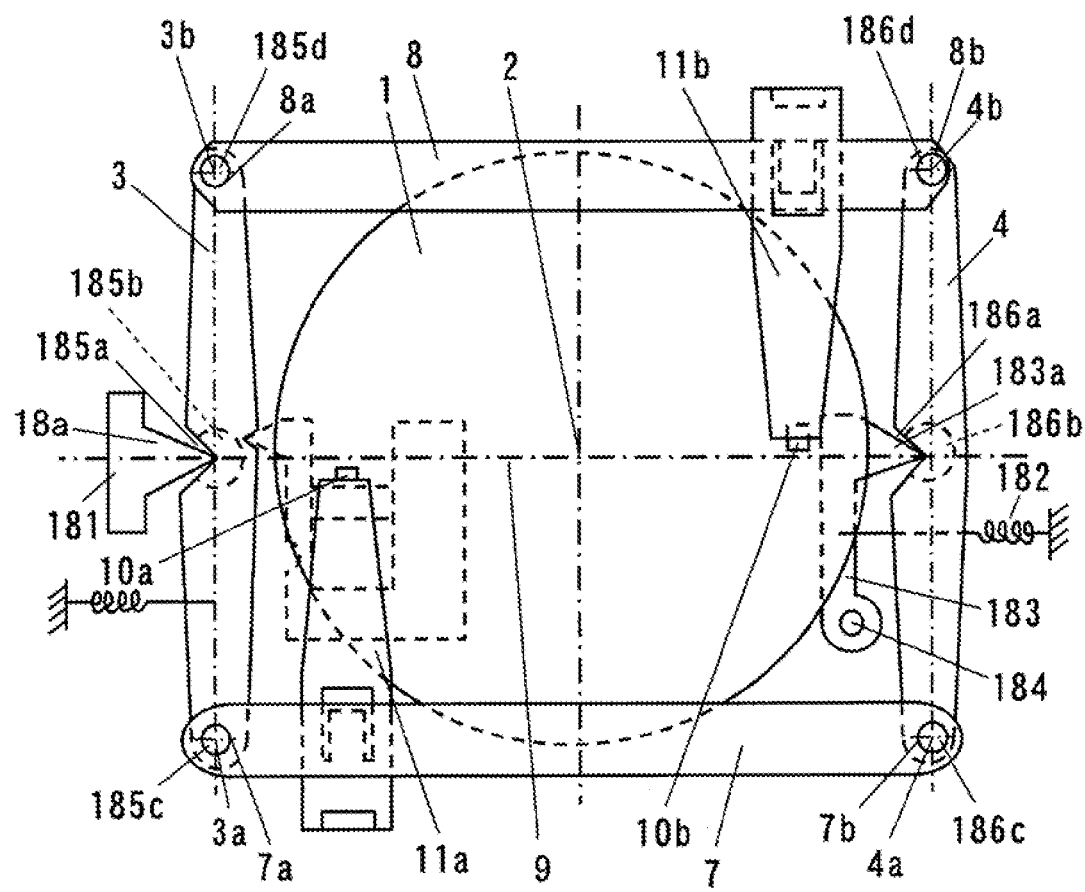
FIG. 18 is a top view showing the configuration of essential components of a head support device and recording medium in the sixth exemplary embodiment of the present invention.

FIG. 18 is a top view of essential components for describing the configuration of a head support device and recording medium, a diagram for describing the head support device in the sixth exemplary embodiment of the present invention. In FIG. 18, the elements corresponding to the component elements in FIG. 1 of the first exemplary embodiment are given same reference numerals as in FIG. 1.

The head support device in the sixth exemplary embodiment is a device to suppress the influence of gaps between the bearing and rotary shaft for example at the rotating parts of the links as against the first exemplary embodiment, and the configuration including the first link, the second link, the third link, the fourth link, and two sets of suspensions having sliders with heads such as magnetic heads (signal conversion elements) respectively mounted thereon is same as in the first exemplary embodiment, and the configuration of the respective rotational centers of the first link and the second link differs from that of the first exemplary embodiment, and the differences are mainly described in the following.

In FIG. 18, bearing support 181 provided with generally triangular projection 181a is embedded in a fixing member such as a substrate or casing of the device. On the other hand, push arm 183 activated clockwise by spring 182 and having generally triangular push portion 183a at one end thereof is disposed in such manner as to be rotatable about shaft 184 embedded in a substrate or casing. And, the line that connects the respective peaks of the projection 181a of the bearing support 181 and the push portion 183a of the push arm 183 coincides with the diametric line 9 passing through the rotational center 2 of the recording medium 1.

The first link 3 is provided with boss 185b having generally triangular notch 185a with an apex angle larger than the generally triangular apex angle of the projection 181a of the bearing support 181, rotary shaft 185c having rotational center 3a at one side, and rotary shaft 185d having rotational center 3b at the other side.

Also, the second link 4, same as the first link 3, is provided with boss 186b having generally triangular notch 186a with an apex angle larger than the generally triangular apex angle of the push portion 183a of the push arm 183, rotary shaft 186c having rotational center 4a at one side, and rotary shaft 186d having rotational center 4b at the other side.

Further, the peak of the generally triangular notch 185a formed in the boss 185b of the first link 3 abuts the peak of the generally triangular shape of the projection 181a of the bearing support 181, thereby making the first link 3 rotatable, and also, the peak of the generally triangular notch 186a formed in the boss 186b of the second link 4 abuts the peak of the generally triangular push portion 183a of the push arm 183, thereby making the second link 4 rotatable on the peak of the generally triangular push portion 183a of the push arm 183 as the second rotational center.

In this case, the rotational center 3b of the first link 3 and the rotational center 4b of the second link 4 are located on the respective extensions of the lines that connect the peak of the notch 185a of the boss 185b of the first link 3 to the rotational center 3a and the peak of the notch 186a of the boss 186b of the second link 4 to the rotational center 4a. Also, the distance from the peak of the notch 185a of the boss 185b of the first link 3 to the rotational center 3a, that is, the first effective link length of the first link 3, and the distance from the peak of the notch 186a of the boss 186b of the second link 4 to the rotational center 4a, that is, the first effective link length of the second link 4, are nearly identical with each other, the same as in the first exemplary embodiment. Also, the distance from the peak of the notch 185a of the boss 185b of the first link 3 to the rotational center 3b, that is, the second effective link length of the first link 3, and the distance from the peak of the notch 186a of the boss 186b of the second link 4 to the rotational center 4b, that is, the second effective link length of the second link 4, are nearly identical with each other, and also nearly identical with the second effective link length of the first link 3 or the second link 4.

Also, the third link 7 is provided with hole 7a which engages the rotary shaft 185c of the first link 3 at one side and hole 7b which engages the rotary shaft 186c of the second link 4 at the other side, and connected so as to be rotatable about the respective rotational center 3a and rotational center 4a of the rotary shaft 185c of the first link 3 and the rotary shaft 186c of the second link 4. The third link 7 is securely fitted with the first suspension 11a having slider 10a.

On the other hand, the fourth link 8 having hole 8a and hole 8b which respectively engage the rotary shaft 185d having the rotational center 3b and the rotary shaft 186d having the rotational center 4b which are respectively disposed at the other sides of the first link 3 and the second link 4 is rotatably connected to the first link 3 and the second link 4.

Figure 19:
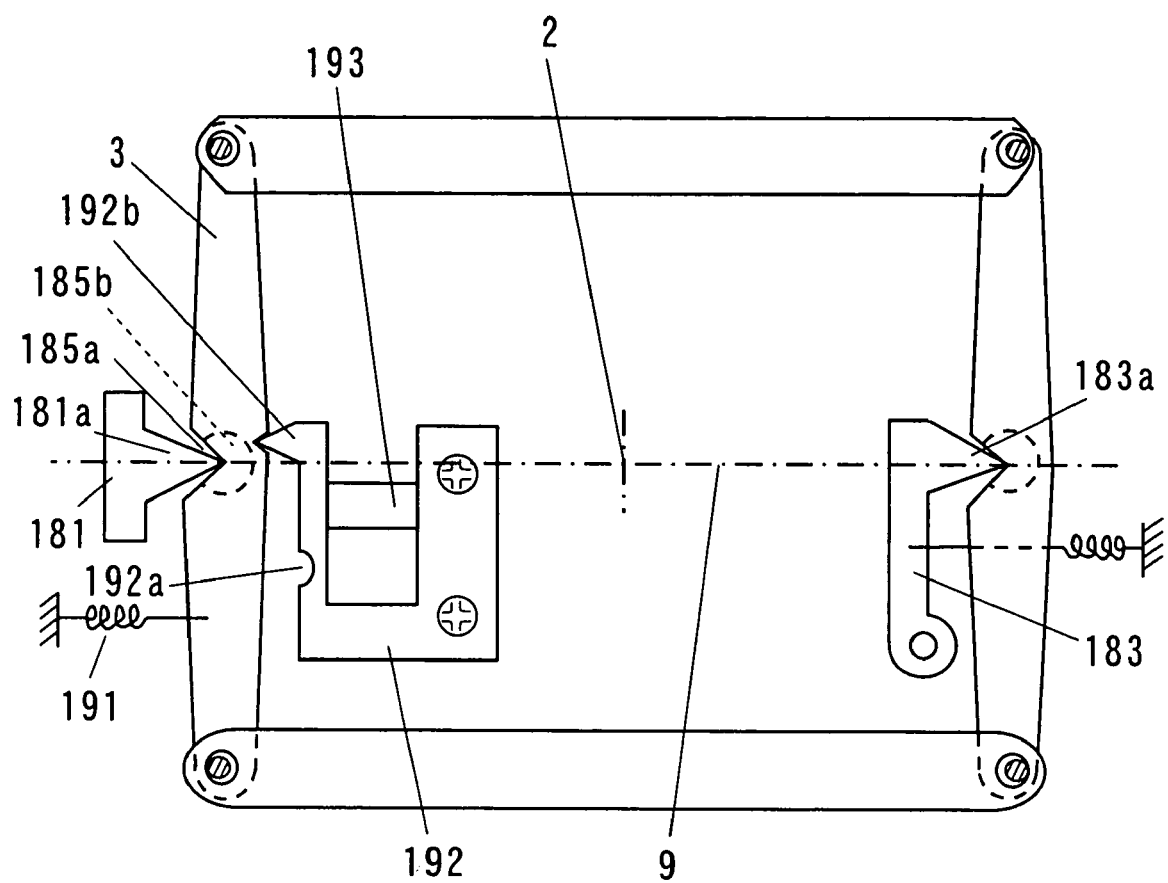
FIG. 19 is a partly enlarged view showing a driving method of a head support device in the sixth exemplary embodiment of the present invention.

Also, as shown in the partly enlarged view of FIG. 19, the first link 3 is activated by spring 191 which rotates the first link 3 clockwise. Further, as a driving method for a head support device, push portion 192b having a generally triangular-shaped end of generally U-shaped drive arm 192 having depression 192a in a part thereof for making its displacement easier, which is fixed on a substrate or casing, pushes the opposite side of the notch 185a of the boss 185b of the first link 3 at a position a little deviated from the line connecting the apex of the projection 181a of the bearing support 181 to the apex of the push portion 183a of the push arm 183, that is, the diametric line 9 passing through the rotational center 2 of the recording medium 1.

On the other hand, one end of the piezoelectric element 193 is fixed on one side of the generally U-shaped portion fixed on a substrate or casing of the drive arm 192, and the other end is fixed on the side of the push portion 192b opposing to one side of the generally U-shaped portion of the drive arm 192. With voltage applied to the piezoelectric element 193, the side of the push portion 192b of the drive arm 192 is displaced. Accordingly, a driving means is configured in that due to the activating force of the spring 191 and the pushing force of the push portion 192b of the drive arm 192, the peak of the notch 185a of the boss 185b of the first link 3 is pushed and abutted on the peak of the triangular-shaped projection 181a of the bearing support 181, then the deviation of the push portion 192b of the drive arm 192 caused by expansion and contraction of the piezoelectric element 193 causes the first link 3 to rotate about the peak of the triangular-shaped projection 181a of the bearing support 181.

In the above description, the push portion of the drive arm is generally triangular-shaped, but it is of course possible to obtain similar effects by using a peak with curvature same as that of the push portion, the projection of the link, for example, a generally triangular shape, generally conic shape, generally semi-oval shape, generally semi-circular shape or the like.

The respective peaks of the notch 185a of the boss 185b of the first link 3 and the notch 186a of the boss 186b of the second link 4 are preferable to be shaped so as to have slight R (curvature) instead of having acute angles. In this case, however, it is required that the respective centers of the R (curvature) be located on the respective lines that connect the rotational center 3a to the rotational center 3b of the first link 3 and the rotational center 4a to the rotational center 4b of the second link 4. And, the respective centers of the R (curvature) correspond to the respective first rotational center and second rotational center of the first link 3 and the second link 4.

Figure 20:
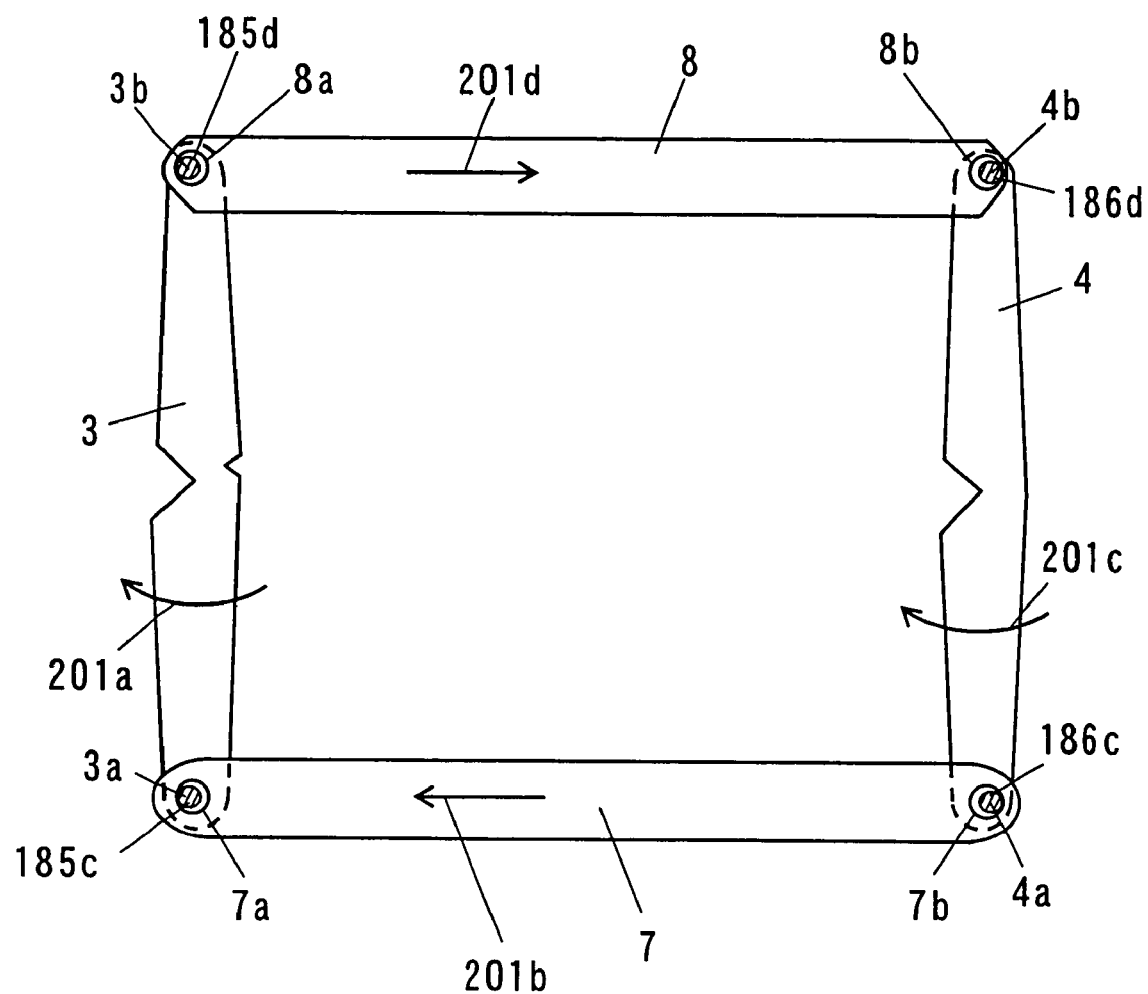
FIG. 20 is a partly enlarged top view showing the relationship between rotary shafts and holes against respective links of a head support device in the sixth exemplary embodiment of the present invention.

The peak of the notch 186a of the second link 4 is pushed by the pressure of the push portion 183a of the push arm 183 in the direction opposite to the direction of the rotational center 2 of the recording medium 1, and as shown in FIG. 20, the respective rotary shafts 185c, 185d, 186c, 186d of the first link 3 and the second link 4 at the respective rotational centers 3a, 3b, 4a, 4b of the first link 3 and the second link 4 are pushed against the side end surfaces of holes 7a, 7b, 8a, 8b respectively disposed in the third link 7 and the fourth link 8, and the respective rotary shaft 185c and rotary shaft 186c at the rotational center 3a and the rotational center 4a are abutted on the side end surfaces going apart from each other of the hole 7a and hole 7b, and also, the rotary shaft 185d and rotary shaft 186d at the rotational center 3b and the rotational center 4b are abutted on the side end surfaces going apart from each other of the hole 8a and hole 8b.

Accordingly, when the first link 3 is rotated in the direction of arrow 201a, the third link 7 moves in the direction of arrow 201b without being influenced by gaps between the rotary shaft 185c and the hole 7a at the rotational center 3a. Similarly, as the third link 7 is moved, the second link 4 is rotated in the direction of arrow 201c without being influenced by gaps between the rotary shaft 186c and the hole 7b. Further, as the second link 4 is rotated, the fourth link 8 moves in the direction of arrow 201d without being influenced by gaps between the rotary shaft 186d and the hole 8b.

The generally triangular-shaped peak of the projection 181a of the bearing support 181 or the peak of the generally triangular-shaped notch 185a formed in the boss 185b of the first link 3 is to be the first rotational center 5a of the first link 3 in the first exemplary embodiment, and the peak of the generally triangular-shaped push portion 183a of the push arm 183 or the peak of the generally triangular-shaped notch 186a formed in the boss 186b of the second link 4 is to be the rotational center similar to the second rotational center 5b of the second link 4 in the first exemplary embodiment. Consequently, the configuration or positional relations in securing the first suspension 11a with slider 10a onto the third link 7 and the second suspension 11b with slider 10b onto the fourth link 8, and the locus subscribed on the surface of the recording medium 1 of the slider 10a fitted on the first suspension 11a and the skew angle of the magnetic head are same as in the first exemplary embodiment and the second exemplary embodiment, and the detailed description is omitted here.

In the above description, the bearing support 181 is arranged at the opposite side of the recording medium 1 in the configuration described, but it is of course possible to be configured in that the bearing support 181 is arranged at the same side as the recording medium 1.

Figure 21:
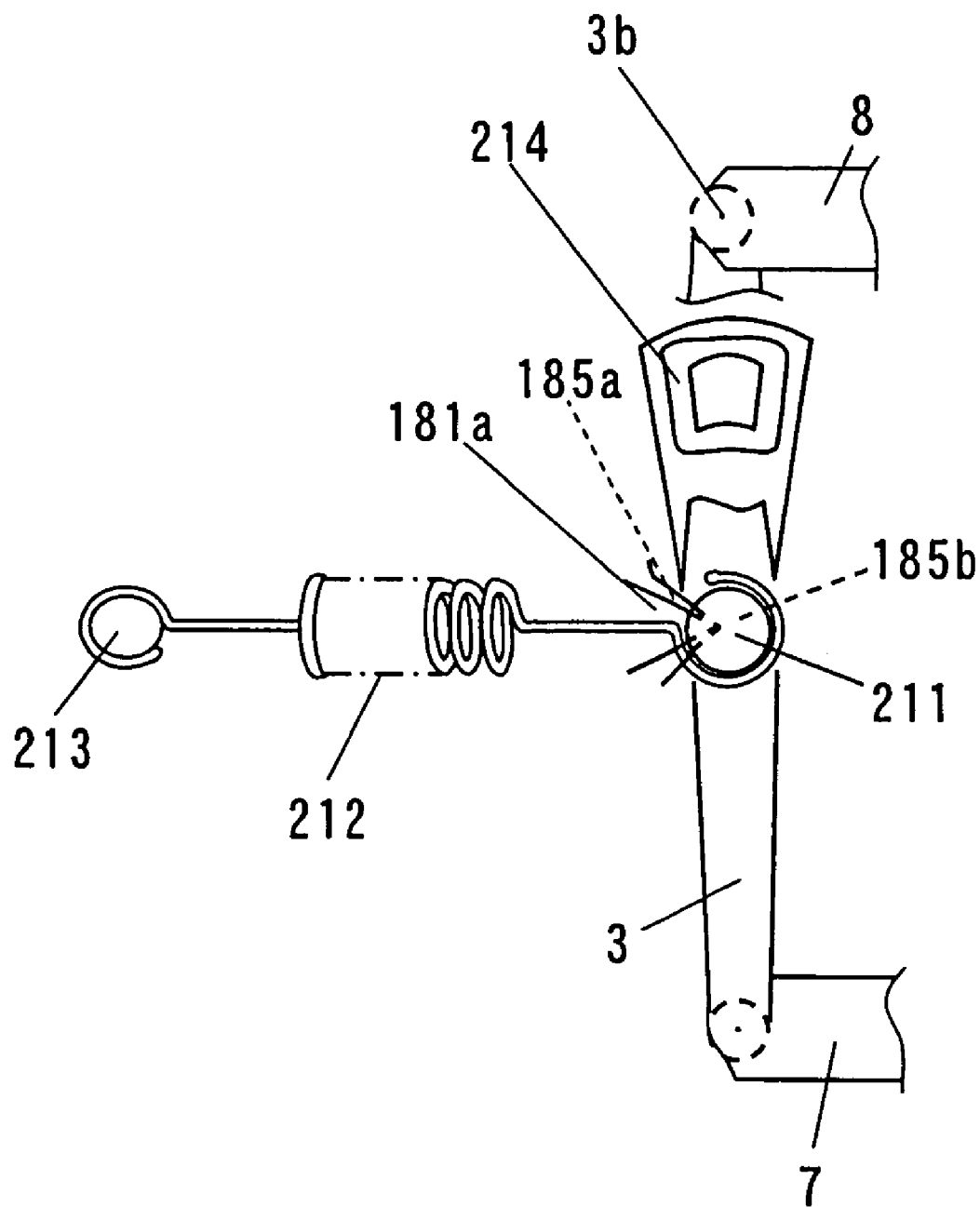
FIG. 21 is a partly enlarged view showing another example of driving method of a head support device in the sixth exemplary embodiment of the present invention.

Next, a case of using a driving method by voice coil motor that is a well-known driving method for a head support device will be briefly described with reference to FIG. 21. In FIG. 21, the elements corresponding to the component elements in FIG. 18 of the sixth exemplary embodiment are given same reference numerals as those in FIG. 18.

In FIG. 21, column-like spring stopper 211 centered about the peak of the notch 185a of the boss 185b of the first link 3 abutting the peak of the generally triangular shape of the projection 181a of the bearing support 181 is disposed on the first link 3, and one end of the spring 212 is stopped by the spring stopper 211, and the other end is stopped by fixed side spring stopper 213 embedded in a fixing member like a substrate, thereby activating the first link 3 toward the bearing support 181. On the other hand, well-know voice coil 214 is disposed at the rotational center 3b side of the first link 3. There is of course provided a permanent magnet (not shown) opposing to the voice coil 214.

With voltage applied to the voice coil 214, the first link 3 is rotated about the peak of the projection 181a of the bearing support 181, and the first suspension 11a fixed on the third link 7 and the second suspension 11b fixed on the fourth link 8 moves over the recording medium 1, then the slider 10a and the slider 10b respectively mounted on heads (not shown) such as magnetic heads arcuately reciprocate on the recording medium 1.

It is also preferable to dispose the voice coil 214 on the second link 4 instead of the first link 3. Also, the method of driving the head support device is not limited to the method of using a voice coil motor, but it is preferable to employ a method using a servo motor or the like.

Figure 22:
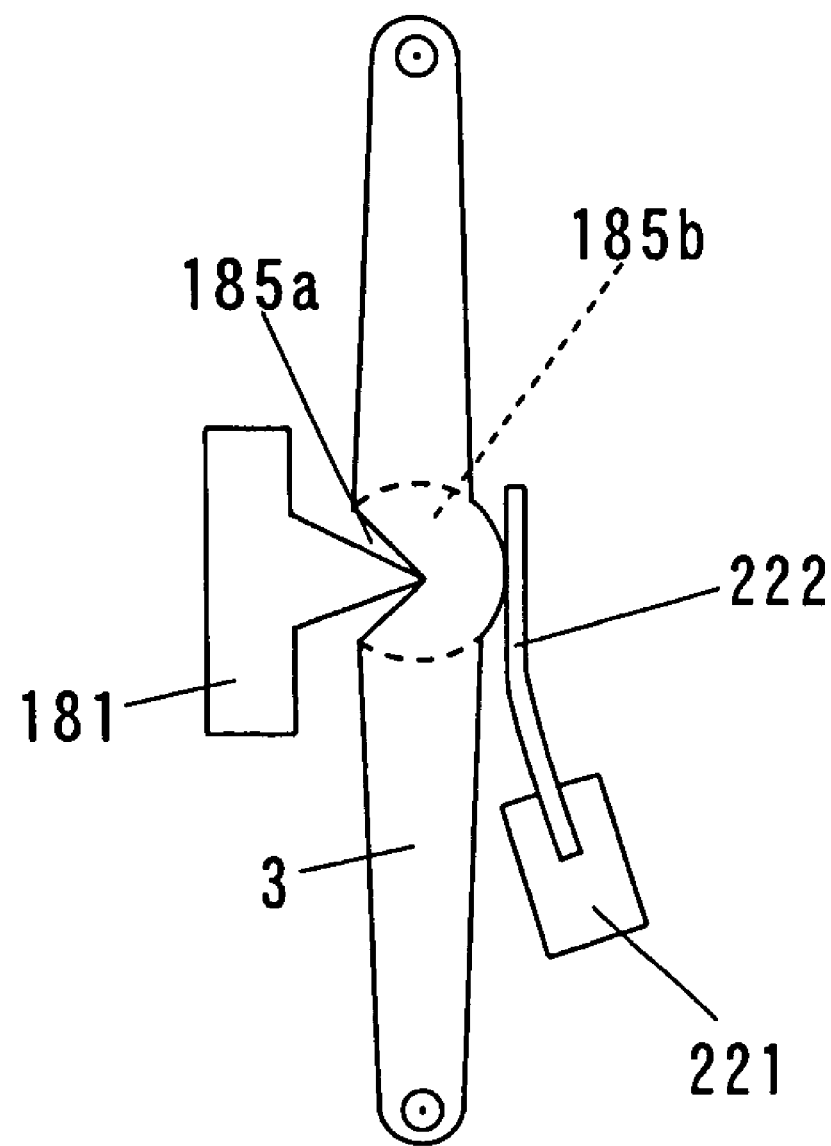
FIG. 22 is a partly enlarged view showing another method of activating the first link in the sixth exemplary embodiment of the present invention.

Further, FIG. 22 shows another method of activating the thirst link 3 toward the bearing support 181. FIG. 22 is a partly enlarged view in the vicinity of the notch 185a of the first link 3. In FIG. 22, the opposite side of the notch 185a at the boss 185b of the first link 3 is cylindrical, and plate spring type spring member 222 embedded in spring holding member 221 secured to a fixing member such as a substrate or structure is abutted on the cylindrical side surface, thereby activating the first link 3 toward the bearing support 181. As a driving means of the head support device, it is preferable to use a well-known method same as shown in FIG. 21, and the detailed description is omitted here.

In the sixth exemplary embodiment, described is a configuration including the bearing support 181 provided with projection 181a and the first link 3 provided with notch 185a, but the present invention is not limited to this configuration. For example, it is preferable to be configured in that the bearing support 181 is provided with generally triangular-shaped notch 185a and the first link 3 is provided with generally triangular-shaped projection 181a, and the peak of the notch 185a of the bearing support 181 is abutted on the peak of the first link 3, which serves as the first rotational center of the first link 3.

Also, the first suspension 11a and the second suspension 11b vertically sandwich the topside and underside of the recording medium 1 or there are provided the third suspension 11c and the fourth suspension 11d, and the first suspension 11a, the second suspension 11b, the third suspension 11c, and the fourth suspension 11d are arranged in correspondence to the topside and underside of the recording medium 1. This configuration is identical with that of the first exemplary embodiment or the second exemplary embodiment, and the detailed description is omitted here.

Also, the same as in the first exemplary embodiment and the second exemplary embodiment, it is of course possible to set so that the head support device is balanced in gravity center, and to realize excellent impact resistance against external shocks or the like.

Figure 23:
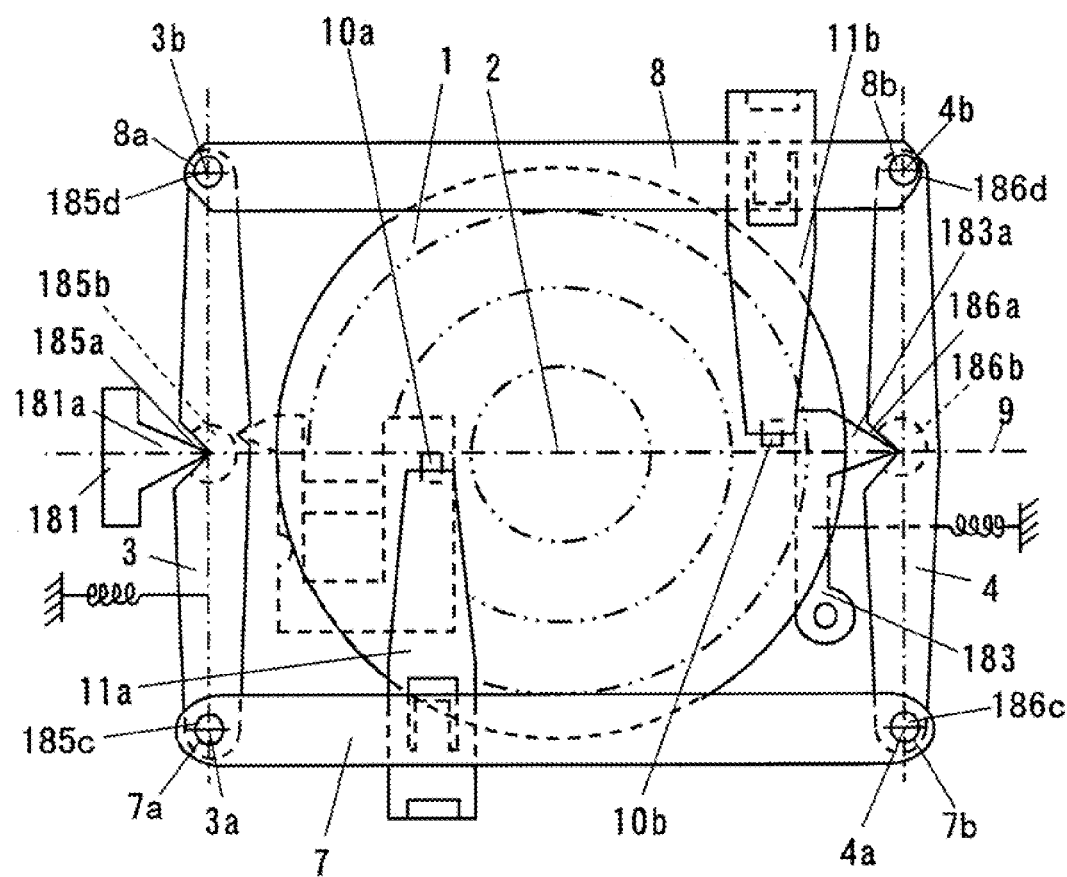
FIG. 23 is a top view showing another example of configuration of essential components of a head support device and recording medium in the sixth exemplary embodiment of the present invention.

Further, as in the third exemplary embodiment of the present invention, as for a head support device configured in that the recordable zone of the recording medium is divided into two zones, and each of the divided zones is covered by the head such as magnetic head mounted on the slider fitted to each of the first suspension and the second suspension, and the whole of the divided recordable zones of the recording medium is covered by two magnetic heads, as shown in FIG. 23, it is possible to apply the configuration of respective rotational centers of the first link 3 and the second link 4 and the method of driving the head support device in the sixth exemplary embodiment of the present invention. Since the configurations are identical with the combination of the third exemplary embodiment and the sixth exemplary embodiment, the detailed description is omitted.

By using such configuration, the head support device in the sixth exemplary embodiment of the present invention, same as in the above exemplary embodiment, is capable suppressing the influence of gaps between the rotary shafts 185c, 185d, 186c, 186d of the respective rotational centers 3a, 3b, 4a, 4b and the holes 7a, 8a, 7b, 8b with respect to the third link 7 and the fourth link 8 at the first link 3 and the second link 4, and the same as in the third exemplary embodiment, the whole of the divided recordable zones of the recording medium 1 is covered by two magnetic heads, and thereby, the skew angles on the recording medium 1 of the respective magnetic heads become very small, and also, the small rotational angle of the first link 3 is able to cover the entire range of the recordable zone, and the follow-up speed of the magnetic head to the target track can be increased and it is possible to realize high response.

As described above, according to the sixth exemplary embodiment, same effects as in the first exemplary embodiment and the second exemplary embodiment can be obtained, and also, for example when the signal conversion element such as magnetic head is moved to the target track, the element can be reliably moved toward the target track without being influenced by gaps at rotating parts of the links even in case of fine movement, and it is possible to shorten the access time for moving the signal conversion element to the target track.

Also, as a method of driving the head support device, piezoelectric element is employed to move the signal conversion element with slight expansion and contraction of the piezoelectric element, and therefore, high response performance can be obtained and it is possible to further shorten the access time.

Accordingly, a disk drive provided with a head support device having such a configuration may improve the head positioning control characteristics and reliability.

Seventh Exemplary Embodiment (Seventh Exemplary Embodiment)

Figure 24:
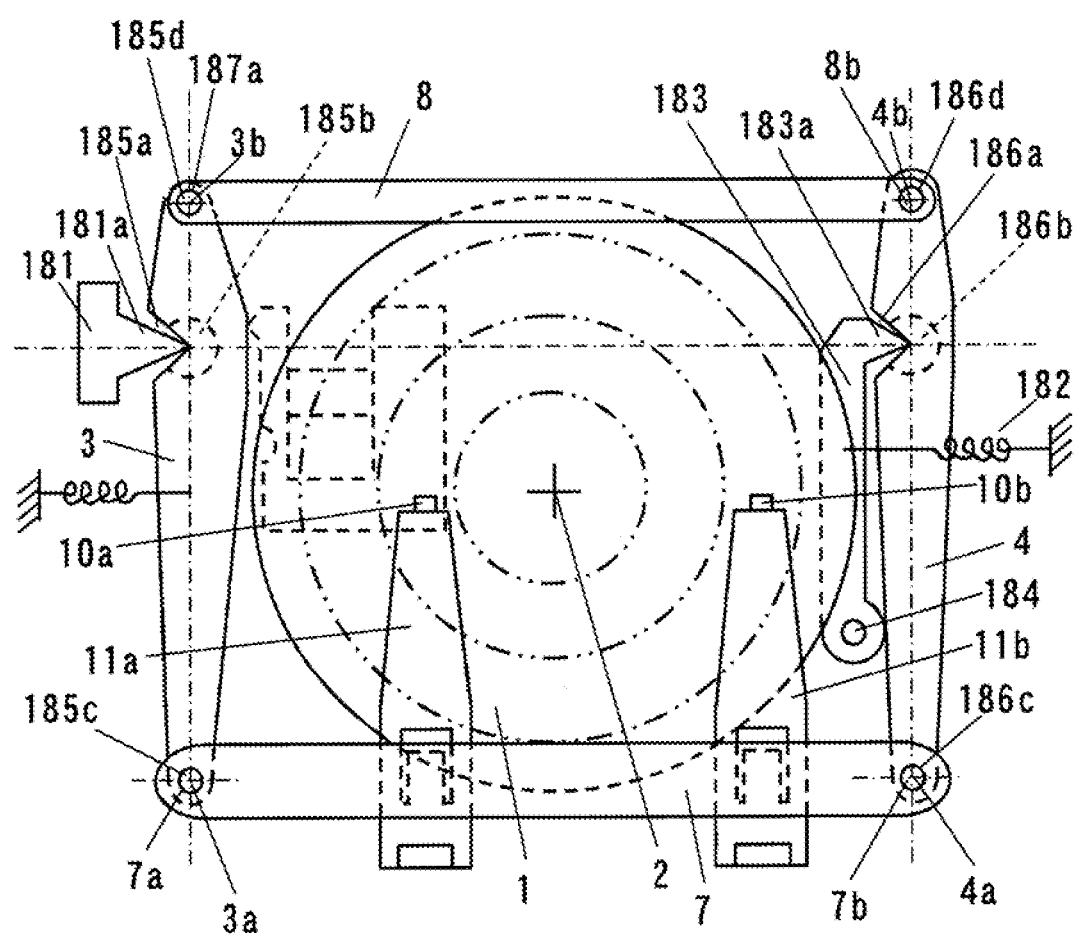
FIG. 24 is a top view showing the configuration of essential components of a head support device and recording medium in the seventh exemplary embodiment of the present invention.

FIG. 24 is a top view showing the configuration of essential components of a head support device and recording medium in drive disk, a diagram for describing the head support device of the drive disk in the seventh exemplary embodiment of the present invention. In FIG. 24, the elements corresponding to the component elements in FIG. 13 of the fourth exemplary embodiment and FIG. 18 of the sixth exemplary embodiment are given same reference numerals as in FIG. 13 and FIG. 18.

The head support device in the seventh exemplary embodiment is a device to suppress the influence of gaps between the rotary shaft bearing and rotary shaft for example at the rotating parts of the links the same as in the sixth exemplary embodiment. Also, the configuration including the first link, the second link, the third link, and two sets of suspensions having sliders with magnetic heads (signal conversion elements) respectively mounted thereon is same as in the fourth exemplary embodiment and the fifth exemplary embodiment, and the addition of the fourth link, the configuration of the respective rotational portions of the first link and the second link and the method of driving the first link or the second link are mainly different from those of the fourth exemplary embodiment and the fifth exemplary embodiment, and the differences are mainly described in the following.

The head support device in the seventh exemplary embodiment of the present invention will be described with reference to FIG. 24. In FIG. 24, the bearing support 181 provided with generally triangular-shaped projection 181a is embedded in a fixing member such as a substrate or casing of the device. On the other hand, there is provided the push arm 183 having generally triangular-shaped push portion 183a at one end thereof, which is rotatable about shaft 184 embedded in a substrate or casing and is activated clockwise by spring 182.

The first link 3 is provided with boss 185b having generally triangular-shaped notch 185a with an apex angle larger than the generally triangular apex angle of the projection 181a of the bearing support 181, rotary shaft 185c having rotational center 3a at one side, and rotary shaft 185d having rotational center 3b at the other side.

Also, the second link 4, same as the first link 3, is provided with boss 186b having generally triangular-shaped notch 186a with an apex angle larger than the generally triangular apex angle of the push portion 183a of the push arm 183, rotary shaft 186c having rotational center 4a at one side, and rotary shaft 186d having rotational center 4b at the other side. In this case, the distance from the peak of the notch 186a of the boss 186b of the second link 4 to the rotational center 4a, that is, the first effective link length of the second link 4, and the distance from the peak of the notch 185a of the boss 185b of the first link 3 to the rotational center 3a, that is, the first effective link length of the first link 3, are nearly identical with each other, the same as in the fourth exemplary embodiment. Also, the distance from the peak of the notch 186a of the boss 186b of the second link 4 to the rotational center 4b, that is, the second effective link length of the second link 4, and the distance from the peak of the notch 185a of the boss 185b of the first link 3 to the rotational center 3b, that is, the second effective link length of the first link 3, are nearly identical with each other.

Also, the third link 7 is provided with hole 7a which engages the rotary shaft 185c of the first link 3 at one side and hole 7b which engages the rotary shaft 186c of the second link 4 at the other side, and connected so as to be rotatable about the respective rotational center 3a and rotational center 4a of the rotary shaft 185c of the first link 3 and the rotary shaft 186c of the second link 4, and the third link 7 provided with the first suspension 11a and the second suspension 11b with slider 10a and slider 10b respectively fitted thereon is arranged and fixed the same as in the fourth exemplary embodiment and the fifth exemplary embodiment.

Further, the peak of the notch 185a of the first link 3 is abutted on the peak of the projection 181a of the bearing support 181 and is in a state of being rotatable. Similarly, the peak of the notch 186a of the second link 4 is abutted on the peak of the generally triangular-shaped push portion 183a of the push arm 183 and is in a state of being rotatable.

On the other hand, the fourth link 8 having hole 8a and hole 8b which respectively engage the rotary shaft 185d having the rotational center 3b and the rotary shaft 186d having the rotational center 4b which are respectively disposed at the other sides of the first link 3 and the second link 4 is rotatably connected to the first link 3 and the second link 4. The rotational center 3b of the first link 3 and the rotational center 4b of the second link 4 are respectively located on the extension lines connecting the peak of the notch 185a of the boss 185b of the first link 3 to the rotational center 3a and the peak of the notch 186a of the boss 186b of the second link 4 to the rotational center 4a.

Figure 25:
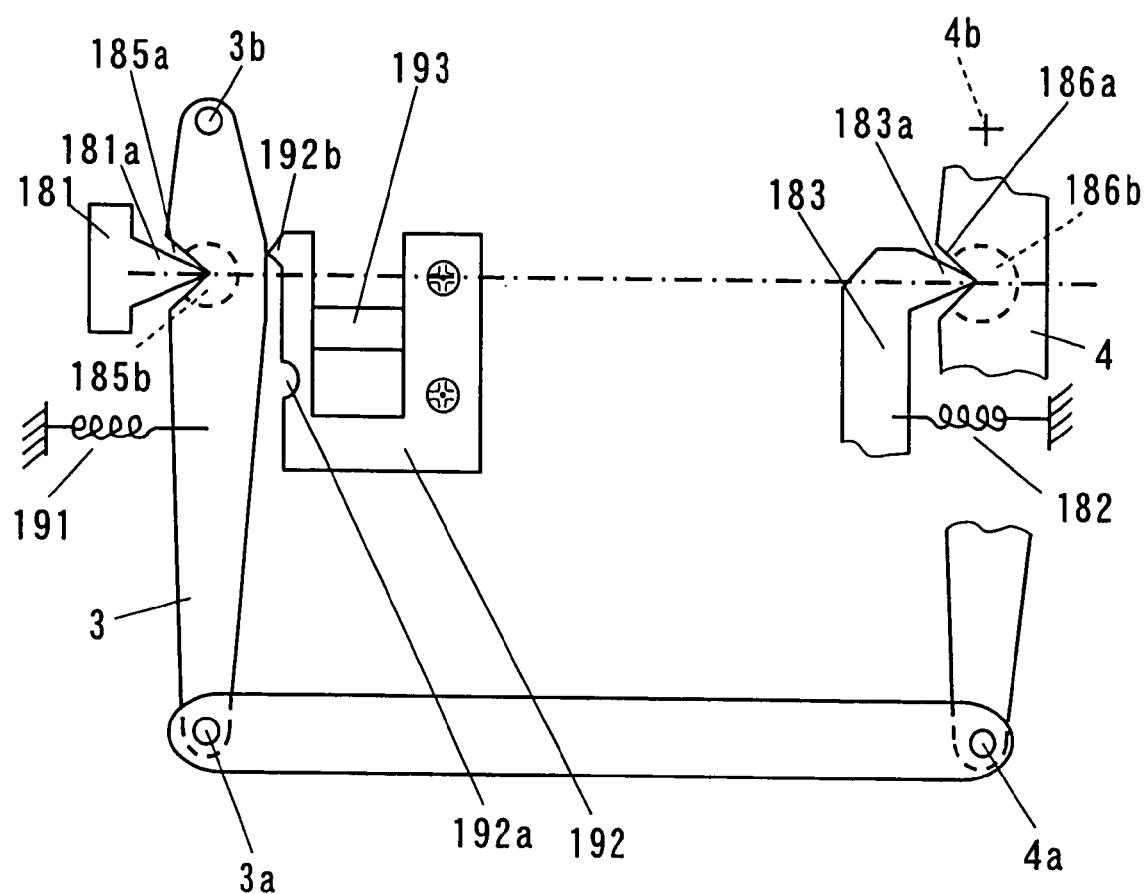
FIG. 25 is a partly detailed view for describing a driving method of a head support device in the seventh exemplary embodiment of the present invention.
Figure 26:
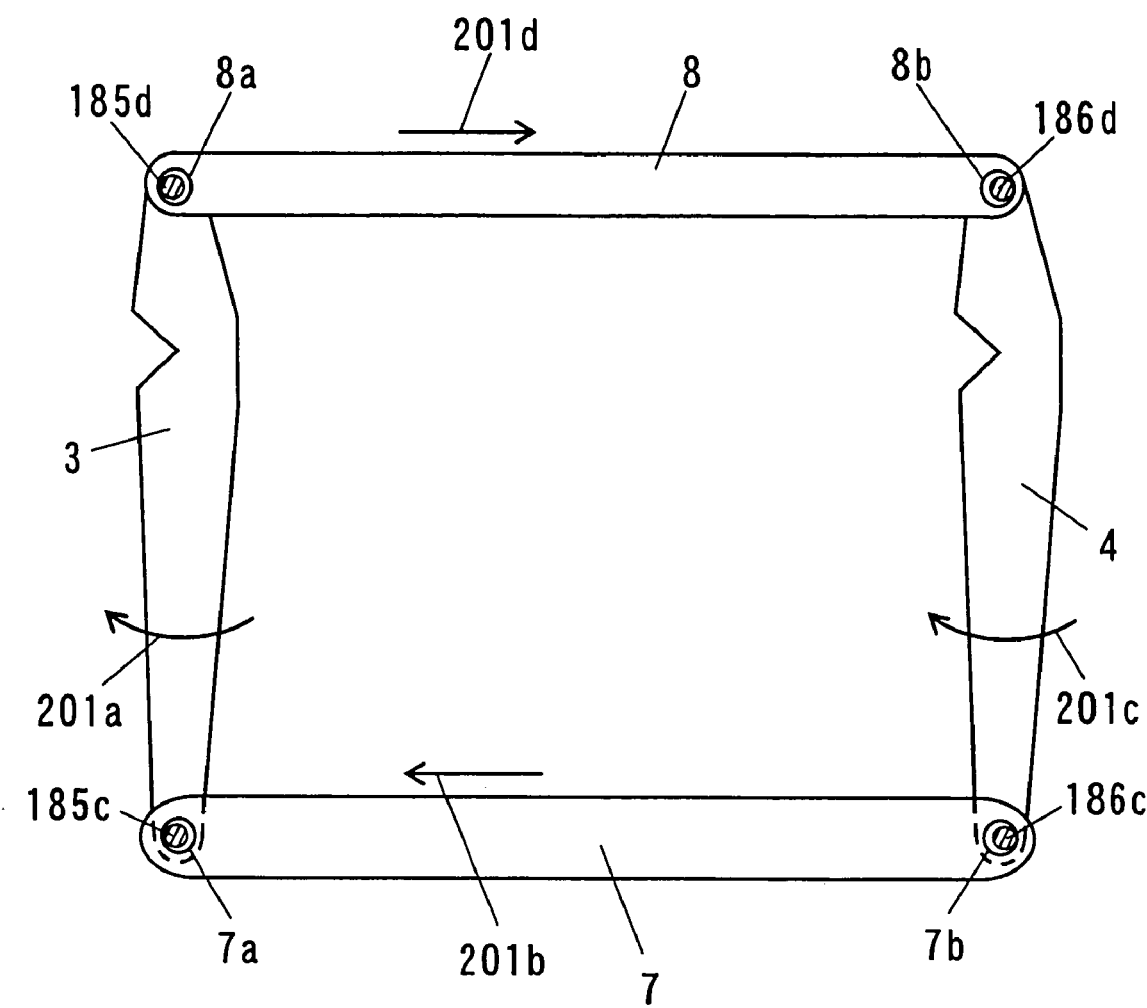
FIG. 26 is a partly top view showing the gap relationship between rotary shafts and holes against respective links of a head support device in the seventh exemplary embodiment of the present invention.

Also, FIG. 25 is a partly detailed view for the method of driving the head support device in the seventh exemplary embodiment of the present invention. The first link 3 is activated by spring 191 which rotates the first link 3 clockwise. Further, as the configuration of driving method and driving means for a head support device, the configuration of driving method and driving means same as in the sixth exemplary embodiment are employed, and the operation, as shown in FIG. 26, is same as in the sixth exemplary embodiment. Accordingly, the description of these is omitted.

The generally triangular-shaped peak of the projection 181a of the bearing support 181 or the peak of the generally triangular-shaped notch 185a formed in the boss 185b of the first link 3 is to be the first rotational center 5a of the first link 3 in the fourth exemplary embodiment or the fifth exemplary embodiment, and the peak of the generally triangular-shaped push portion 183a of the push arm 183 or the peak of the generally triangular-shaped notch 186a formed in the boss 186b of the second link 4 is to be the rotational center similar to the second rotational center 5b of the second link 4 in the fourth exemplary embodiment or the fifth exemplary embodiment. Consequently, the configuration or positional relations in securing the first suspension 11a and the second suspension 11b respectively fitted with slider 10a and slider 10b onto the third link 7, and the locus subscribed on the surface of the recording medium 1 of the sliders 10a, 10b respectively fitted on the first suspension 11a and the second suspension 11b and the skew angle of the magnetic head are same as in the fourth exemplary embodiment and the fifth exemplary embodiment, and the detailed description is omitted here.

Figure 27:
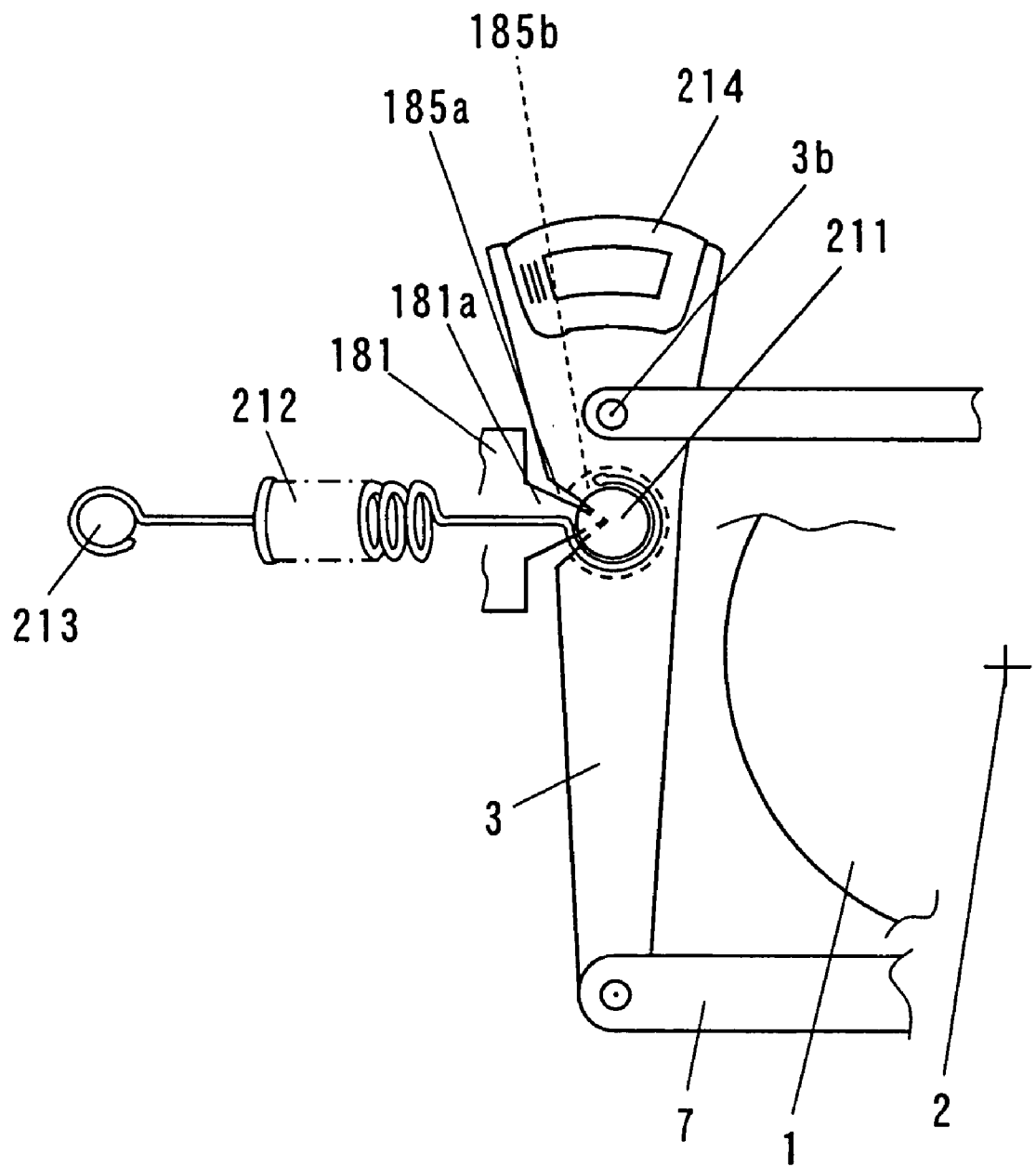
FIG. 27 is a partly detailed view for describing another example of driving method of a head support device in the seventh exemplary embodiment of the present invention.

Next, a case of using a driving method by voice coil motor that is a well-known driving method for a head support device will be briefly described with reference to FIG. 27. In FIG. 27, the difference from the case of using a driving method by voice coil (see FIG. 21) in the sixth exemplary embodiment is that the first link 3, the rotational center 3b of the rotary shaft 185d rotatably connecting the fourth link 8, and the fourth link 8 are positioned rather closer to the first rotational center 5a of the first link than the position of the voice coil motor, and the other configuration is identical with that of the sixth exemplary embodiment. Accordingly, the detailed description is omitted here.

With voltage applied to the voice coil 214, the first link 3 is rotated about the peak of the projection 181a of the bearing support 181, and the first suspension 11a and the second suspension 11b which are fixed on the third link 7 move over the recording medium 1, then the slider 11a and the slider 10b respectively mounted on magnetic heads (not shown) arcuately reciprocate on the recording medium 1.

Figure 28:
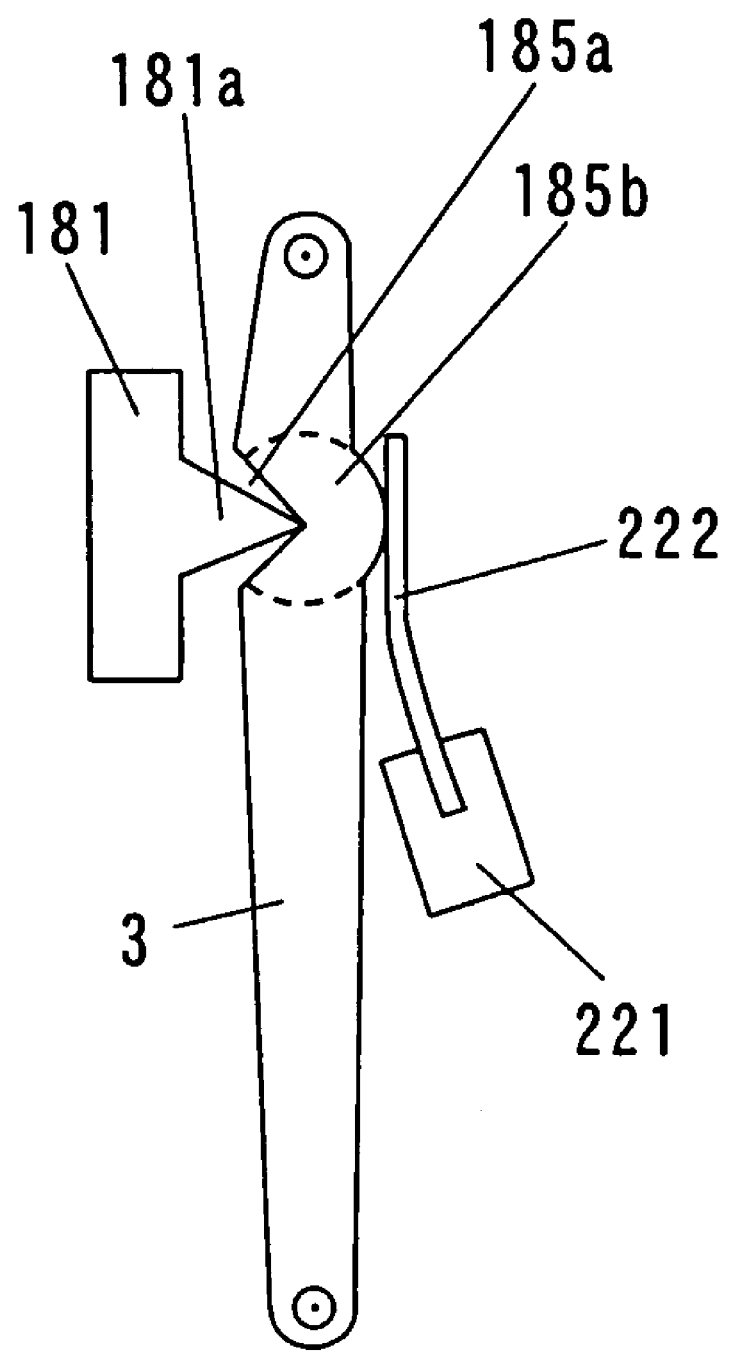
FIG. 28 is a partly detailed view showing another method of activating the first link in the seventh exemplary embodiment of the present invention.
Figure 29:
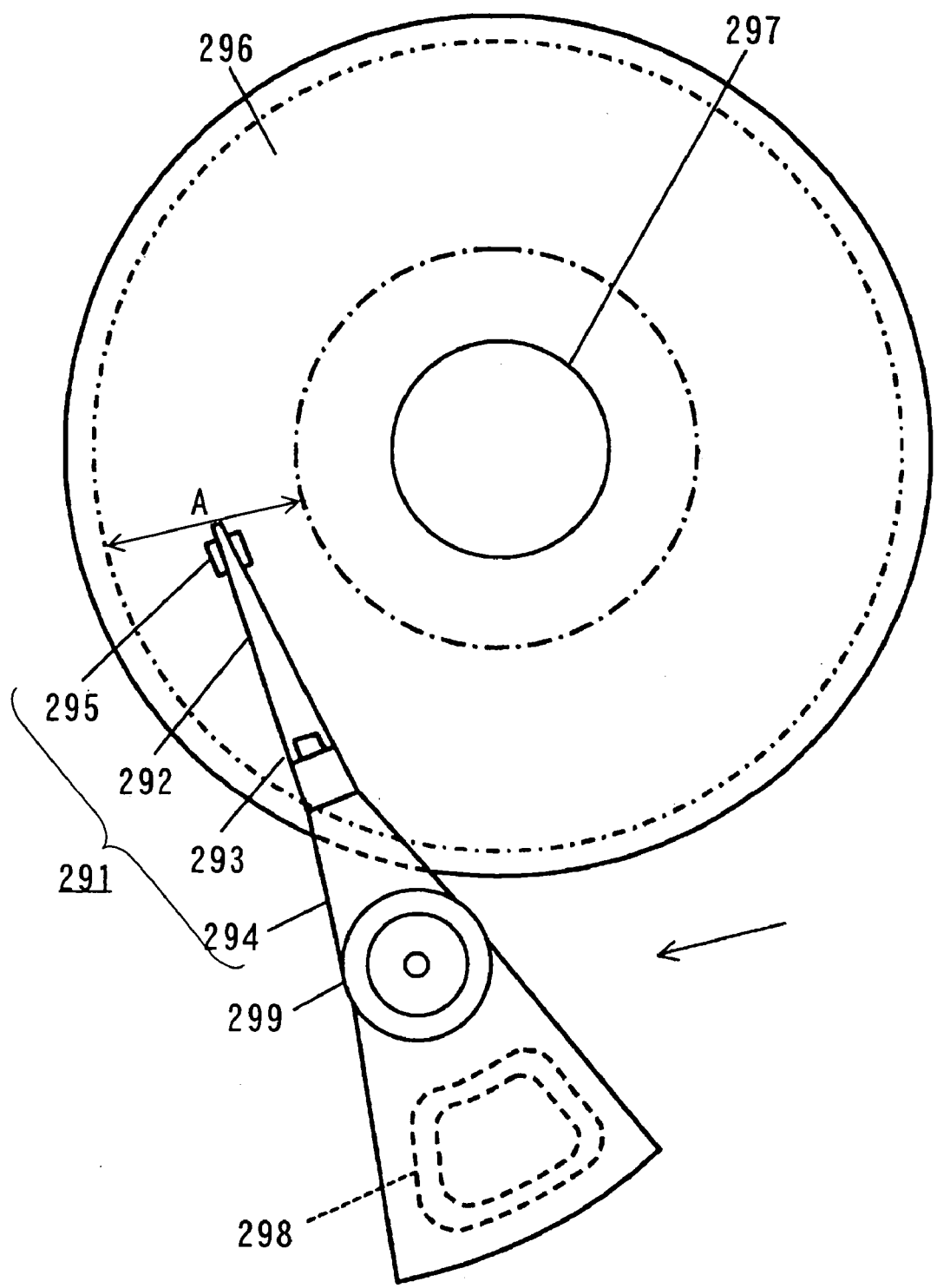
FIG. 29 is a top view showing the configuration of a conventional head support device and recording medium.

Further, FIG. 28 shows another method of activating the first link 3 toward the bearing support 181, but except the difference in position of the rotational center 3b of the first link 3 as against the other method (see FIG. 22) of activating the first link 3 toward the bearing support 181 in the sixth exemplary embodiment, the configuration is same as in the sixth exemplary embodiment, and the description is omitted here.

The configuration described in the seventh exemplary embodiment includes the bearing support 181 provided with projection 181a and the first link 3 provided with notch 185a, but the present invention is not limited to this configuration. The same as in the sixth exemplary embodiment, for example, it is preferable to be configured in that the bearing support is provided with generally triangular-shaped notch and the first link is provided with generally triangular-shaped projection, and the peak of the notch of the bearing support is abutted on the peak of the first link, which serves as the first rotational center of the first link.

As described above, according to the seventh exemplary embodiment, same effects as in the fourth exemplary embodiment and the fifth exemplary embodiment can be obtained, and also, same as in the sixth exemplary embodiment, for example, when the signal conversion element such as magnetic head is moved to the target track, it can be reliably moved toward the target track without being influenced by gaps at rotating parts of the links even in case of fine movement, and it is possible to shorten the access time for moving the signal conversion element to the target track.

Also, as a method of driving the head support device, piezoelectric element is employed to move the signal conversion element with slight expansion and contraction of the piezoelectric element, and therefore, high response performance can be obtained and it is possible to further shorten the access time.

Accordingly, a disk drive provided with a head support device having such a configuration is capable of increasing the follow-up speed to the target track, assuring good response, and improving the head positioning control characteristics and reliability.

In the exemplary embodiment 1 through the exemplary embodiment 7 of the present invention, the description refers to a head support device of a magnetic recording/reproducing apparatus using magnetic, but it is needless to say that similar effects can be obtained by using the head support device in a non-contact type disk recording/reproducing apparatus such as optical disk drive and optical magnetic disk drive.

Thus, in the present invention, it is configured in that the third link is rotatably connected to one respective sides of the first link and the second link, and the fourth link is rotatably connected to the other respective sides thereof, while the first suspension and the second suspension are respectively fixed on the third link and the fourth link, having the center of the recording medium therebetween, and as the first link and the second link are rotated, the third link and the fourth link are moved in parallel relation with each other, keeping a state of being parallel with the diameter of the recording medium.

By using such a configuration, when the magnetic head mounted on the slider fitted to each of the first suspension and the second suspension moves on the recording medium, it can be moved on the recording medium while keeping the track width direction of head gap of the magnetic head mounted on the slider in a fixed direction against the diametric line of the recording medium. Accordingly, since the moving locus is moved in the vicinity of the diametric line, the skew angle on the recording medium of the magnetic head becomes very small, and even when the mode is shifted from reproducing to recording, the recording head positioning accuracy is not lowered, the initialized circumferential direction of the recording medium is little deflected from the direction of magnetic orientation, the recording characteristic is not deteriorated, and as a result, it is possible to realize a head support device of excellent reliability.

Also, in the present invention, it is configured in that two magnetic heads correspond to same plane of the recording medium, and their azimuth angles are different from the respective azimuth angles of the signal conversion elements, thereby forming the adjacent recording tracks with magnetic heads of different azimuth angles.

In such a configuration, reading the signals of adjacent recording tracks hardly take place and it is possible to make the recording track pitch very small, and as a result, the recording density can be improved.

Also, in the present invention, it is configured in that at least one magnetic head corresponds to each plane of the topside and underside of the recording medium.

By using such a configuration, it becomes possible to record on both sides of the recording medium and to increase the recording capacity.

Also, setting so that the total weight of the third link is nearly equal to the total weight of the fourth link, and each gravity center of the first link and the fourth link is at the first rotational center and the second rotational center, the whole of the head support device is balanced in weight (gravity center), and as a result, it is possible to realize high impact resistance against external shocks or the like.

Also, in the present invention, it is configured in that the first suspension and the second suspension are arranged so that the magnetic heads mounted on the sliders respectively fitted to the first suspension and the second suspension correspond to the respective two divided zones of the recordable zone of the recording medium and that the whole of the recordable zone of the recording medium is covered by the two magnetic heads.

In such a configuration, the skew angles on the recording medium of the respective magnetic heads of the first suspension and the second suspension become further smaller, and it is possible to prevent lowering of the recording head positioning accuracy due to mode shifting and to suppress the deterioration of the recording characteristics due to deflection from the direction of magnetic orientation. Also, since the small rotational angle of the first link may cover the entire range of the recordable zone, the follow-up speed of the magnetic head to the target track can be increased and high response can be obtained, and it is possible to realize a head support device having higher reliability.

Also, in the present invention, it is configured in that the third link is rotatably connected to each of the first link and the second link, and the first suspension and the second suspension are fixed on the third suspension, having the center of the recording medium therebetween, and as the first link and the second link are rotated, the third link is moved in parallel with the diametric line of the recording medium.

By using such a configuration, since the effective link lengths of the first link and the second link can be increased, the skew angles on the recording medium of the magnetic heads mounted on the respective sliders fitted to the two suspensions fixed on the third link become very small. Accordingly, even when the mode is shifted from reproducing to recording, the magnetic head positioning accuracy is not lowered, the initialized circumferential direction of the recording medium is little deflected from the direction of magnetic orientation, the recording characteristic is not deteriorated, and it is possible to realize a head support device of excellent reliability. Also, the azimuth angles of the respective magnetic heads of the first suspension and the second suspension are different from each other, and the magnetic head of the second suspension, being different in azimuth angle, records on the track between the recording tracks recorded by the magnetic head of the first suspension, and thereby, it is possible to realize a configuration wherein reading the signals of adjacent recording tracks hardly take place. Accordingly, it is possible to greatly make the recording track pitch very small and to greatly improve the recording density. Also, the recordable zone of the recording medium is divided into two zones, and the magnetic heads mounted on the sliders respectively fitted to the first suspension and the second suspension correspond to the two divided zones, and the whole of the recordable zone of the recording medium is covered by the two magnetic heads, and consequently, the skew angles on the recording medium of the respective magnetic heads become further smaller. Accordingly, it is possible to prevent lowering of the recording head positioning accuracy due to mode shifting and to suppress the deterioration of recording characteristics due to deflection from the direction of magnetic orientation. Also, since the small rotational angle of the first link may cover the entire range of the recordable zone, the follow-up speed of the magnetic head to the target track can be increased, and thus, high response can be obtained and it is possible to realize a head support device having higher reliability.

Further, the first link and the second link are provided with a triangular-shaped notch, and the respective peaks of the triangular-shaped projection and push portion of the bearing support and push arm are abutted on the respective triangular-shaped notches of the first link and the second link, which respectively serve as the first rotational center against the first link and the second rotational center against the second link.

In such a configuration, when the magnetic head is moved to the target track, the third link (and fourth link) on which the suspension having the magnetic head is fixed may smoothly reciprocate without being influenced by looseness due to gaps at the rotating parts of the links even in case of fine movement. Accordingly, the magnetic head can be reliably moved toward the target track, and it is possible to shorten the access time for moving the magnetic head to the target track.

Also, as a method of driving the head support device, piezoelectric element is employed to move the signal conversion element with slight expansion and contraction of the piezoelectric element, and therefore, high response performance can be obtained and it is possible to further shorten the access time.

Accordingly, a disk drive provided with a head support device having such a configuration is capable of increasing the follow-up speed of the signal conversion element to the target track, assuring good response, shortening the access time to the target track, and improving the head positioning control characteristics and reliability.

What is claimed is:

1. A head support device, comprising:
   a first link and a second link respectively having a first rotational center and a second rotational center, having a rotational center on a diametric line of a recording medium therebetween;
   a third link and a fourth link which are respectively held so as to be rotatable about rotational centers provided at either side of said first link and rotational centers provided at either side of said second link; and
   a first suspension and a second suspension which are respectively fixed on said third link and said fourth link and have heads respectively disposed on one side thereof.

2. The head support device of claim 1, wherein said head comprises a slider with a signal conversion element mounted thereon.

3. The head support device of claim 1, wherein a line connecting the respective rotational centers of said first link passes through the first rotational center of said first link, while a line connecting the respective rotational centers of said second link passes through the second rotational center of said second link.

4. The head support device of claim 1, wherein the respective first rotational center and second rotational center of said first link and said second link are located on an extension line of the diametric line of said recording medium.

5. The head support device of claim 1, wherein a first effective link length of said first link and a first effective link length of said second link are nearly identical with each other, and
   a second effective link length of said first link and a second effective link length of said second link are nearly identical with each other, and
   further, the distance from the rotational center of said first link to the rotational center of said second link at said third link and the distance from the rotational center of said first link to the rotational center of said second link at said fourth link are respectively nearly equal to the distance from the first rotational center of said first link to the second rotational center of said second link.

6. The head support device of claim 5, wherein the first effective link length of said first link and the second effective link length of said second link are identical with each other.

7. The head support device of claim 1, wherein the third link and the fourth link are in parallel relation with the diametric line of said recording medium that passes through the first rotational center and the second rotational center, and reciprocate in directions opposite to each other.

8. The head support device of claim 7, wherein said first suspension and said second suspension are disposed in point-symmetrical relation with each other with respect to the midpoint in a direction of the rotational axis of said recording medium on the rotational center axis of said recording medium.

9. The head support device of claim 1, wherein said first suspension and said second suspension are disposed at same surface side of either topside or underside of said recording medium.

10. The head support device of claim 9, wherein said second suspension is disposed in line-symmetrical relation with said first suspension with respect to the axis of rotational center of said recording medium.

11. The head support device of claim 1, wherein said first suspension and said second suspension are disposed so as to have the topside and underside of said recording medium therebetween.

12. The head support device of claim 1, wherein track width directions of signal conversion elements respectively mounted on sliders comprising said heads respectively disposed on one end of said first suspension and one end of said second suspension reciprocate on said recording medium while keeping predetermined angles respectively against the diametric line of said recording medium that connects the first rotational center to the second rotational center.

13. The head support device of claim 12, wherein said predetermined angle in the track width direction of at least one out of said signal conversion elements respectively mounted on sliders comprising said heads respectively disposed on one end of said first suspension and one end of said second suspension is 0° against a diametric line of said recording medium that connects the first rotational center to the second rotational center, that is, in parallel relation with the diametric line of said recording medium.

14. The head support device of claim 1, wherein respective center lines in the lengthwise direction of said first suspension and said second suspension are vertical to the diametric line of said recording medium that passes through the first rotational center of said first link and the second rotational center of said second link.

15. The head support device of claim 14, wherein the center of signal conversion element connected to said first suspension passes through two points being at same predetermined distance in a direction vertical to a radial line from the radial line at the first suspension side of said recording medium that connects the first rotational center to the second rotational center and located on the innermost periphery or outermost periphery of recordable zone of said recording medium, and the center of conversion element connected to said second suspension passes through two points being at same predetermined distance in a direction vertical to a radial line from the radial line at the second suspension side of said recording medium that connects the first rotational center to the second rotational center and located on the innermost periphery or outermost periphery of recordable zone of said recording medium.

16. The head support device of claim 15, wherein the centers of signal conversion elements respectively connected to said first suspension and said second suspension are located on the innermost periphery of the recordable zone, and in a direction vertical to the diametric line of said recording medium that connects the first rotational center to the second rotational center, distance d from the centers of the respective signal conversion elements to the diametric line of said recording medium that connects the first rotational center to the second rotational center is in a range as follows:

$0 < d < d_0$ where the distance between the center of said signal conversion element and the center of said slider is $d_0$.

17. The head support device of claim 15, wherein respectively predetermined distances in a direction vertical to the radial line at said first suspension and said second suspension are nearly identical with each other.

18. The head support device of claim 17, wherein at least one of the centers of sliders mounted with signal conversion elements comprising said heads respectively connected to said first suspension and said second suspension is located on the radial line of said recording medium that connects the first rotational center to the second rotational center.

19. The head support device of claim 17, wherein the centers of signal conversion elements respectively connected to said first suspension and said second suspension are located on the innermost periphery of the recordable zone, and in a direction vertical to the diametric line of said recording medium that connects the first rotational center to the second rotational center, distance d from the centers of the respective signal conversion elements to the diametric line of said recording medium that connects the first rotational center to the second rotational center is in a range as follows:

$0 < d < d_0$ where the distance between the center of said signal conversion element and the center of said slider is $d_0$.

20. The head support device of claim 14, wherein the center of signal conversion element connected to said first suspension passes through two intersections of a radial line of said recording medium at the first suspension side on the diametric line of said recording medium with the innermost periphery or the outermost periphery of the recordable zone of said recording medium, and the center of signal conversion element connected to said second suspension passes through two intersections of a radial line of said recording medium at the second suspension side with the innermost periphery or the outermost periphery of the recordable zone of said recording medium.

21. The head support device of claim 20, wherein the centers of signal conversion elements respectively connected to said first suspension and said second suspension are located on the innermost periphery of the recordable zone, and the center of slider mounted with signal conversion element comprising said head is located on the radial line of said recording medium that connects the first rotational center to the second rotational center.

22. The head support device of claim 20, wherein the centers of signal conversion elements respectively connected to said first suspension and said second suspension are located on the innermost periphery of the recordable zone, and in a direction vertical to the diametric line of said recording medium that connects the first rotational center to the second rotational center, distance d from the centers of the respective signal conversion elements to the diametric line of said recording medium that connects the first rotational center to the second rotational center is in a range as follows:

$0<d<d_0$ where the distance between the center of said signal conversion element and the center of said slider is $d_0$.

23. The head support device of claim 1, further comprising:

a third suspension which is fixed on said third link and provided with a head at one side thereof; and fourth suspension which is fixed on said fourth link and provided with a head at either side thereof.

24. The head support device of claim 23, wherein said head comprises a slider mounted with a signal conversion element.

25. The head support device of claim 23, wherein a line connecting respective rotational centers of said first link passes through the first rotational center of said first link, while a line connecting respective rotational centers of said second link passes through the second rotational center of said second link.

26. The head support device of claim 23, wherein the respective first rotational center and second rotational center of said first link and said second link are located on a diametric line of said recording medium.

27. The head support device of claim 23, wherein the first effective link length of said first link and the first effective link length of said second link are nearly identical with each other, and the second effective link length of said first link and the second effective link length of said second link are nearly identical with each other, further, distance from a rotational center against said first link to a rotational center against said second link at said third link and distance from a rotational center against said first link to a rotational center against said second link at said fourth link are respectively nearly identical with distance from the first rotational center of said first link to the second rotational center of said second link.

28. The head support device of claim 27, wherein the first effective link length and the second effective link length of said first link are identical with each other.

29. The head support device of claim 23, wherein said third link and said fourth link are parallel to a diametric line of said recording medium that passes through the first rotational center and the second rotational center and reciprocate in directions opposite to each other.

30. The head support device of claim 23, wherein respective center lines in lengthwise directions of said first suspension and said third suspension fixed on said third link and of said second suspension and said fourth suspension fixed on said fourth link are vertical to the diametric line of said recording medium that passes through the first rotational center of said first link and the second rotational center of said second link.

31. The head support device of claim 23, wherein the track width direction of a signal conversion element mounted on a slider comprising the head fitted to each end of said first suspension, said second suspension, said third suspension, and said fourth suspension reciprocates on said recording medium while keeping a predetermined angle against the diametric line of said recording medium that connects the first rotational center to the second rotational center.

32. The head support device of claim 31, wherein at one signal conversion element at least out of signal conversion elements mounted on sliders respectively fitted to the respective ends of said first suspension, said second suspension, said third suspension, and said fourth suspension, the predetermined angle in track width direction of the signal conversion element against the diametric line of said recording medium that connects the first rotational center to the second rotational center is 0°, that is, parallel to the diametric line of said recording medium.

33. The head support device of claim 23, wherein the center of each signal conversion element connected to said first suspension, said second suspension, said third suspension, and said fourth suspension passes through two points on the innermost periphery or outermost periphery of recordable zone of said recording medium which are respectively at predetermined distances in a direction vertical to the diametric line from the diametric line of said recording medium that connects the first rotational center to the second rotational center.

34. The head support device of claim 33, wherein the predetermined distances in a direction vertical to the diametric line of said recording medium at said first suspension and said second suspension are nearly identical with each other, and the predetermined distances in a direction vertical to the diametric line of said recording medium at said third suspension and said fourth suspension are nearly identical with each other.

35. The head support device of claim 34, wherein the center of signal conversion element connected to at least one suspension out of said first suspension, said second suspension, said third suspension, and said fourth suspension is located on the innermost periphery of recordable zone, and the center of slider mounted with signal conversion element comprising said head is located on the diametric line of said recording medium that connects the first rotational center to the second rotational center.

36. The head support device of claim 34, wherein the center of signal conversion element connected to at least one suspension out of said first suspension, said second suspension, said third suspension, and said fourth suspension is located on the innermost periphery of the recordable zone, and in a direction vertical to the diametric line of said recording medium that connects the first rotational center to the second rotational center, distance d from the center of said signal conversion element to the diametric line of said recording medium that connects the first rotational center to the second rotational center is in a range as follows $0<d<d_0$ where the distance between the center of said signal conversion element and the center of said slider is d0.

37. The head support device of claim 23, wherein said first suspension and said third suspension fixed on said third link are arranged in such manner as to sandwich the topside and underside of said recording medium therebetween, while said second suspension and said fourth suspension fixed on said fourth link are arranged in such manner as to sandwich the topside and underside of said recording medium therebetween.

38. The head support device of claim 37, wherein the center of signal conversion element connected to said second suspension is disposed in line-symmetrical relation with the center of signal conversion element connected to said first suspension with respect to the axis of rotational center of said recording medium, and in a state such that a line that passes through the first rotational center at said first link and connects respective rotational centers against said third link and said fourth link is kept at a predetermined angle against the diametric line of said recording medium that connects the first rotational center to the second rotational center, regarding at least one positional relation out of the positional relations of centers of signal conversion elements respectively connected to said first suspension and said third suspension fixed on said third link or the positional relations of centers of signal conversion elements respectively connected to said second suspension and said fourth suspension fixed on said fourth link, the center passes through a midpoint in a direction of rotational axis on the axis of rotational center of said recording medium, and is in line-symmetrical relation with respect to each line vertical to the axis of rotational center and the diametric line of said recording medium that connects the first rotational center to the second rotational center.

39. The head support device of claim 38, wherein the predetermined angle of the line connecting the rotational centers at said first link against the diametric line of said recording medium that connects the first rotational center to the second rotational center is nearly 90°.

40. The head support device of claim 23, wherein said first suspension and said third suspension fixed on said third link are arranged at one same surface side of the topside and underside of said recording medium, while said second suspension and said fourth suspension fixed on said fourth link are arranged at the other same surface side of the topside and underside of said recording medium.

41. The head support device of claim 40, wherein the center of signal conversion element connected to said second suspension is disposed in point-symmetrical relation with the center of signal conversion element connected to said first suspension with respect to a midpoint in the rotational axis direction of said recording medium on the axis of rotational center of said recording medium, and in a state such that a line that passes through the first rotational center at said first link and connects respective rotational centers against said third link and said fourth link is kept at a predetermined angle against the diametric line of said recording medium that connects the first rotational center to the second rotational center, regarding at least one of the positional relations out of the positional relations of centers of signal conversion elements respectively connected to said first suspension and said third suspension fixed on said third link or the positional relations of centers of signal conversion elements respectively connected to said second suspension and said fourth suspension fixed on said fourth link, the centers are in face-symmetrical relation with respect to a plane vertical to the diametric line of said recording medium that connects the first rotational center to the second rotational center including the axis of rotational center of said recording medium.

42. The head support device of claim 41, wherein the predetermined angle of the line connecting the rotational centers at said first link against the diametric line of said recording medium that connects the first rotational center to the second rotational center is nearly 90°.

43. The head support device of claim 1, wherein the respective heads of said first suspension and said second suspension are arranged on either topside or underside of said recording medium, and one head of said first suspension or said second suspension corresponds to a zone at the innermost periphery side of recordable zone divided into two zones by a separation periphery, while the other head corresponds to a zone at the outermost periphery side.

44. The head support device of claim 43, wherein said head comprises a signal conversion element mounted on a slider.

45. The head support device of claim 44, wherein a line corresponding to the track width direction of the signal conversion element mounted on the slider fitted to each of said first suspension and said second suspension reciprocates on said recording medium while keeping a predetermined angle against the diametric line of said recording medium that connects the first rotational center to the second rotational center.

46. The head support device of claim 45, wherein said predetermined angle in the track width direction of at least one out of said signal conversion elements respectively mounted on the sliders respectively fitted to said first suspension and said second suspension is 00 against the diametric line of said recording medium that connects the first rotational center to the second rotational center, that is, in parallel relation with the diametric line of said recording medium.

47. The head support device of claim 44, wherein one center of signal conversion element connected to said first suspension or said second suspension passes through two points having same predetermined distance in a direction vertical to the diametric line from the diametric line of said recording medium that connects the first rotational center to the second rotational center and located on the innermost periphery and the separation periphery of the recordable zone of said recording medium at one side against the rotational center of said recording medium, and the other center of the conversion element passes through two points having same predetermined distance in the another direction vertical to the diametric line from the diametric line and located on the separation periphery and the outermost periphery of the recordable zone of said recording medium at the other side against the rotational center of said recording medium.

48. The head support device of claim 47, wherein when the center of signal conversion element at the innermost periphery side of the recordable zone out of the signal conversion elements connected to said first suspension or said second suspension is located on the innermost periphery of the recordable zone, the center of the slider mounted with the signal conversion element is located on the diametric line of said recording medium that connects the first rotational center to the second rotational center.

49. The head support device of claim 47, wherein in a direction vertical to the diametric line of said recording medium that connects the first rotational center to the second rotational center, distance d from the center of the signal conversion element at the innermost periphery side of the recordable zone to the diametric line of said recording medium that connects the first rotational center to the second rotational center is in a range as follows:

$$0 < d < d_0$$

where the distance between the center of said signal conversion element and the center of said slider is $d_0$.

50. The head support device of claim 44, wherein the center of one signal conversion element of the signal conversion elements connected to said first suspension or said second suspension passes through two intersections of the diametric line of said recording medium with the innermost periphery and the separation periphery of the recordable zone of said recording medium at one side against the rotational center of said recording medium, and the center of the other signal conversion element passes through two intersections of the diametric line of said recording medium with the separation periphery and the outermost periphery of the recordable zone of said recording medium at the other side against the rotational center of said recording medium.

51. The head support device of claim 50, wherein when the center of the signal conversion element at the innermost periphery side of the recordable zone is located on the innermost periphery of the recordable zone, the center of the slider mounted with the signal conversion element is located on the diametric line of said recording medium that connects the first rotational center to the second rotational center.

52. The head support device of claim 50, wherein in a direction vertical to the diametric line of said recording medium that connects the first rotational center to the second rotational center, the center of the signal conversion element at the innermost periphery side of the recordable zone is positioned between the diametric line of the recordable zone of said recording medium that connects the first rotational center to the second rotational center and the distance from the center of the signal conversion element to the center of the slider.

53. The head support device of claim 43, wherein a line connecting the respective rotational centers provided at either end of said first link passes through the first rotational center of said first link, and a line connecting the respective rotational centers provided at either end of said second link passes through the second rotational center of said second link.

54. The head support device of claim 43, wherein the first rotational center of said first link and the second rotational center of said second link are located on a diametric line of said recording medium.

55. The head support device of claim 43, wherein the first effective link length of said first link and the first effective link length of said second link are nearly identical with each other, and the second effective link length of said first link and the second effective link length of said second link are nearly identical with each other, further, distance from a rotational center against said first link to a rotational center against said second link at said third link and distance from a rotational center against said first link to a rotational center against said second link at said fourth link are respectively nearly identical with distance from the first rotational center of said first link to the second rotational center of said second link.

56. The head support device of claim 55, wherein the first effective link length and the second effective link length of said first link are nearly identical with each other.

57. The head support device of claim 43, wherein said third link and said fourth link are parallel to the diametric line of said recording medium that passes through the first rotational center and the second rotational center, and reciprocate in directions opposite to each other.

58. The head support device of claim 43, wherein respective center lines in the lengthwise direction of said first suspension and said second suspension are vertical to the diametric line of said recording medium that passes through the first rotational center of said first link and the second rotational center of said second link.

59. A disk drive, comprising:

a recording medium rotated by a spindle motor, and a head support device opposing to said recording medium and having a signal conversion element for recording signals on said recording medium or reproducing signals from said recording medium, wherein said head support device has a configuration of any one of claims 52.

* * * * *